US012706024B2

(12) United States Patent
Kim et al.

(10) Patent No.: US 12,706,024 B2
(45) Date of Patent: Aug. 11, 2026

(54) DISPLAY PANEL AND DISPLAY DEVICE INCLUDING THE SAME

(71) Applicant: LG Display Co., Ltd., Seoul (KR)

(72) Inventors: Sun Young Kim, Paju-si (KR); Sung Hoon Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/965,957

(22) Filed: Dec. 2, 2024

(65) Prior Publication Data

US 2025/0252902 A1 Aug. 7, 2025

(30) Foreign Application Priority Data

Feb. 7, 2024 (KR) ........................ 10-2024-0018631

(51) Int. Cl.

| | |
|---|---|
| ***G09G 3/20*** | (2006.01) |
| ***G09G 3/32*** | (2016.01) |
| ***G09G 3/3233*** | (2016.01) |
| ***G09G 3/3266*** | (2016.01) |
| ***G09G 3/3291*** | (2016.01) |

(52) U.S. Cl.

CPC ............. *G09G 3/32* (2013.01); *G09G 3/2003* (2013.01); *G09G 3/2074* (2013.01); *G09G 3/3233* (2013.01); *G09G 3/3266* (2013.01); *G09G 3/3291* (2013.01); *G09G 2300/0426* (2013.01); *G09G 2300/0443* (2013.01); *G09G 2310/0267* (2013.01); *G09G 2310/0275* (2013.01); *G09G 2310/08* (2013.01); *G09G 2320/0242* (2013.01)

(58) Field of Classification Search

CPC ......... G09G 3/3233; G09G 2300/0426; G09G 2300/0452; G09G 2320/0233; G09G 2300/0443; G09G 3/3266; G09G 3/3291; G09G 2300/0439; G09G 3/2074; G09G 2310/0262; G09G 2310/0267; G09G 2310/0275; G09G 3/2003; G09G 3/3225

See application file for complete search history.

(56) References Cited

U.S. PATENT DOCUMENTS

| | | | | |
|---|---|---|---|---|
| 11,151,925 | B2 * | 10/2021 | Park | G09G 3/3275 |
| 12,039,921 | B1 * | 7/2024 | Watsuda | G09G 3/2003 |
| 2010/0220038 | A1 * | 9/2010 | Chung | G09G 3/3233 345/76 |
| 2015/0009194 | A1 * | 1/2015 | Kim | G09G 3/3233 345/80 |

(Continued)

FOREIGN PATENT DOCUMENTS

| | | |
|---|---|---|
| KR | 10-2020-0080925 A | 7/2020 |
| KR | 10-2023-0100681 A | 7/2023 |

*Primary Examiner* — Dismery Mercedes
(74) *Attorney, Agent, or Firm* — Fenwick & West LLP

(57) ABSTRACT

The present disclosure relates to a display panel and a display device including the same, wherein each of the pixels includes a sub-pixel of first color, including a first-first sub-pixel and a first-second sub-pixel; a sub-pixel of second color, including a second-first sub-pixel and a second-second sub-pixel; and a sub-pixel of third color, including a third-first sub-pixel and a third-second sub-pixel. Gate lines include a first EM line which connected to the sub-pixel of first color and to which a first light emission signal is applied; and a second EM line which is connected to the sub-pixel of second color and to which a second light emission signal is applied.

29 Claims, 50 Drawing Sheets

(56) References Cited

U.S. PATENT DOCUMENTS

| | | | | |
|---|---|---|---|---|
| 2015/0015467 | A1* | 1/2015 | Kaplan | G09G 3/3233 345/82 |
| 2018/0012546 | A1* | 1/2018 | Li | G09G 3/3258 |
| 2018/0137817 | A1* | 5/2018 | Wu | G09G 3/3233 |
| 2020/0051482 | A1* | 2/2020 | Cok | G09G 3/006 |
| 2021/0166642 | A1* | 6/2021 | He | G09G 3/3648 |
| 2021/0390904 | A1* | 12/2021 | Xuan | G09G 3/3225 |
| 2024/0213227 | A1 | 6/2024 | Son et al. | |
| 2024/0395202 | A1* | 11/2024 | Kim | G09G 3/3233 |
| 2025/0017089 | A1* | 1/2025 | Hsieh | H10K 59/1213 |
| 2025/0209981 | A1* | 6/2025 | He | G09G 3/3233 |

* cited by examiner

DISPLAY PANEL AND DISPLAY DEVICE INCLUDING THE SAME

CROSS-REFERENCE TO RELATED APPLICATION

This application claims priority to and the benefit of Republic of Korea Patent Application No. 10-2024-0018631, filed on Feb. 7, 2024, which is hereby incorporated by reference in its entirety.

FIELD

The present disclosure relates to a display panel and a display device including the same.

DESCRIPTION OF RELATED ART

Various flat panel display devices, such as a liquid crystal display device and an electroluminescent display device, are known. The electroluminescent display device may use light emitting elements arranged in each pixel to emit light by itself without a backlight, thereby displaying an input image. The light emitting elements of the electroluminescent display device may be divided into an organic light emitting element and an inorganic light emitting element depending on the material of a light emitting layer.

Recently, a display device that uses a light emitting diode (LED), which is an inorganic light emitting element, as a light emitting element of a pixel has attracted attention as a next-generation display device. Since the LED is made of an inorganic material, it does not require a separate encapsulation layer to protect an organic material from moisture, and it has superior reliability and long lifespan compared to an organic light emitting diode (OLED). In addition, the LED has a fast light-up speed, excellent luminous efficiency, and impact resistance.

For inorganic light-emitting devices such as micro-LEDs, the luminous efficiency of the light-emitting elements may vary depending on the wavelength of the light emitted by the light-emitting elements, depending on the material properties of a light-emitting layer. Luminous efficiency is the efficiency expressed as luminance relative to the current applied to a light-emitting element.

The driving period of a pixel circuit may be divided into a writing period of pixel data of an input image and a light emission period in a frame period. The light-emitting elements of certain colors have a peak efficiency band at higher voltages, but when the voltage is increased, the luminance may become too high, causing the color coordinates and white balance to deviate from the target values, resulting in a deterioration of an image quality.

SUMMARY

The present disclosure aims to solve the above-described necessity and/or problems.

The present disclosure provides a display panel that is capable of driving each of light-emitting elements in the maximum efficiency region without deteriorating the image quality, and a display device including the same.

The problem to be solved by the present disclosure is not limited to those mentioned above, and other problems not mentioned will be clearly understood by those skilled in the art from the following description.

In one embodiment, a display panel comprises: a plurality of data lines; a plurality of gate lines intersecting the plurality of data lines, the plurality of gate lines including a first emission line to which a first light emission signal is applied and a second emission line to which a second light emission signal is applied; a plurality of power lines; and a plurality of pixels connected to the plurality of data lines, the plurality of gate lines, and the plurality of power lines, wherein each of the plurality of pixels includes: a sub-pixel of a first color that includes a primary first sub-pixel and a secondary first sub-pixel; a sub-pixel of a second color that includes a primary second sub-pixel and a secondary second sub-pixel; and a sub-pixel of a third color that includes a primary third sub-pixel and a secondary third sub-pixel, wherein the first emission line is connected to the sub-pixel of the first color and the second emission line is connected to the sub-pixel of the second color.

In one embodiment, a display device comprises: a display panel including a plurality of data lines, a plurality of gate lines, a plurality of power lines, and a plurality of pixels; a data driver configured to output a data voltage to the plurality of data lines; and a gate driver configured to output a gate signal to the plurality of gate lines, the plurality of gate lines including a first emission line to which a first light emission signal is applied and a second emission line to which a second light emission signal is applied, wherein each of the plurality of pixels includes: a sub-pixel of a first color that includes a primary first sub-pixel and a secondary first sub-pixel; a sub-pixel of a second color that includes a primary second sub-pixel and a secondary second sub-pixel; and a sub-pixel of a third color that includes a primary third sub-pixel and a secondary third sub-pixel, wherein the first emission line is connected to the sub-pixel of the first color and the second emission line is connected to the sub-pixel of the second color.

In one embodiment, a display panel comprises: a plurality of data lines; a plurality of gate lines intersecting the plurality of data lines, the plurality of gate lines including a first emission line to which a first light emission signal is applied and a second emission line to which a second light emission signal is applied; a plurality of pixels connected to the plurality of data lines and the plurality of gate lines, wherein each of the plurality of pixels includes: a sub-pixel of a first color that includes a primary first sub-pixel and a secondary first sub-pixel; a sub-pixel of a second color that includes a primary second sub-pixel and a secondary second sub-pixel; and a sub-pixel of a third color that includes a primary third sub-pixel and a secondary third sub-pixel, wherein the first emission line is connected to the sub-pixel of the first color and the second emission line is connected to the sub-pixel of the second color, wherein a maximum possible voltage of a first data voltage applied to the sub-pixel of the first color is greater than a maximum possible voltage of sub-pixel of the second color and the sub-pixel of the third color and a first duty ratio of the first light emission signal is less than a second duty ratio of the second light emission signal.

According to the embodiments of the present disclosure, it is possible to improve the lifetime of the light-emitting elements and drive the light-emitting elements at low power by driving the light-emitting element with high efficiency and high luminance, as well as to implement the pixel circuit capable of driving each light-emitting element in a maximum efficiency region without deteriorating the image quality, and a display device including the same.

According to the embodiments of the present disclosure, a plurality of sub-pixels of the same color within one pixel may be arranged to respond effectively to the elimination of defects in the light-emitting elements or pixel circuit, thereby improving process optimization and yield of the display panel.

According to the embodiments of the present disclosure, image quality may be improved by driving the sub-pixels of the same color within one pixel in various combinations.

According to the embodiments of the present disclosure, the sub-pixels of the same color within one pixel may be alternately driven to prevent tearing of an object image or the appearance of boundaries within the object when an image is displayed on a tiled display.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1A:
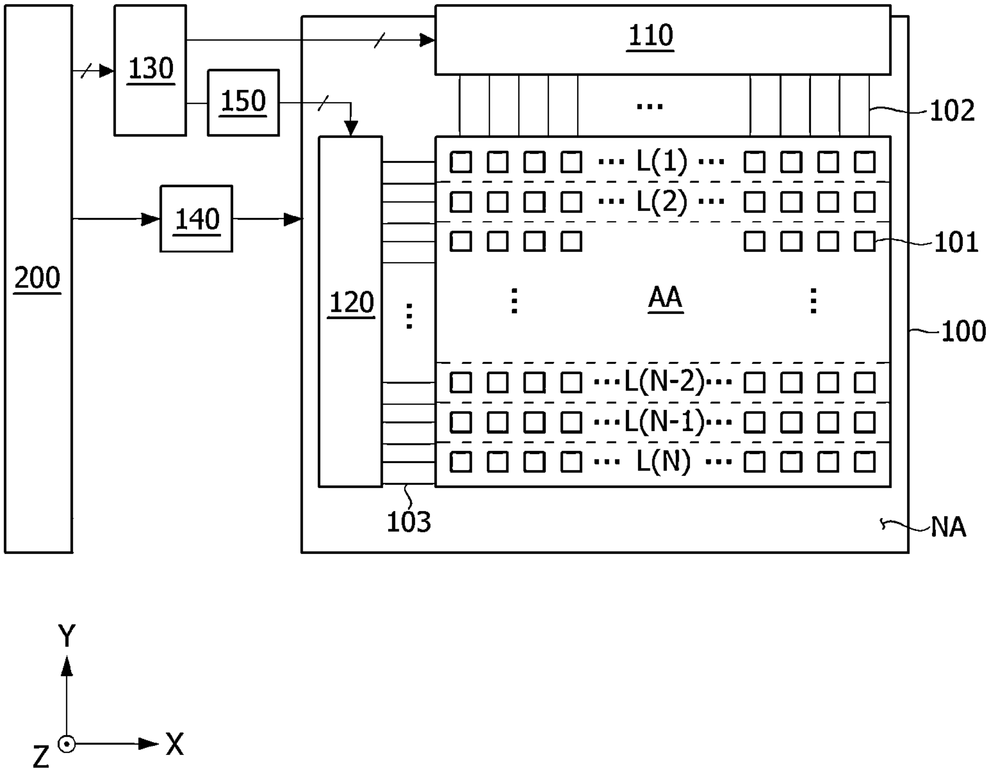
FIGS. 1A and 1B are block diagrams illustrating a display device according to one embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "comprising" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components may be interposed between them, unless "immediately" or "directly" is used.

When a temporal antecedent relationship is described, such as "after", "following", "next to", "before", or the like, it may not be continuous on a time base unless "immediately" or "directly" is used.

The terms "first," "second," and the like may be used to distinguish elements from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

The pixel circuit of the display device may include a plurality of transistors. A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, current flows from the source to the drain. It should be noted that a source and a drain of a transistor are not fixed. For example, a source and a drain may be changed according to an applied voltage. Therefore, the disclosure is not limited to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In the case of an n-channel transistor, the gate-on voltage may be a gate high voltage VGH, and the gate-off voltage may be a gate low voltage VGL. In the case of a p-channel transistor, the gate-on voltage may be the gate low voltage VGL, and the gate-off voltage may be the gate high voltage VGH.

Hereinafter, various embodiments of the present disclosure will be described in detail with reference to the accompanying drawings.

Figure 1B:
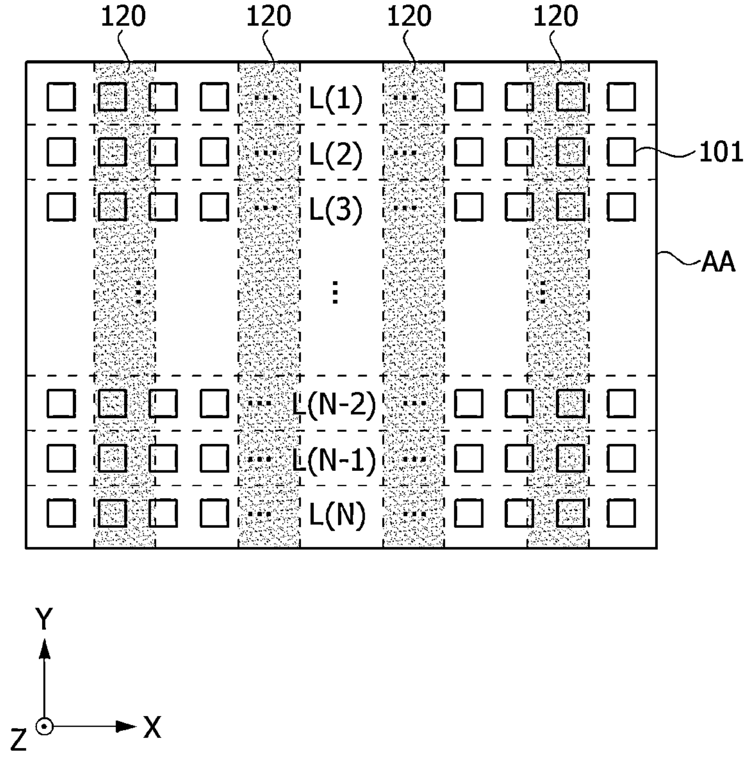

Referring to FIGS. 1A and 1B, a display device according to one embodiment of the present disclosure includes a display panel 100, a display panel driving circuit for writing pixel data to pixels 101 of the display panel 100, and a power supply 140 that generates power required to drive the pixels 101 and the display panel driving circuit.

A substrate of the display panel 100 may be a plastic substrate, a thin glass substrate, or a metal substrate, but is not limited thereto. The display panel 100 may be a rectangular panel having a length in an X-axis direction (or a first direction), a width in a Y-axis direction (or a second direction), and a thickness in a Z-axis direction (or a third direction), but is not limited thereto. For example, at least a portion of the display panel 100 may have a curved perimeter.

The display panel 100 may be implemented as a non-transmissive display panel or a transmissive display panel. The transmissive display panel may be applied to a transparent display device in which an image is displayed on a screen and a real object is visible beyond the display panel. The display panel 100 may be manufactured as a flexible display panel. In addition, the display panel 100 may be manufactured as a stretchable panel that can extend.

A display area AA of the display panel 100 includes a pixel array that displays an input image. The pixel array includes a plurality of data lines 102, a plurality of gate lines 103 intersecting the data lines 102, and the pixels 101 arranged in a matrix form. The display panel 100 may further include power lines connected in common to the pixels 101. The power lines are connected in common to the pixels 101 to supply the pixels with a constant voltage required to drive the pixels 101. The power lines may be implemented as long stripe wires along the first direction or the second direction, or as mesh wires in which wires in the first direction and wires in the second direction are electrically connected.

Each of the pixels 101 may be divided into a red sub-pixel, a green sub-pixel, and a blue sub-pixel for color implementation. Each of the pixels may further include a white sub-pixel. Each of the sub-pixels includes a pixel circuit for driving a light emitting element. The pixel circuits are connected to the data lines, the gate lines, and the power lines. Hereinafter, a "pixel" may be interpreted as a "sub-pixel".

The pixel array includes a plurality of pixel lines L1 to L(N). Each of the pixel lines L1 to L(N) includes one line of pixels arranged along a gate line direction (the X-axis direction) in the pixel array of the display panel 100. Pixels arranged in one pixel line may share the gate line 103. Pixels arranged in a column direction (the Y-axis direction) along a data line direction may share the same data line 102. One horizontal period is a time obtained by dividing one frame period by the total number of the pixel lines L1 to L(N).

The power supply 140 uses a DC-DC converter to generate a constant voltage (or a direct current (DC) voltage) required to drive the pixel array of the display panel 100 and the display panel driving circuit. The DC-DC converter may include a charge pump, a regulator, a buck converter, a boost converter, and the like. The power supply 140 may adjust the level of an input voltage inputted from a host system 200 to output constant voltages such as a gamma reference voltage, a data driving voltage, a gate low voltage, a gate high voltage, a pixel driving voltage, and a pixel base voltage. The gamma reference voltage and the data driving voltage are supplied to a data driver 110. The dynamic range of a data voltage outputted from the data driver 110 is determined by the voltage range of the gamma reference voltage. The dynamic range of the data voltage is a voltage range between the highest grayscale voltage and the lowest grayscale voltage. The data driving voltage is the voltage supplied to the VDD terminal of the output buffer from each of the channels of the data driver 110 to drive the output buffer.

The gate high voltage and the gate low voltage are supplied to a level shifter 150 and a gate driver 120. The constant voltages, such as the pixel driving voltage and the pixel base voltage, are supplied to the pixels 101 through the power lines connected in common to the pixels 101. The pixel driving voltage may be supplied to the display panel 100 from a main power source of the host system 200. In this case, the power supply 140 does not need to output the pixel driving voltage.

The display panel driving circuit writes pixel data of the input image to the pixels of the display panel 100 under the control of a timing controller 130. The display panel driving circuit includes the data driver 110 and the gate driver 120.

The display panel driving circuit may further include a touch sensor driver for driving touch sensors. The touch sensor driver is omitted in FIGS. 1A and 1B. The data driver 110 and the touch sensor driver may be integrated into a single drive integrated circuit (IC). The timing controller 130, the power supply 140, the level shifter 150, the data driver 110, the touch sensor driver, and the like may be further integrated into the drive IC.

The data driver 110 receives the pixel data of the input image received as a digital signal from the timing controller 130 and outputs the data voltage. The data driver 110 converts the pixel data of the input image into a gamma compensation voltage using a digital to analog converter (DAC) and outputs the data voltage. The gamma reference voltage is divided into gamma compensation voltages for each grayscale by a voltage divider circuit of the data driver 110 and supplied to the DAC. The DAC generates the data voltage with a gamma compensation voltage corresponding to a grayscale value of the pixel data. The data voltage outputted from the DAC is outputted to the data line 102 through an output buffer in each of data output channels of the data driver 110.

The gate driver 120 may be formed in the display panel 100 together with a TFT array of the pixel array and the wires. The gate driver 120 may be disposed in the non-display area NA outside the display area AA in the display panel 100, or at least a portion thereof may be disposed in the display area AA. For example, the gate driver 120 may be embedded within a display area AA as shown in FIG. 1B. In this case, the pixel circuits and light-emitting elements of the pixels 101 may overlap with the circuit of the gate driver 120 in the Z-axis direction of the display panel 100.

The gate driver 120 may be disposed in either a left non-display area NA or a right non-display area NA outside the display area AA in the display panel 100 to supply the gate signal to the gate lines 103 in a single feeding method. In the single feeding method, the gate signal is applied to one end of the gate lines. The gate driver 120 may be disposed in the left non-display area NA and the right non-display area NA in the display panel 100 to apply the gate signal to the gate lines 103 by a single feeding method or a double feeding method. In the double feeding method, the gate signal is applied simultaneously to both ends of the gate lines 103. At least some circuits of the gate driver 120 may be disposed within the display area AA.

The gate driver 120 may include a shift register and/or an edge trigger to output and shift pulses of the gate signal under the control of the timing controller 130. The gate driver 120 may output a plurality of gate signals with different waveforms. In this case, the gate driver 120 may include a plurality of gate drivers that output different gate signals.

The gate signal may include a scan signal SCAN and a light emission signal (hereinafter referred to as "EM signal") EM, as shown in FIGS. 3A to 5D. The scan signal SCAN may include a first scan signal SCAN1 and a second scan signal SCAN2, as shown in FIGS. 16 to 30. In this case, the gate driver may include a first gate driver that outputs the first scan signal SCAN1, a second gate driver that outputs the second scan signal SCAN2, and a third gate driver that outputs the EM signal. The EM signal may be set independently for each color of the sub-pixels to independently control the light-on time and light-off time of the light-emitting element for each color of the sub-pixels. Hereinafter, the EM signal independently set for each color of the sub-pixels will be referred to as "EM signal for each color".

The timing controller 130 receives the pixel data of the input image and a timing signal synchronized with the pixel data from the host system 200. The timing signal may include a vertical synchronization signal Vsync, a horizontal synchronization signal Hsync, and a data enable signal DE. The vertical sync signal Vsync indicates one frame period including a pulse generated once every frame period. Pulses of the horizontal synchronization signal Hsync and the data enable signal DE may be one horizontal period (1H). The timing controller 130 may determine one frame period (or vertical period) and a horizontal period by counting the data enable signal DE. In this case, the vertical synchronization signal Vsync and the horizontal synchronization signal Hsync may be omitted. The timing controller 130 may determine that the current frame period is how many frame periods by counting the rising edge or falling edge of the pulses in the start pulse of the timing signal Vsync, Hsync, and DE or a gate timing signal.

The timing controller 130 may control the operation timings of the data driver 110 and the gate driver 120 based on the timing signals Vsync, Hsync, and DE received from the host system 200. The gate timing control signal includes a start pulse and a clock to control the operation timings of the gate driver 120. The gate timing control signal output from the timing controller 130 may be input to the shift register of the gate driver 120 through the level shifter 150 and may be used to control the pulse of the gate signal output from the gate driver 120. The level shifter 150 may receive the gate timing control signal and generate a clock to provide it to the gate driver 120. The level shifter 150 may be mounted on a control printed circuit board (PCB) along with the timing controller 130 and the power supply 140, or it may be mounted on a source PCB that is electrically connected to a chip on film (COF) on which the data driver 110 is mounted. The input signal to the level shifter 150 is a signal of a digital signal voltage level. The clock output from the level shifter 150 may swing between the gate-high voltage and the gate-low voltage. A data timing control signal generated from the timing controller 130 is transmitted to the data driver 110.

The host system 200 may scale an image signal from a video source to match the resolution of the display panel 100, and may transmit it to the timing controller 130 together with the timing control signal.

Figure 2:
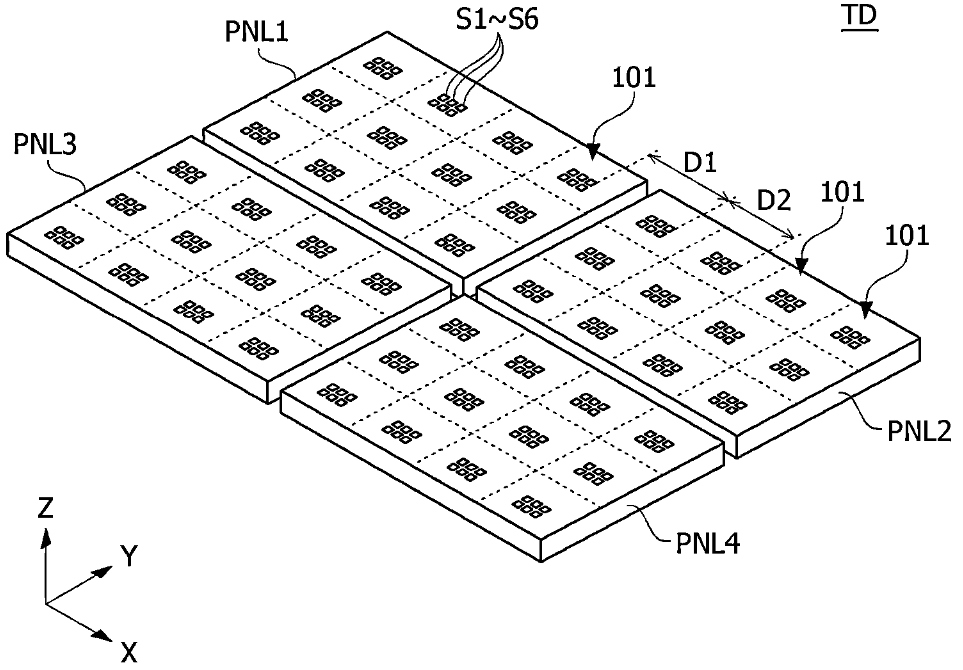
FIG. 2 is a diagram illustrating an example of a tiled display according to one embodiment of the present disclosure.

The display device may be implemented as a tiled display (TD) in which a plurality of display panels are combined in the same plane to provide a wide-screen, as shown in FIG. 2. Referring to FIG. 2, a wide-screen tiled display TD includes a plurality of display panels PNL1 to PNL4 disposed on an X-Y plane. When the non-display area NA is minimized at the outer periphery of each display panel PNL1 to PNL4, a wide-screen image may be reproduced with no visible seams between adjacent display panels PNL1 to PNL4. The gate driver 120 may be embedded in the display area AA of the display panels PNL1 to PNL4 such that the outer periphery non-display area NA of the display panels PNL1 to PNL4 may be minimized.

The display panels 100 may be assembled on a plane such that the distance D1 between the outermost pixels 101 adjacent at the boundaries between adjacent display panels PNL1 to PNL4 is substantially the same as the distance D2 between adjacent pixels 101 within the display area AA of each of the display panels PNL1 to PNL4. As a result, the distances D1 and D2 between the pixels 101 are the same throughout the wide-screen display area of the tiled display device TD, and thus a seam region is not visible.

The pixel 101 may include two sub-pixels for each color, as shown in FIGS. 3A to 5D.

Referring to FIGS. 3A to 5D, each of the pixels 101 includes first-first sub-pixel S1 (e.g., a primary first sub-pixel) and first-second sub-pixel S4 (e.g., a secondary first sub-pixel) which are adjacent in a second direction Y parallel to the data lines 1021 to 1026 and in which pixel data of first color is written, second-first sub-pixel S2 (e.g., a primary second sub-pixel) and second-second sub-pixel S5 (e.g., a secondary second sub-pixel) which are adjacent in the second direction Y and in which pixel data of second color is written, and third-first sub-pixel S3 (e.g., a primary third sub-pixel) and third-second sub-pixel S6 (e.g., a secondary third sub-pixel) which are adjacent in the second direction Y and in which pixel data of third color is written. The first color may be, but is not limited to, red, the second color may be green, and the third color may be blue. For example, the first-first and first-second sub-pixels S1 and S4 may be red sub-pixels SP_R to which a data voltage of red data is applied. The second-first and second-second sub-pixels S2 and S5 may be green sub-pixels SP_G to which a data voltage of the green data is applied. The third-first and third-second sub-pixels S3 and S6 may be blue sub-pixels SP_B to which a data voltage of the blue data is applied.

Each of the first-first, second-first, and third-first sub-pixels S1, S2, and S3 may be interpreted as a main sub-pixel. Each of the first-second, second-second, and third-second sub-pixels S4 and S5, and S6 may be interpreted as a redundancy sub-pixel or auxiliary sub-pixel. In FIGS. 3A to 5D, reference numerals "1021 to 1026" represent data lines to which data voltages (Vdata1 to Vdata6) are applied, and reference numerals "1031 to 1036" represent gate lines to which gate signals SCAN, EM_R, EM_G/B are applied.

Figure 3A:
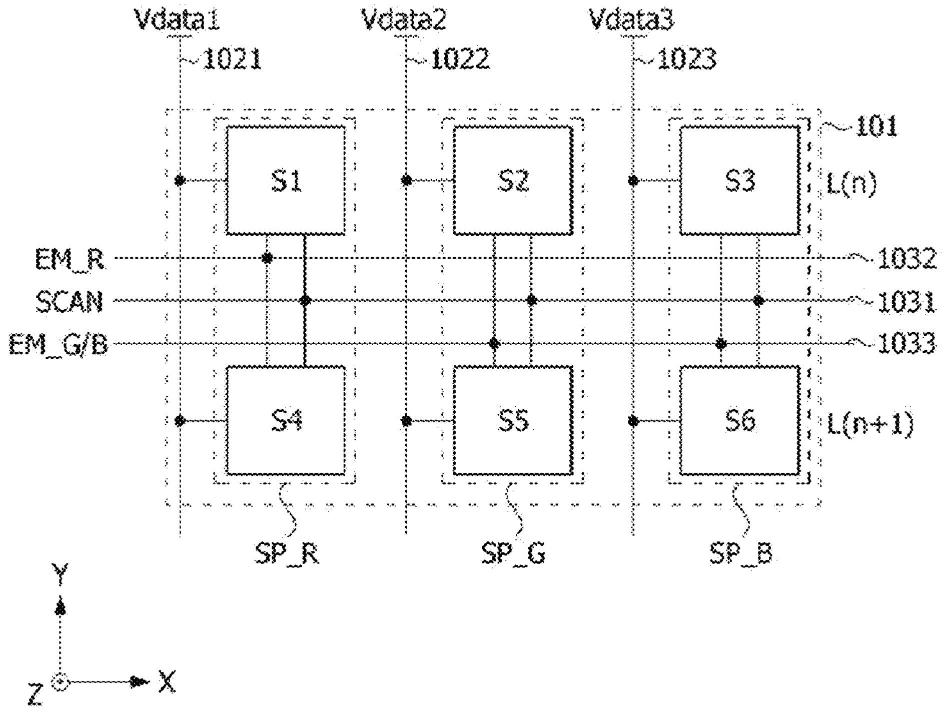
FIGS. 3A, 3B, 3C, 3D, 4A, 4B, 4C, 4D, 5A, 5B, 5C, and 5D are diagrams illustrating a unit pixel structure according to various embodiments of the present disclosure.
Figure 3B:
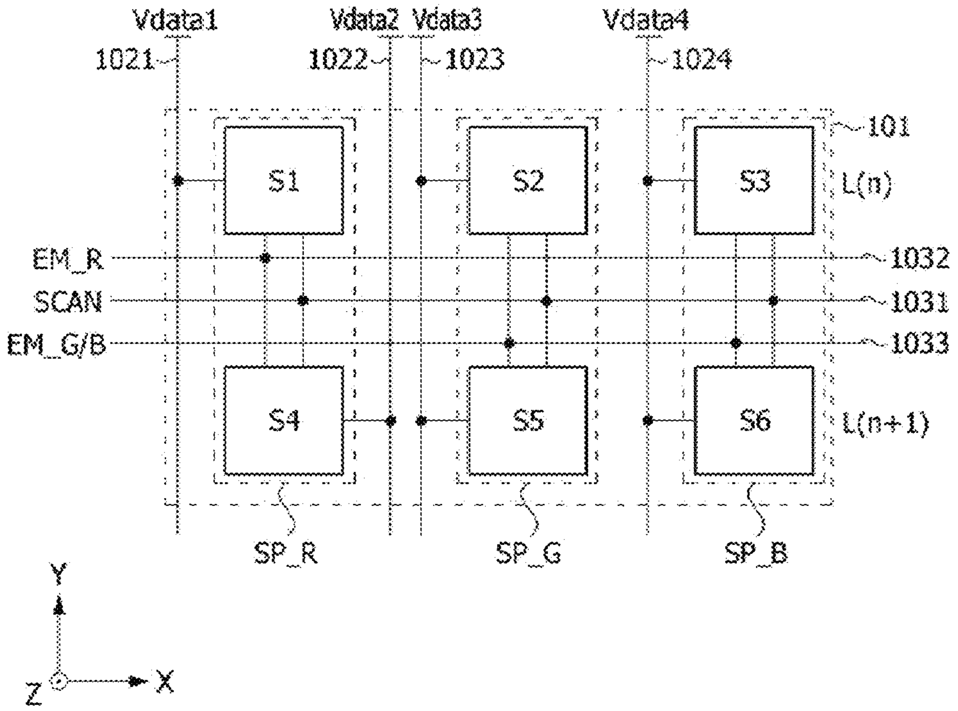
Figure 3C:
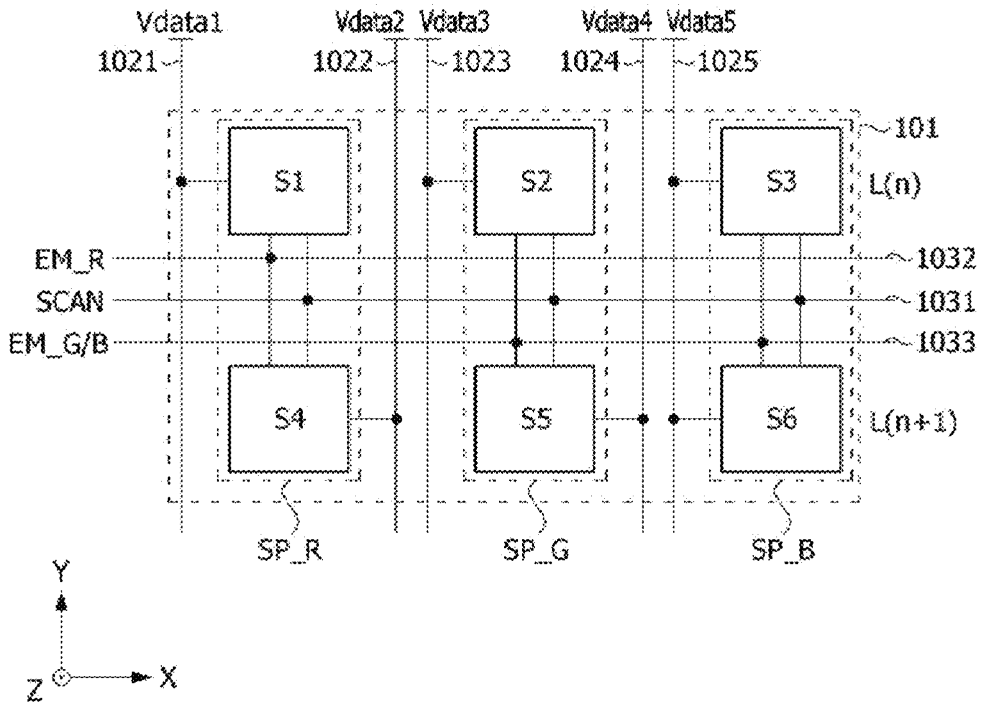
Figure 3D:
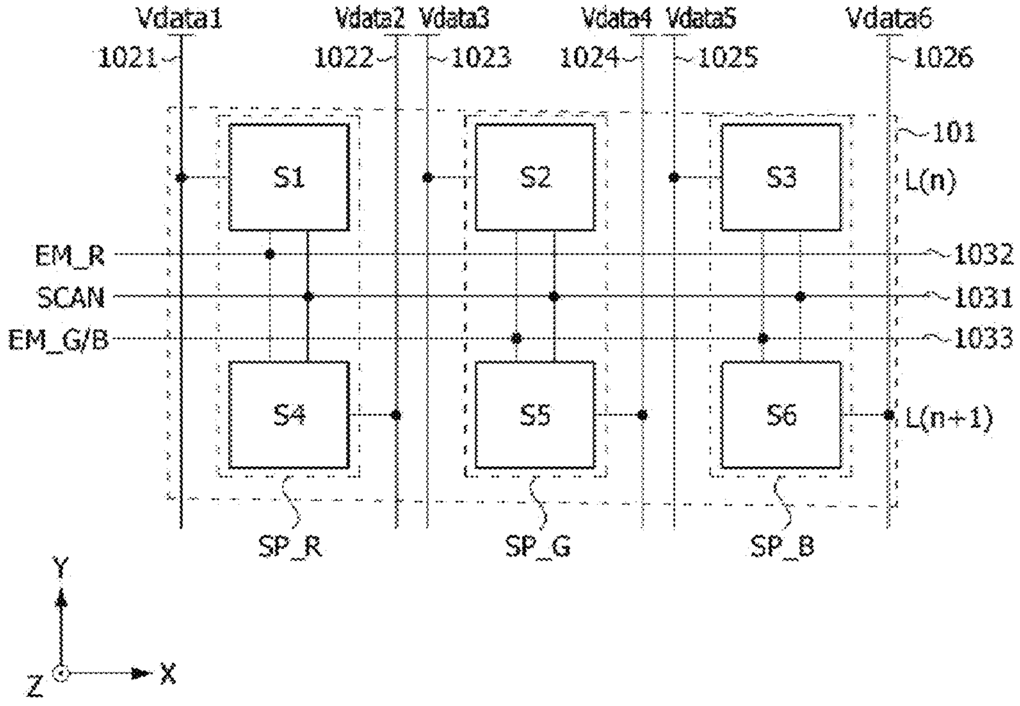
Figure 4A:
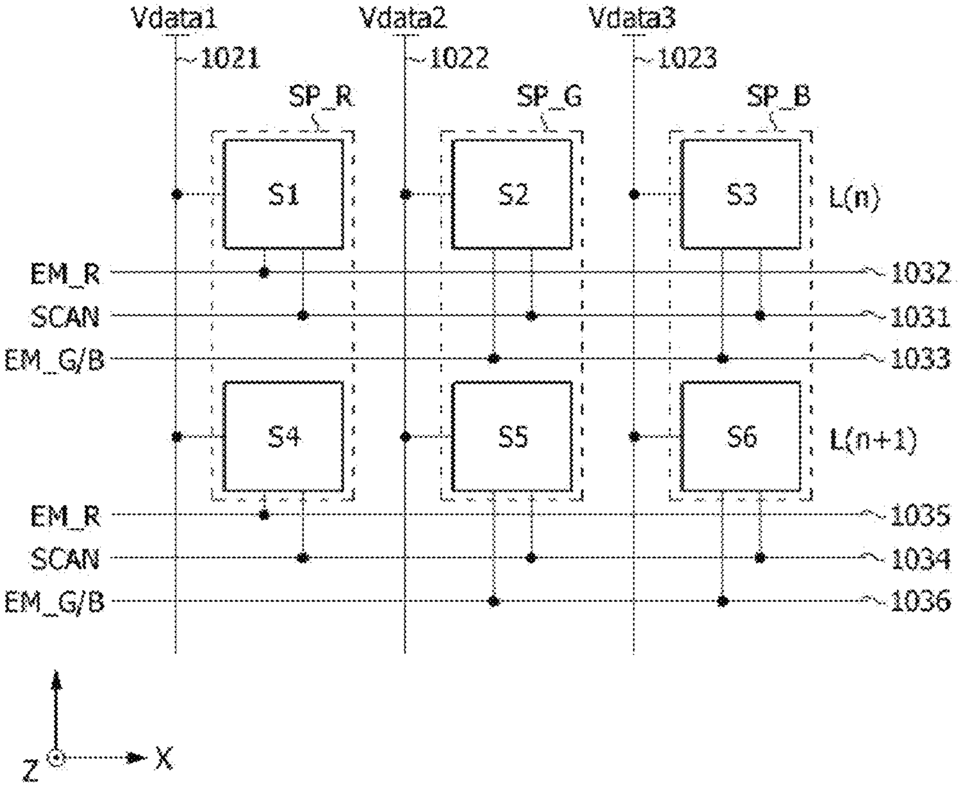
Figure 4B:
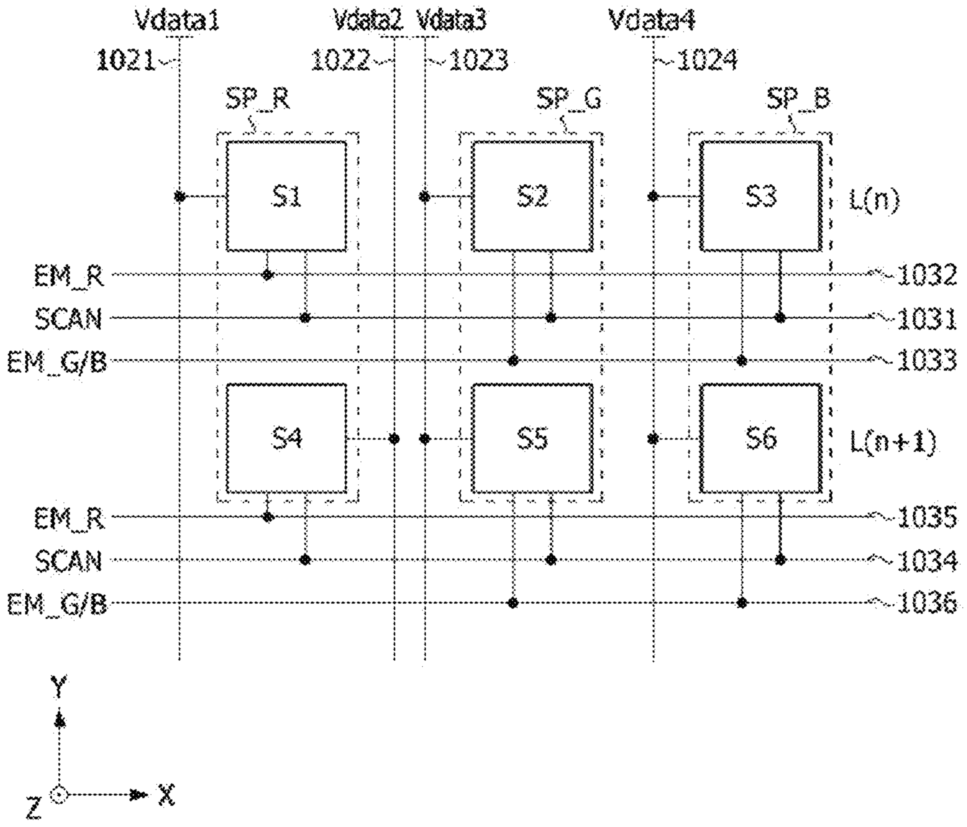
Figure 4C:
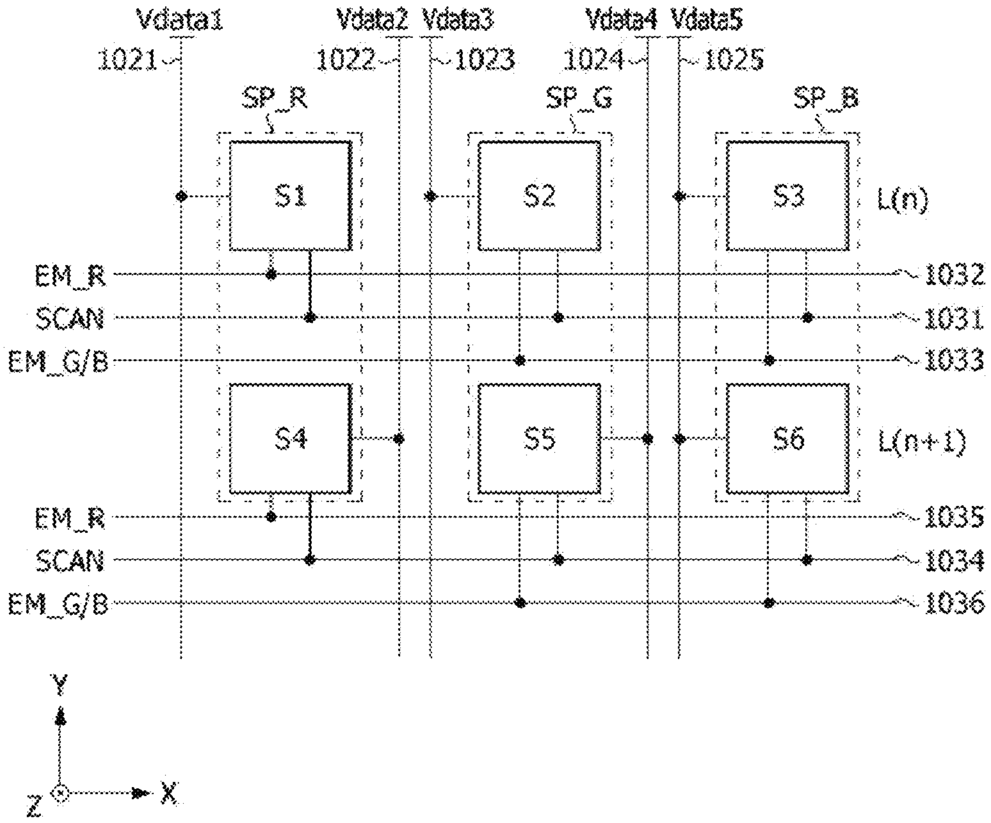
Figure 4D:
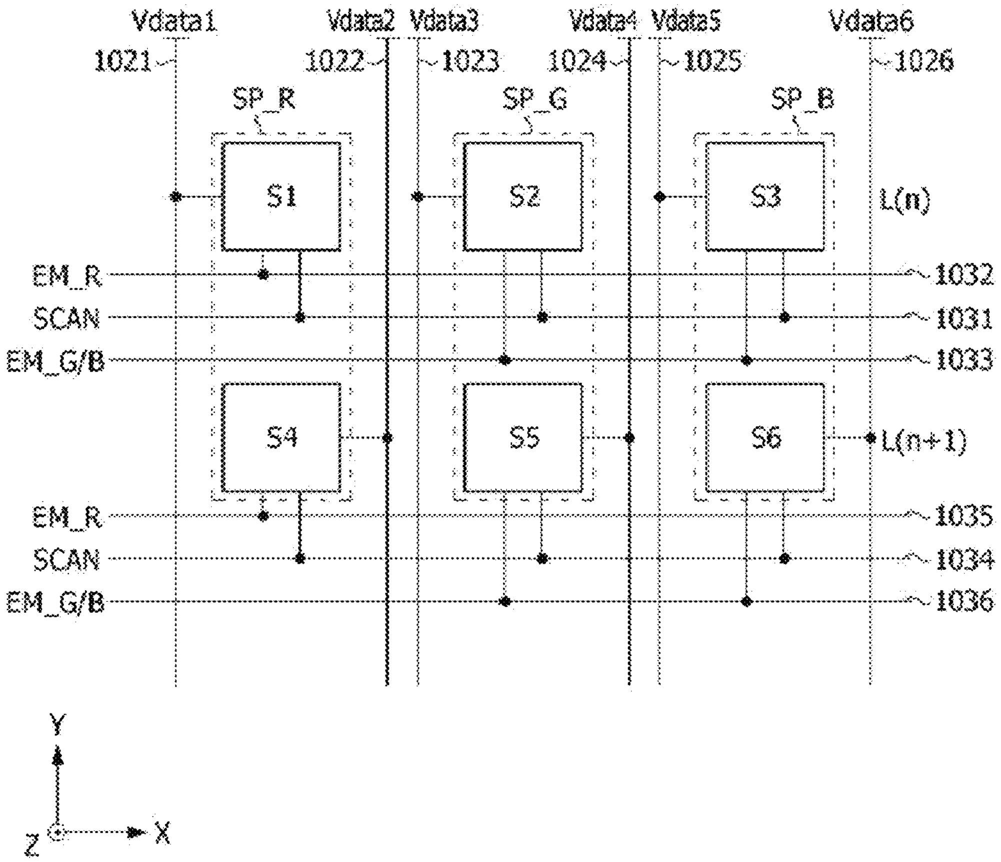

The sub-pixels S1 and S4 of the first color may be commonly connected to one data line 1021 to share the data line 1021, as shown in FIG. 3A, or may be connected to different data lines 1021 and 1022, respectively, as shown in FIGS. 3B, 3C, and 3D.

The sub-pixels S1 and S4 of first color may share gate lines 1031 and 1032 to which a scan signal SCAN and a first EM signal EM_R are applied, as shown in FIGS. 3A to 3D.

The sub-pixels S2 and S5 of second color may be commonly connected to one data line 1022 or 1023, as shown in FIGS. 3A and 3B, or may be connected to different data lines 1023 and 1024, respectively, as shown in FIGS. 3C and 3D.

The sub-pixels S3 and S6 of third color may be connected to one data line 1023, 1024, or 1025, as shown in FIGS. 3A to 3C, or to different data lines 1025 and 1026, respectively, as shown in FIG. 3D.

The sub-pixels S2, S3, S5, and S6 of the second and third colors may share gate lines 1031 and 1033 to which the scan signal SCAN and a second EM signal EM_G/B are applied, as shown in FIGS. 3A to 3D.

As shown in FIGS. 4A to 5D, the gate lines connected to the sub-pixels of the same color may be separated for each pixel line. For example, the sub-pixels S1, S2, and S3 arranged in an (n)th pixel line L(n) (where n is a natural number) may be connected to a first group of gate lines 1031, 1032, and 1033, and the sub-pixels S4, S5, and S6 arranged in an (n+1)th pixel line L(n+1) may be connected to a second group of gate lines 1034, 1035, and 1036. Thus, the sub-pixels of the same color are connected to different gate lines.

Referring to FIGS. 4A to 5D, the first group of gate lines 1031, 1032, and 1033 may include a first gate line (or scan line) 1031 to which the scan signal SCAN is applied, a second gate line 1032 to which a first EM signal EM_R is applied, and a third gate line 1033 to which the second EM signal EM_G/B is applied. The first gate line 1031 may include a gate line (or first scan line) to which the first scan signal SCAN1 is applied, and a gate line (or second scan line) to which the second scan signal SCAN2 is applied. The third gate line 1033 may include a first EM line to which the first EM signal EM_R is applied, and a second EM line to which the second EM signal EM_G/B is applied.

The second group of gate lines 1034, 1035, and 1036 may include a first gate line (or scan line) 1034 to which the scan signal SCAN is applied, a second gate line 1035 to which the first EM signal EM_R is applied, and a third gate line 1036 to which the second EM signal EM_G/B is applied. The first gate line 1034 may include a gate line (or first scan line) to which the first scan signal SCAN1 is applied, and a gate line (or second scan line) to which the second scan signal SCAN2 is applied. The third gate line 1036 may include a first EM line to which the first EM signal EM_R is applied, and a second EM line to which the second EM signal EM_G/B is applied.

The sub-pixels S1, S2, and S3 arranged in the (n)th pixel line L(n) may be connected to the first group of gate lines 1031, 1032, and 1033, and the sub-pixels S4, S5, and S6 arranged in the (n+1)th pixel line L(n+1) may be connected to the second group of gate lines 1034, 1035, and 1036. The gate lines 1032 and 1035 to which the first EM signal EM_R is applied may be connected to the sub-pixels S1 and S4 of first color, respectively. The gate lines 1033 and 1036 to which the second EM signal EM_G/B is applied may be connected to the sub-pixels S2, S3, S5, and S6 of second and third colors.

In the case where the gate lines are separated for each pixel line, the pixel lines are scanned in time division because the pulse of the scan signal output from the gate driver 120 is shifted along the scanning direction. In this case, the pixel data may be written sequentially between the sub-pixels of the same color within one pixel.

Since two sub-pixels are disposed for each color within one pixel 101, it is possible to effectively respond to the compensation of defects, luminance, and chrominance.

The main sub-pixel and the redundancy sub-pixel included in the sub-pixel of at least one color may be driven simultaneously, or only one of them may be driven. In addition, the main and redundancy sub-pixels may be driven alternately based on time.

In the case of micro-LEDs, defective sub-pixels may occur due to defective transfer of the micro-LEDs. In the case of micro-LEDs, micro-LED chips on a wafer may be transferred to a substrate on which pixel circuits are formed using a donor substrate without an LED binning process, which may result in contact defects among the micro-LEDs transferred to the substrate, or uneven luminance characteristics of the micro-LEDs.

In a repair process before shipping a product, a sub-pixel that emits light equal to or less than a predetermined reference value of the luminance of a pixel when measured may be determined to be a defective sub-pixel and may be turned into a dark point. In one example, if the light-emitting element of either of the first-first or first-second sub-pixels S1 or S4 for reproducing the pixel data of first color, or a pixel circuit driving the light-emitting element is defective, the pixel data of first color may be displayed using a sub-pixel that is normally driven. The sub-pixel turned into a dark point may be stored in a memory accessible to the timing controller 130 by recording its location information in a sub-pixel map. Pixel data may be weighted so that a normal sub-pixel that has the same color as the sub-pixel that is turned into a dark point can be driven at a target luminance.

The full-white luminance of each of the sub-pixels may be measured, and a luminance conversion look-up table according to the grayscale of each of the pixels 101 may be created and stored in a memory accessible by the timing controller 130. In two adjacent pixels, one of the two sub-pixels S1 and S4 emitted at a luminance of the same color, e.g., the first color, in a first pixel may emit at a target luminance of the first color, whereas the luminance of the first color in a second pixel may not reach the target luminance even though the maximum grayscale voltage is applied to each of the sub-pixels S1 and S4 in the second pixel. In this case, only one of the two sub-pixels S1 and S4 in the first pixel may be driven to emit at the target luminance of the first color, and both sub-pixels S1 and S4 in the second pixel may be driven to emit at the target luminance of the first color.

Due to the characteristics of the micro-LEDs, the luminous efficiency may be good when the current density is high. In this case, when the sub-pixels of the same color within one pixel are normally driven, only one of them may be selectively driven to increase the current density of the light-emitting element, thereby improving the luminous efficiency. When two sub-pixels of the same color that are normally driven are alternately driven at a cycle of a predetermined frame period, e.g., an I-frame period (where I is a natural number), each sub-pixel may be emitted at high luminous efficiency. For example, the light-emitting element of the first-first sub-pixel S1 may be emitted in the odd-numbered frame period, and the light-emitting element of the first-second sub-pixel S4 may be emitted in the even-numbered frame period.

Figure 14A:
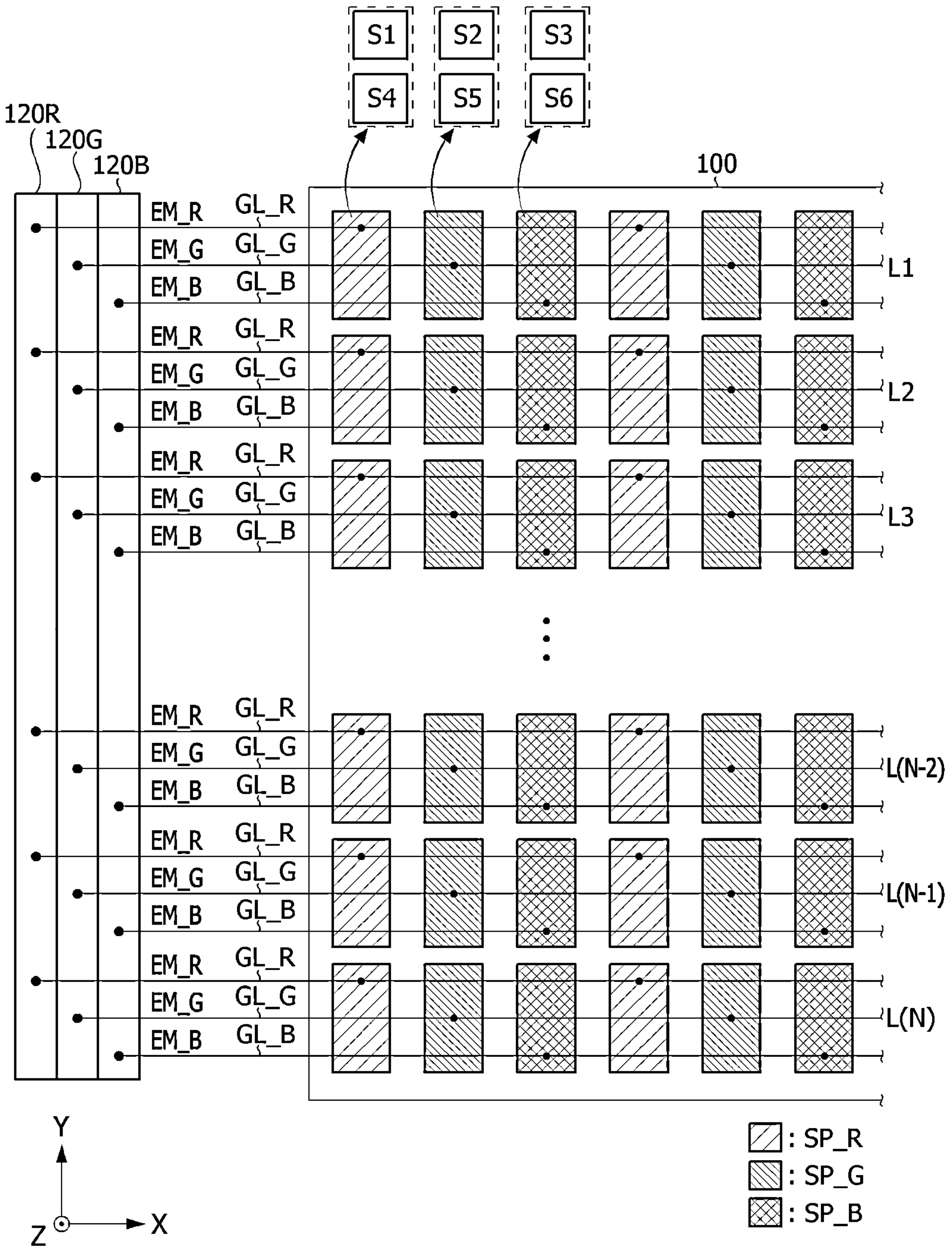
FIGS. 14A and 14B are diagrams illustrating another example of wire structures for applying color-specific light emission signals to sub-pixels according to one embodiment of the present disclosure.
Figure 14B:
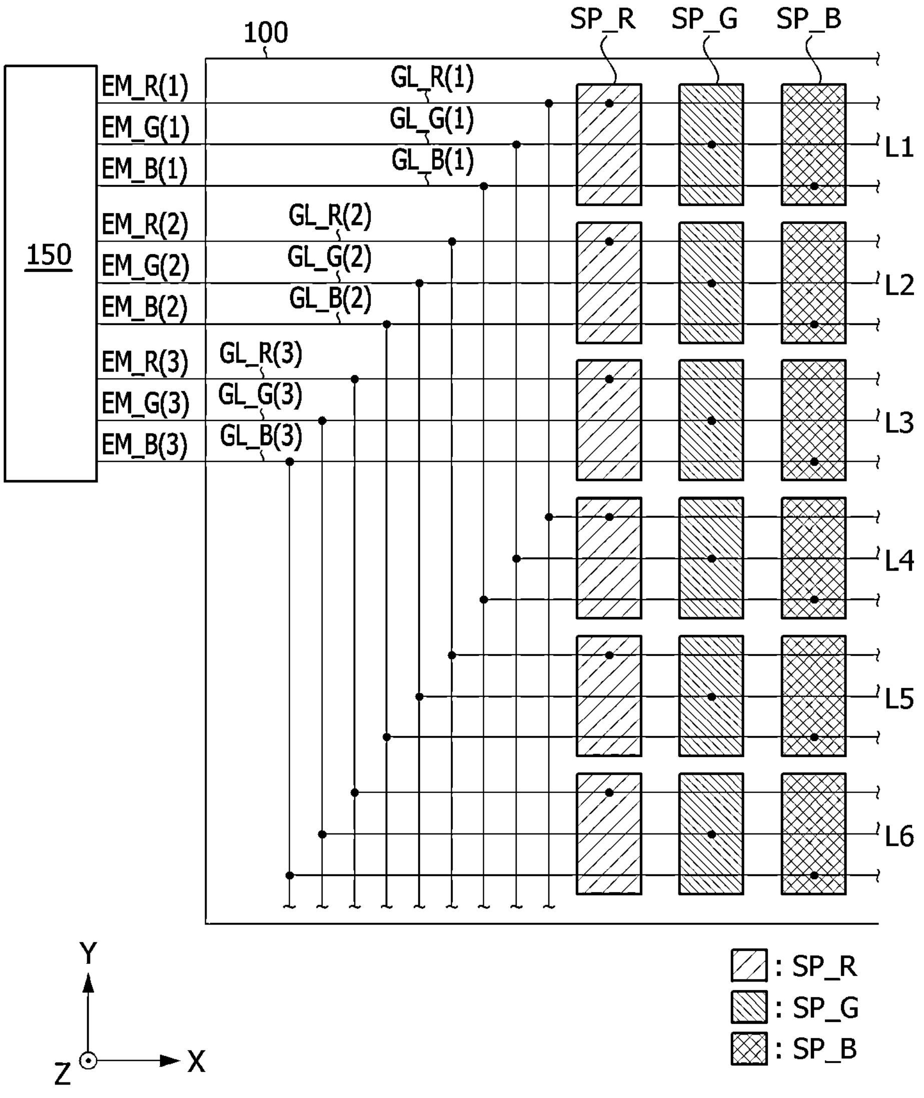
Figure 15:
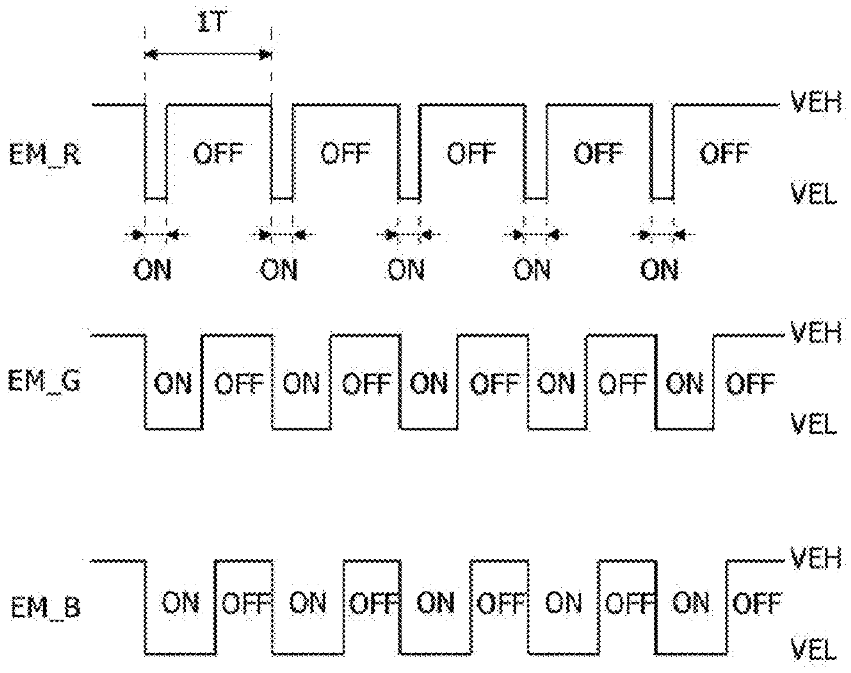
FIG. 15 is a waveform diagram illustrating an example of color-specific light emission signals shown in FIGS. 14A and 14B according to one embodiment of the present disclosure.

In FIGS. 3A to 5D, the second EM signal EM_G/B is commonly input to the sub-pixels S2, S3, S5, and S6 of the second and third colors, but not limited thereto. For example, as shown in FIGS. 14A, 14B and 15, the second EM signal EM_G may be input to the green sub-pixels SP_G, and the third EM signal EM_B may be input to the blue sub-pixels SP_B.

The third gate line may include the first EM line to which the first EM signal EM_R is applied, and the second EM line to which the second EM signal EM_G/B is applied. The first EM signal EM_R may be supplied to the first-first and the first second sub-pixels S1 and S4 through the first EM line 1032 connected to the sub-pixels S1 and S4. The second EM signal EM_G/B may be supplied to the second-first to third-second sub-pixels S2, S3, S5, and S6 through the second EM line 1033 connected to the sub-pixels S2, S3, S5, and S6.

As shown in FIGS. 5A to 5D, the sub-pixels in at least one color may be designed to be different from each other. For example, the driving transistor of the first-second sub-pixel S4 may have a smaller channel ratio than the driving transistor of the first-first sub-pixel S1. In this case, a low-grayscale expressiveness may be improved. For example, when the pixel data of the first color is low grayscale data in a predetermined low-grayscale range, the first-second sub-pixel S4 having a small channel current of the driving transistor may be driven. On the other hand, when the first-first sub-pixel S1 having a large channel current of the driving transistor is driven at an intermediate grayscale and a high grayscale, the light-emitting element may be emitted at a high luminance with a high luminous efficiency. 8-bit pixel data has 256 grayscale, ranging from 0 to 255. In this case, the low grayscale may be a grayscale having a grayscale value of 80 or less, but is not limited thereto.

Figure 6:
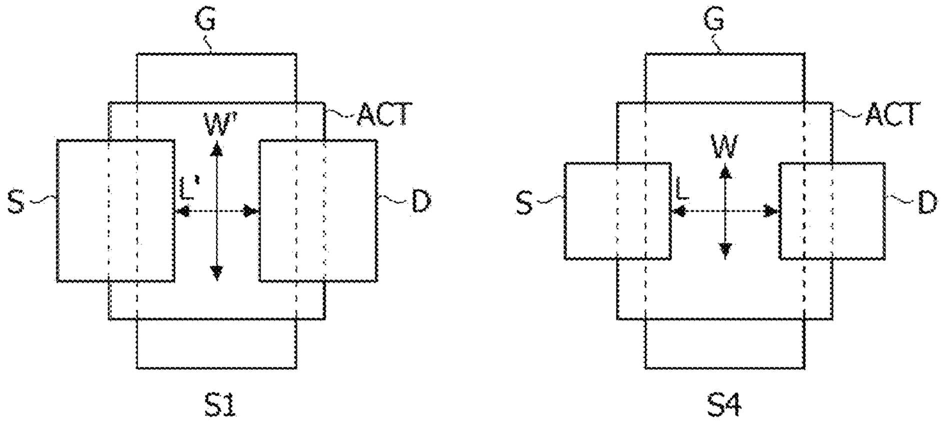
FIG. 6 is a diagram schematically illustrating an example in which the channel ratios of the driving transistors are different from each other according to one embodiment of the present disclosure.

FIG. 6 is a diagram schematically illustrating an example in which the channel ratios of the driving transistors are different from each other according to one embodiment.

Referring to FIG. 6, a driving transistor includes a gate electrode G, an active pattern ACT made of semiconductor, a first electrode S, and a second electrode D. When the driving transistor is turned on, a current flows through the channel between the first electrode S and the second electrode D on the active pattern ACT. The current may be regulated by the channel ratio W/L of the driving transistor.

The channel ratio W'/L' of the driving transistor disposed in the pixel circuit having the first-first sub-pixel S1 may be greater than the channel ratio W/L of the driving transistor disposed in the pixel circuit having the first-second sub-pixel S4. Where W and W' are the channel widths, and L and L' may be the channel lengths. If the channel width W is reduced or the channel length Lis increased in the driving transistor disposed in the first-second sub-pixel S4, the channel current is reduced, which may allow the current density of the light-emitting element to be reduced in the low grayscale of the pixel data.

Figure 7:
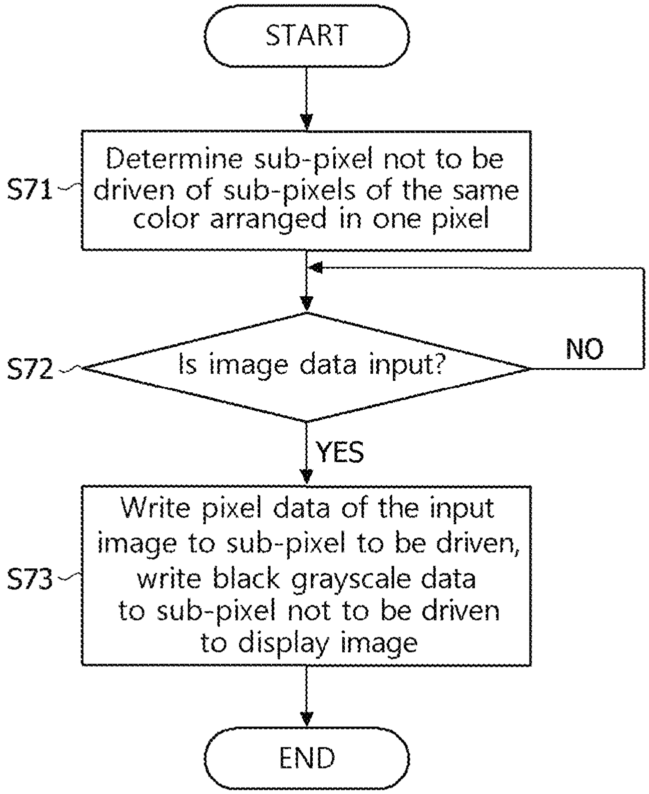
FIGS. 7, 8, and 9 are flowcharts illustrating a method of driving sub-pixels according to various embodiments of the present disclosure.
Figure 8:
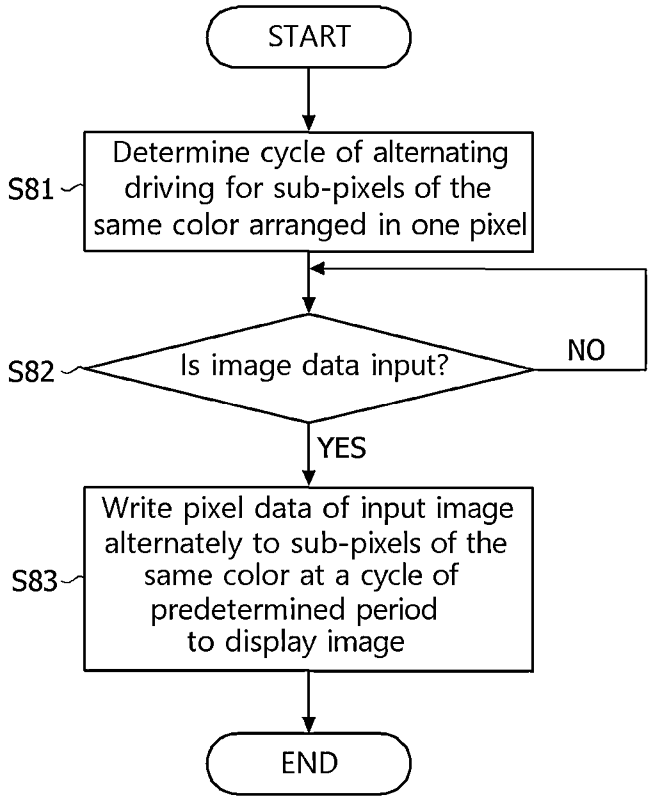
Figure 9:
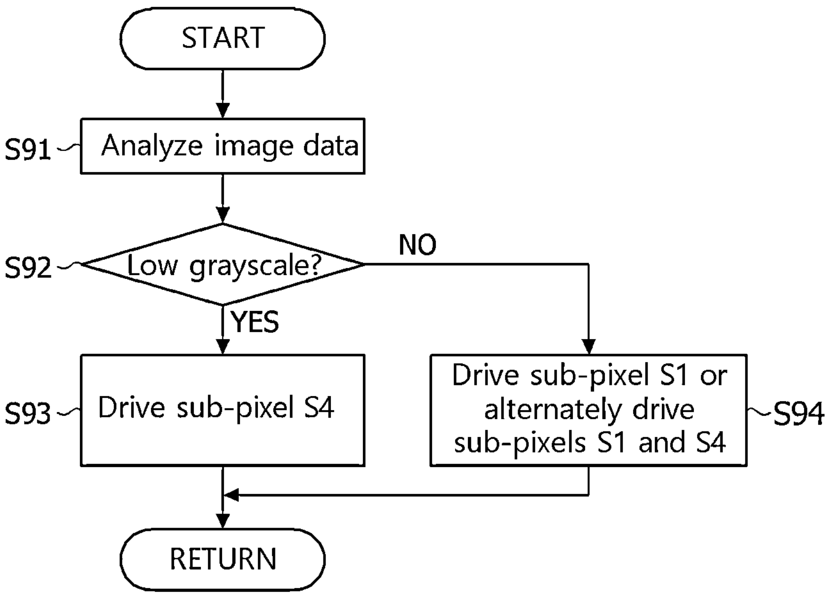

FIGS. 7 to 9 are flowcharts illustrating a method of driving sub-pixels according to various embodiments of the present disclosure.

Referring to FIGS. 3A to 5D, and FIG. 7, a sub-pixel to be driven and a sub-pixel not to be driven may be determined from sub-pixels of the same color arranged in one pixel 101 before shipping the product (S71). The sub-pixel to be driven is a sub-pixel into which pixel data of an input image is written and which is emitted at a target luminance corresponding to a grayscale of the corresponding pixel data. The pixel not to be driven is a defective sub-pixel that is turned into a dark point, or a sub-pixel that is not allowed to be driven for other reasons. The location information of the pixel not to be driven may be recorded in a sub-pixel map accessible by the timing controller 130 and stored in a memory.

When input image data is input to the timing controller 130, the timing controller 130 may read the sub-pixel map to determine whether the pixel data of a current input video is data to be written to the sub-pixel to be driven or the sub-pixel not to be driven. The pixel data of the input image may be written to the sub-pixel to be driven, and black grayscale data may be written to the sub-pixel not to be driven (S72 and S73). When a black grayscale voltage is applied to the driving transistor, the sub-pixel not to be driven is turned off and is not driven because a current to drive the light-emitting element is not generated from the driving transistor.

In step S73, the pixel data of the input image is transmitted to the data driver 110 for converting it to a data voltage, and the data voltage is supplied to the sub-pixels to be driven through the data lines. The timing controller 130 may add black grayscale data to be written to the non-driving sub-pixel to the input image data and transmit it to the data driver 110. The black grayscale data may be stored in an internal memory of the timing controller 130, independently of the pixel data of the input image. The black grayscale data is transmitted to the data driver 110 and is converted to a black grayscale voltage, which is fed to the sub-pixels to be driven through the data lines.

Referring to FIGS. 3A to 5D, and FIG. 8, a cycle of alternating driving for the sub-pixels of the same color arranged in one pixel 101 may be determined before shipping the product (S81). For example, the main sub-pixels S1, S2, and S3 and the redundancy sub-pixels S4, S5, and S6 may be alternately driven at a cycle of an I-frame period (where I is a natural number).

When the input image data is input to the timing controller 130, the timing controller 130 may control the data driver 110 and the gate driver 120 to alternately write the pixel data of the input image to the main sub-pixels S1, S2, and S3 and the redundancy sub-pixels S4, S5, and S6, thereby enabling the main sub-pixels S1, S2, and S3 and the redundancy sub-pixels S4, S5, and S6 to be alternately driven (S82 and S83). For example, the pixel data may be written to the main sub-pixels S1, S2, and S3 during an I-frame period, and then the pixel data may be written to the redundancy sub-pixels S4, S5, and S6 during a next I-frame period.

An alternating driving method of the sub-pixels will be described in detail as follows.

For the pixel 101 shown in FIGS. 3B to 3D, FIGS. 4B to 4D, and FIGS. 5B to 5D, in an (n)th horizontal period of a first frame period, the pulse of the scan signal SCAN may be applied to the main sub-pixels S1, S2, and S3 through the gate lines of the first group of gate lines 1031, 1032, and 1033, and the data voltage Vdata1 of red data synchronized with the pulse of the scan signal SCAN may be applied to the first-first sub-pixel S1 through the first data line 1021. Subsequently, in an (n+1) horizontal period of the first frame period, the pulse of the scan signal SCAN may be applied to the redundancy sub-pixels S4, S5, and S6 through the gate lines of the second group of gate lines 1034, 1035, and 1036, and a black grayscale voltage synchronized to the pulse of the scan signal SCAN may be applied to the first-second sub-pixels S4. As a result, in the first frame period, the first-first sub-pixel S1 of the first-first and first-second sub-pixels S1 and S4 of the red sub-pixel SP_R may be driven to emit light at the target luminance of the red data.

Subsequently, in an (n)th horizontal period of a second frame period, the pulse of the scan signal SCAN may be applied to the main sub-pixels S1, S2, and S3 through the gate lines of the first group of gate lines 1031, 1032, and 1033, and a black grayscale voltage synchronized with the pulse of the scan signal SCAN may be applied to the first-first sub-pixel S1 through the first data line 1021. Subsequently, in an (n+1)th horizontal period of the second frame period, the pulse of the scan signal SCAN may be applied to the redundancy sub-pixels S4, S5, and S6 through the gate lines of the second group of gate lines 1034, 1035, and 1036, and a data voltage Vdata2 of red data synchronized with the pulse of the scan signal SCAN may be applied to the first-second sub-pixels S4. As a result, in the second frame period, the first-second sub-pixels S4 of the first-first and first-second sub-pixels S1 and S4 of the red sub-pixel SP_R may be driven to emit light at the target luminance of the red data.

FIG. 9 is a flowchart illustrating an example of a method for driving the sub-pixels shown in FIGS. 5A to 5D according to one embodiment of the present disclosure.

Referring to FIGS. 5A to 5D, and FIG. 9, the timing controller 130 may analyze pixel data of the input image to determine a grayscale value of the pixel data (S91). When the red data is low grayscale data (e.g., the red data is less than a threshold value), the timing controller 130 may write the pixel data to the first-second sub-pixel S4 having a smaller driving transistors of the first-first and first-second sub-pixels S1 and S4, thereby driving the first-second sub-pixel S4 (S92 and S93). For the pixel shown in FIG. 5A, the data driver 110 may output a black grayscale voltage to the first data line 1021 when data is written to the sub-pixels S1, S2, and S3 of the (n)th pixel line L(n) under the control of the timing controller 130, and then output a data voltage Vdata1 of red data to the first data line 1021 when data is written to the sub-pixels S4, S5, and S6 of the (n+1)th pixel line L(n+1). For the pixel shown in FIGS. 5B to 5D, the data driver 110 may output a black grayscale voltage to the first data line 1021 when data is written to the sub-pixels S1, S2, and S3 of the (n)th pixel line L(n) under the control of the timing controller 130, and then output a data voltage Vdata1 of red data to the second data line 1022 when data is written to the sub-pixels S4, S5, and S6 of the (n+1)th pixel line L(n+1).

The timing controller 130 may write pixel data to the first-first sub-pixel S1 having the larger driving transistor of the first-first and first-second sub-pixels S1 and S4 to drive the first-first sub-pixel S1 when the red data is not the low grayscale data, for example, when the red data is mediate and high grayscale data (e.g., grayscale data above the threshold value). For the pixel shown in FIG. 5A, the data driver 110 may output a data voltage Vdata1 of red data to the first data line 1021 when data is written to the sub-pixels S1, S2, and S3 of the (n)th pixel line L(n) under the control of the timing controller 130, and then output a black grayscale voltage to the first data line 1021 when data is written to the sub-pixels S4, S5, and S6 of the (n+1)th pixel line L(n+1). For the pixel shown in FIGS. 5B to 5D, the data driver 110 may output a data voltage Vdata1 of red data to the first data line 1021 when data is written to the sub-pixels S1, S2, and S3 of the (n)th pixel line L(n) under the control of the timing controller 130, and then output a black grayscale voltage to the second data line 1022 when data is written to the sub-pixels S4, S5, and S6 of the (n+1)th pixel line L(n+1).

In another embodiment, the timing controller 130 may alternately drive the first-first sub-pixel S1 and the first-second sub-pixel S4 at a cycle of a predetermined frame period, for example, an I-frame period (where I is a natural number), when the red data is not low grayscale data (S94). An example of alternating driving of the first-first sub-pixel S1 and the first-second sub-pixel S4 is as follows.

Figure 5A:
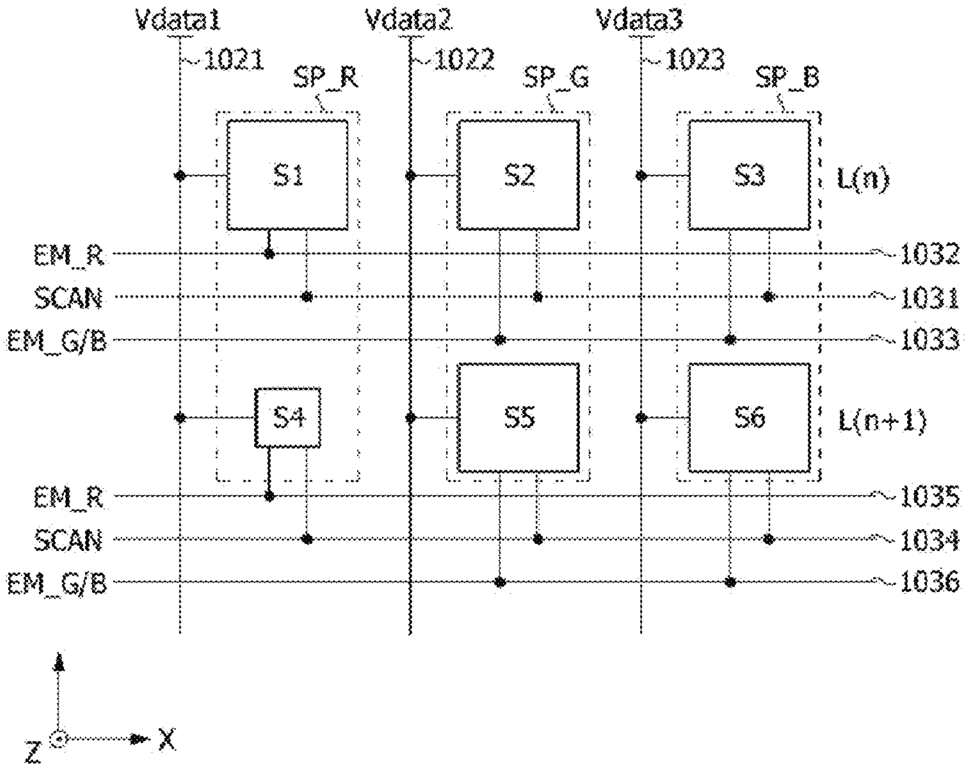

For the pixel shown in FIG. 5A, the data driver 110 may output a data voltage Vdata1 of red data to the first data line 1021 when data is written to the sub-pixels S1, S2, and S3 of the (n)th pixel line L(n) during an (n)th frame period under the control of the timing controller 130, and then output a black grayscale voltage to the first data line 1021 when data is written to the sub-pixels S4, S5, and S6 of the (n+1)th pixel line L(n+1). Subsequently, the data driver 110 may output a black grayscale voltage to the first data line 1021 when data is written to the sub-pixels S1, S2, and S3 of the (n)th pixel line L(n) during the (n+1)th frame period, and then output a data voltage Vdata1 of red data to the first data line 1021 when data is written to the sub-pixels S4, S5, and S6 of the (n+1)th pixel line L(n+1).

Figure 5B:
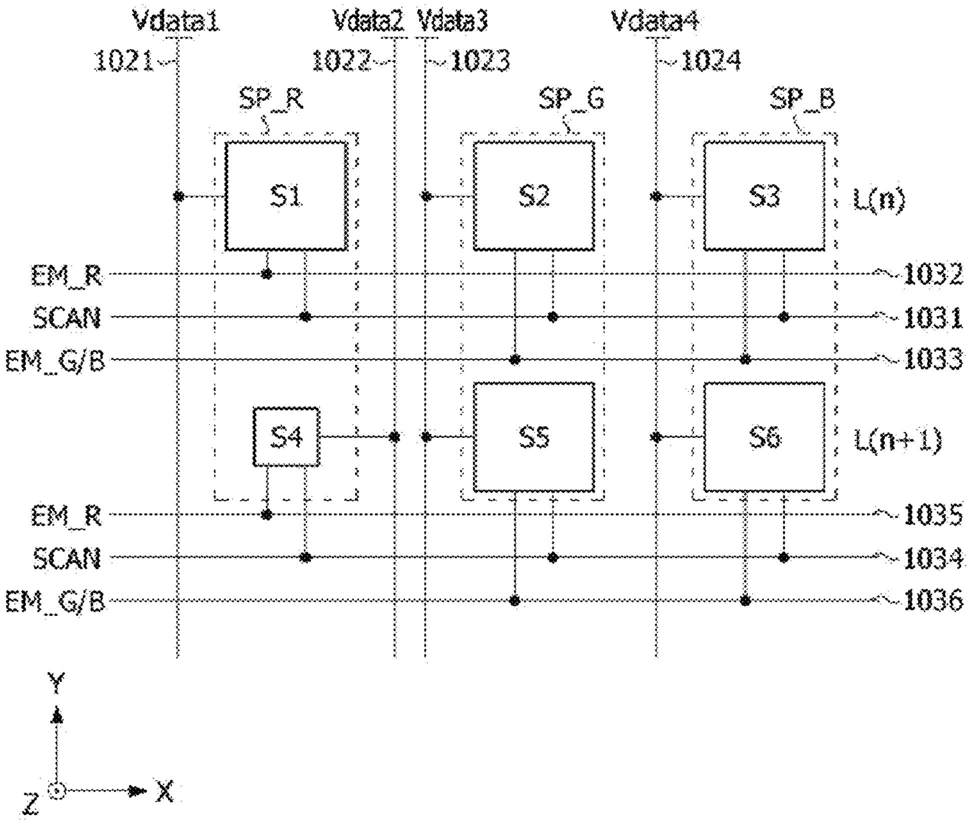
Figure 5C:
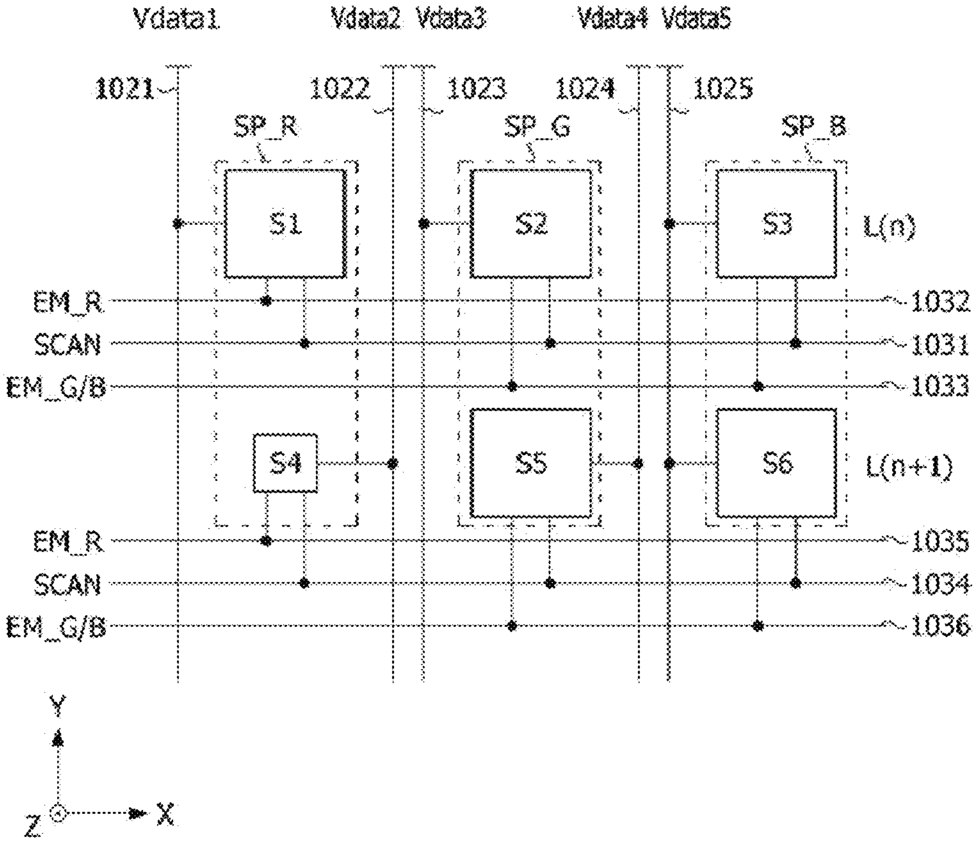
Figure 5D:
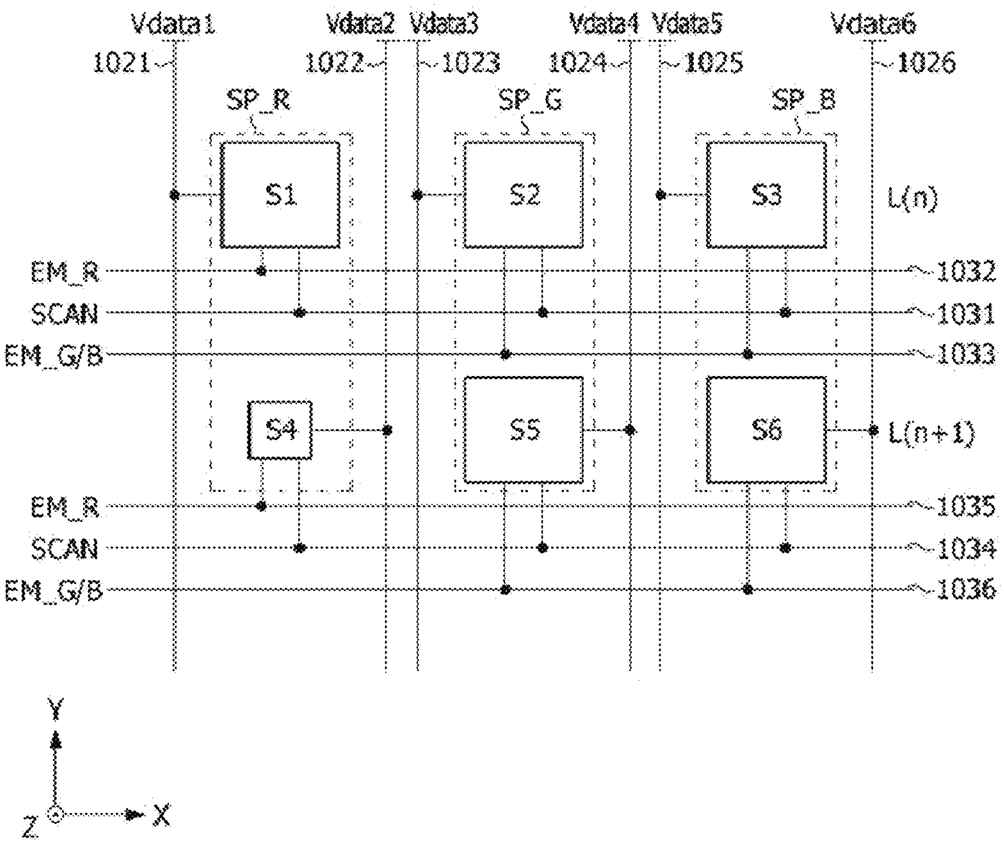

For the pixel shown in FIGS. 5B to 5D, the data driver 110 may output a data voltage Vdata1 of red data to the first data line 1021 when data is written to the sub-pixels S1, S2, and S3 of the (n)th pixel line L(n) during the (n)th frame period under the control of the timing controller 130, and then output a black grayscale voltage to the second data line 1022 when data is written to the sub-pixels S4, S5, and S6 of the (n+1)th pixel line L(n+1). Subsequently, the data driver 110 may output a black grayscale voltage to the first data line 1021 when data is written to the sub-pixels S1, S2, and S3 of the (n)th pixel line L(n) during the (n+1)th frame period, and then output a data voltage Vdata1 of red data to the first data line 1021 when data is written to the sub-pixels S4, S5, and S6 of the (n+1)th pixel line L(n+1).

Figure 10:
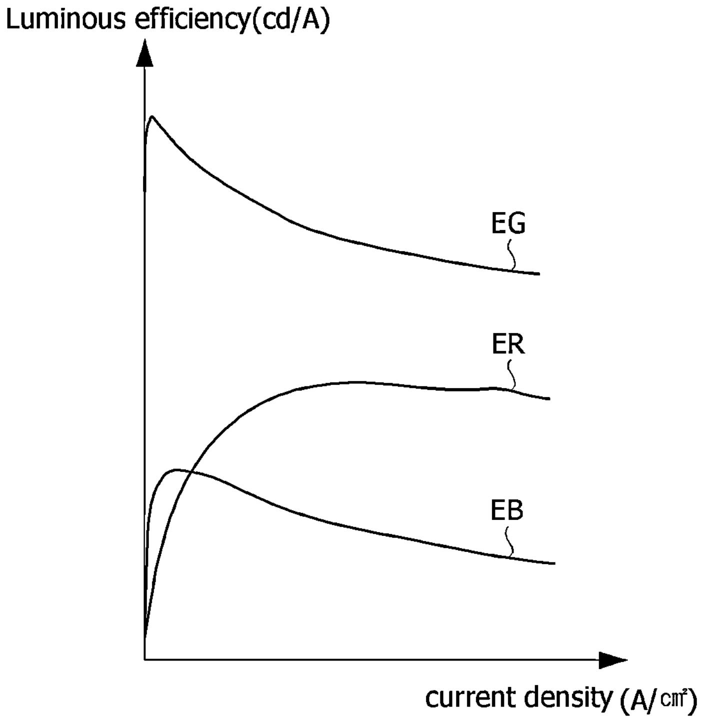
FIG. 10 is a diagram illustrating the difference in luminous efficiency of light-emitting elements for each color according to one embodiment of the present disclosure.

FIG. 10 is a diagram illustrating the difference in luminous efficiency of light-emitting devices for each color according to one embodiment of the present disclosure.

Referring to FIG. 10, the red light-emitting element, the green light-emitting element, and the blue light-emitting element may have different luminous efficiencies (cd/A) depending on the current density ($A/cm^2$). For example, the luminous efficiency of the red light-emitting element ER may be driven to maximum luminous efficiency at a higher current density compared to those of the green and blue light-emitting elements. In contrast, the luminous efficiency of green light-emitting element EG and the luminous efficiency of blue light-emitting element EB may be emitted to maximum luminous efficiency at a relatively low current density. The current density of the light-emitting elements is determined by the amount of current, which depends on the gate-source voltage of the driving transistor. The gate-source voltage of the driving transistor may be controlled by the data voltage applied to the gate electrode of the driving transistor.

As can be seen from FIG. 10, because the luminous efficiency may vary according to the current density for each color of the light-emitting elements, it is necessary to optimize the driving conditions of the sub-pixels of each color so that the light-emitting element of each color can be driven at an optimal luminous efficiency. The present disclosure may set the data voltage and the light emission time of the light-emitting element independently for each color so that the light-emitting element of each color may be driven at an optimal light emitting efficiency. To increase the luminous efficiency of each of the red light-emitting element, the green light-emitting element, and the blue light-emitting element, the data voltage may be independently set for each color as shown in FIG. 11.

The color-specific luminous efficiency characteristics of the light-emitting elements are not limited to FIG. 10. For example, the color-specific luminous efficiency characteristics of a light-emitting elements may vary depending on the manufacturer or material properties of the light-emitting elements. In the present disclosure, each of the light-emitting elements is driven at maximum luminous efficiency with respect to the color-specific luminous efficiency characteristics of the light-emitting element, but the deterioration in image quality caused by the driving to the maximum luminous efficiency may be minimized by using EM signals distinguished for each color.

Figure 11:
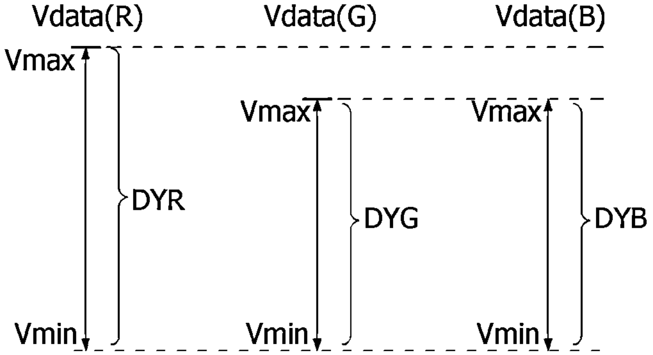
FIG. 11 is a diagram illustrating an example of color-specific data voltages according to one embodiment of the present disclosure.

FIG. 11 is a diagram illustrating an example of color-specific data voltages according to one embodiment of the present disclosure.

Referring to FIG. 11, the data voltage output from the data driver 110 may include at least a red data voltage Vdata(R), a green data voltage Vdata(G), and a blue data voltage Vdata(B). The red data voltage Vdata(R) may be applied to a red sub-pixel. The green data voltage Vdata(G) may be applied to a green sub-pixel. The blue data voltage Vdata(B) may be applied to a blue sub-pixel.

The maximum voltage Vmax (e.g., a maximum possible voltage) of the red data voltage Vdata(R) may be set to a voltage higher than the maximum voltage Vmax of the green and blue data voltages Vdata(G) and Vdata(B). The minimum voltage Vmin of the red data voltage Vdata(R) may be set to a voltage equal to or higher than the minimum voltage Vmin of the green and blue data voltages Vdata(G) and Vdata(B). The dynamic range DYR of the red data voltage Vdata(R), that is, the voltage range between the minimum voltage Vmin and the maximum voltage Vmax, may be greater than the dynamic ranges DYG and DYB of the green and blue data voltages Vdata(G), Vdata(B). The dynamic range of the data voltages DYR, DYG, and DYB is the voltage range between the minimum voltage Vmin and the maximum voltage Vmax.

The maximum voltage Vmax of the blue data voltage Vdata(B) may be set to a voltage equal to or higher than the maximum voltage Vmax of the green data voltage Vdata(G). The minimum voltage Vmin of the blue data voltage Vdata (B) may be set to a voltage equal to or higher than the minimum voltage Vmin of the green data voltage Vdata(G).

When driving each of the red light-emitting element, the green light-emitting element, and the blue light-emitting element in the maximum light-emitting efficiency region, excess luminance may occur in a certain color, which may cause the color coordinates and white balance to deviate from target values. The present disclosure may optimize the color coordinates and white balance and optimize the luminous efficiency to realize low power driving by individually controlling the rates of the light-on intervals of the red light-emitting element, the green light-emitting element, and the blue light-emitting element by the duty ratio of the EM signal set independently for each color.

Figure 12A:
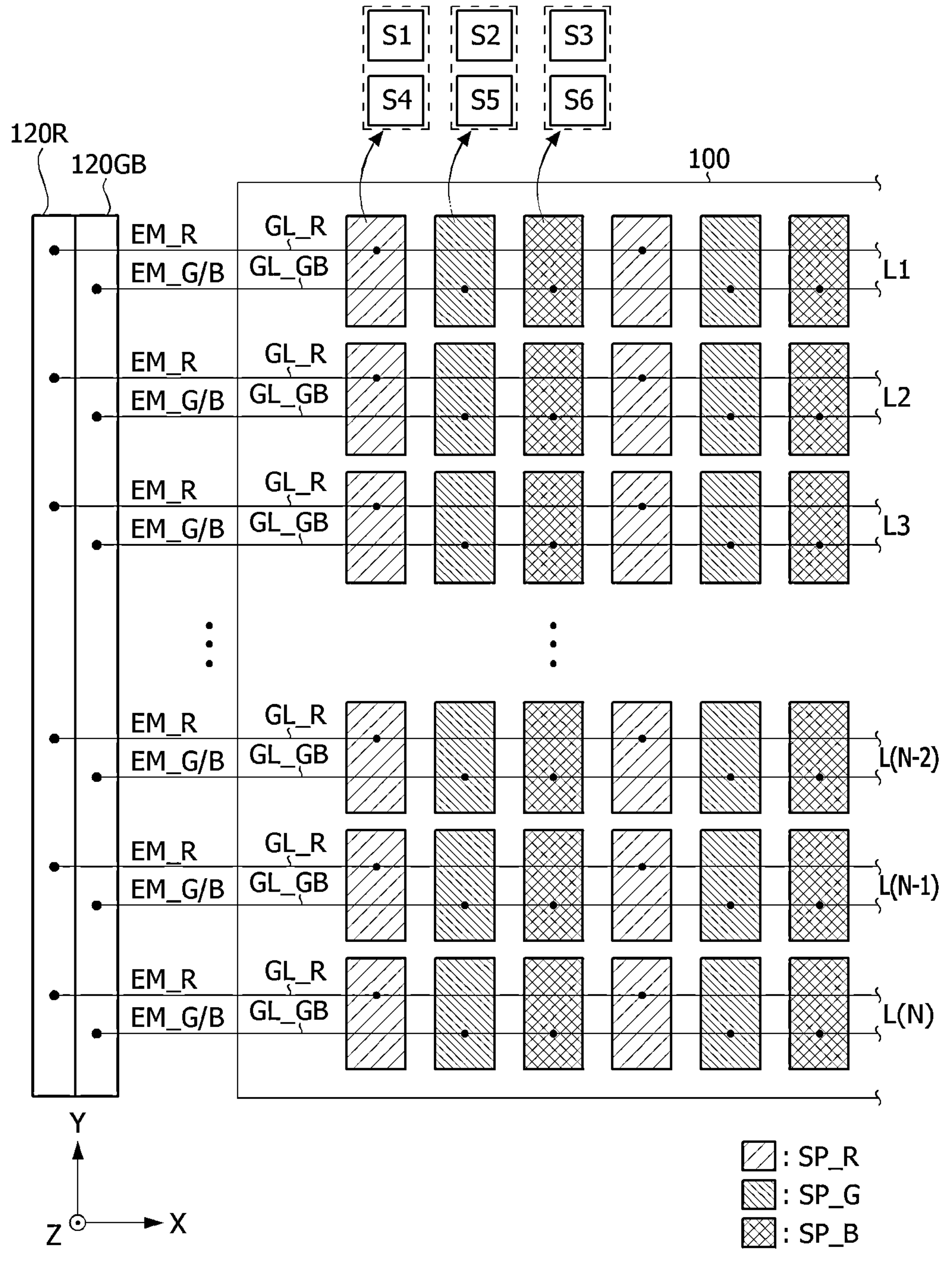
FIGS. 12A and 12B are diagrams illustrating one example of a wire structure for applying color-specific light emission signals to sub-pixels according to one embodiment of the present disclosure.
Figure 12B:
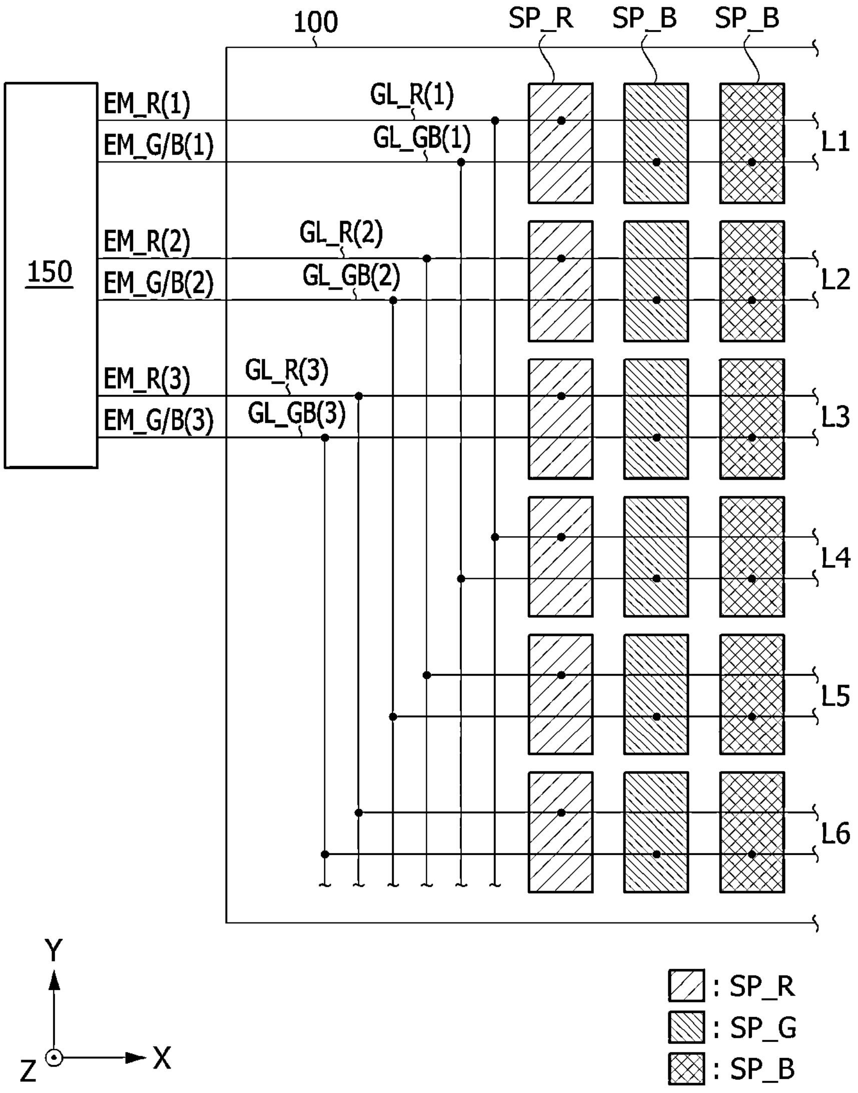
Figure 13:
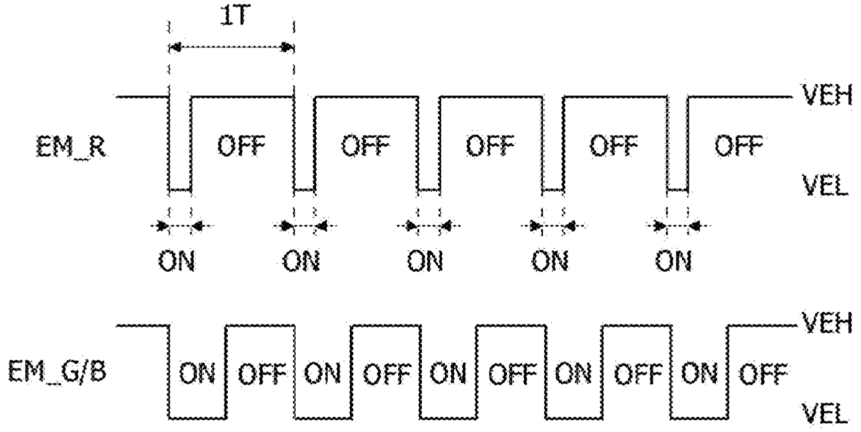
FIG. 13 is a waveform diagram illustrating an example of color-specific light emission signals shown in FIGS. 12A and 12B according to one embodiment of the present disclosure.

FIGS. 12A and 12B are diagrams illustrating one example of a wire structure for applying the color-specific EM signals to the sub-pixels according to one embodiment of the present disclosure. FIG. 13 is a waveform diagram illustrating an example of the color-specific EM signals shown in FIGS. 12A and 12B according to one embodiment of the present disclosure.

Referring to FIGS. 12A and 13, the gate driver 120 may include a first EM driver 120R that outputs the first EM signal EM_R, and a second EM driver 120GB that outputs the second EM signal EM_G/B.

The first EM driver 120R may output the first EM signal EM_R to the first EM lines GL_R connected to the red sub-pixels SP_R while shifting the pulse of the first EM signal EM_R. Each of the first EM lines GL_R may be arranged one for each of the pixel lines L1 to L(N), or may be connected to two or more pixel lines by a common wire. The second EM driver 120GB may output the second EM signal EM_G/B to the second EM lines GL_G/B connected to the green sub-pixels SP_G and blue sub-pixels SP_B while shifting the pulse of the second EM signal EM_G/B. Each of the second EM lines GL_G may be arranged one for each of the pixel lines L1 to L(N), or may be connected to two or more pixel lines by common wire.

The light-on duty ratio of the first EM signal EM_R may be smaller than that of the second EM signal EM_G/B. The light-on duty ratio is the ratio of the light-on interval (ON) of the EM signals EM_R and EM_G/B within one pulse period (IT). The light-on interval (ON) of the EM signals EM_R and EM_G/B may be an interval of the gate-on voltage VEL, and the light-off interval (OFF) is an interval of the gate-off voltage VEH. When the light-on duty ratio of the EM signal EM_R and EM_G/B is small, the light-on interval of the light-emitting element is reduced, so that the luminance of the corresponding sub-pixel may be controlled to be low. The excess luminance caused by increasing the data voltage of red data in order to raise the driving efficiency of the light-emitting element of red color is lowered by reducing the light-on interval of the light-emitting element of red color by using the first EM signal EM_R having a relatively small light-on duty ratio. Since the EM signals EM_R and EM_G/B are independent for each color, the light-on duty ratio of the light-emitting element may be freely controlled for each color.

The color-specific EM signals EM_R and EM_G/B may be output from the level shifter 150, as shown in FIG. 12B, rather than being applied to the sub-pixels through the gate driver.

Referring to FIGS. 12B and 13, the level shifter 150 may receive the gate timing signal from the timing controller 130 and output color-specific EM signals EM_R(1) to (3) and EM_G/B(1) to (3).

First color-specific EM signals EM_R(1) and EM_G/B(1) may be applied to the sub-pixels of the first group of pixel lines, e.g., the sub-pixels of first and fourth pixel lines L1 and L4, through EM lines GL_R(1) and GL_G/B(1) commonly connected to the sub-pixels, respectively. A first EM line GL_R(1), to which a first EM signal EM_R(1) is applied, may be connected to the red sub-pixels SP_R. A second EM line GL_G/B(1), to which a second EM signal EM_G/B(1) is applied, may be connected to the green and blue sub-pixels SP_G and SP_B.

Second color-specific EM signals EM_R(2) and EM_G/B(2) may be applied to the sub-pixels of the second group of pixel lines, e.g., the sub-pixels of the second and fifth pixel lines L2 and L5, through EM lines GL_R(2) and GL_G/B(2) commonly connected to the sub-pixels, respectively. A first EM line GL_R(2), to which a first EM signal EM_R(2) is applied, may be connected to the red sub-pixels SP_R. A second EM line GL_G/B(2), to which a second EM signal EM_G/B(2) is applied, may be connected to the green and blue sub-pixels SP_G and SP_B.

Third color-specific EM signals EM_R(3) and EM_G/B(3) may be applied to the sub-pixels of the third group of pixel lines, e.g., the sub-pixels of the third and sixth pixel lines L3 and L6, through EM lines GL_R(3) and GL_G/B(3) commonly connected to the sub-pixels, respectively. A first EM line GL_R(3), to which a first EM signal EM_R(3) is applied, may be connected to the red sub-pixels SP_R. A second EM line GL_G/B(3), to which a second EM signal EM_G/B(3) is applied, may be connected to the green and blue sub-pixels SP_G and SP_B.

FIGS. 14A and 14B are diagrams illustrating other examples of wire structures for applying the color-specific EM signals to the sub-pixels according to one embodiment of the present disclosure. FIG. 15 is a waveform diagram illustrating an example of color-specific EM signals shown in FIGS. 14A and 14B according to one embodiment of the present disclosure.

Referring to FIGS. 14A and 15, the gate driver 120 may include a first EM driver 120R that outputs a first EM signal EM_R, a second EM driver 120G that outputs a second EM signal EM_G, and a third EM driver 120B that outputs a third EM signal EM_B.

The first EM driver 120R may output the first EM signal EM_R to the first EM lines GL_R connected to the red sub-pixels SP_R while shifting the pulse of the first EM signal EM_R. Each of the first EM lines GL_R may be arranged one for each of the pixel lines L1 to L(N), or may be connected to two or more pixel lines by a common wire. The second EM driver 120G may output the second EM signal EM_G to the second EM lines GL_G connected to the green sub-pixels SP_G while shifting the pulse of the second EM signal EM_G. Each of the second EM lines GL_G may be arranged one for each of the pixel lines L1 to L(N), or may be connected to two or more pixel lines by common wiring. The third EM driver 120B may output the third EM signal EM_B to the third EM lines GL_B connected to the blue sub-pixels SP_B while shifting the pulses of the third EM signal EM_B. Each of the third EM lines GL_B may be arranged one for each of the pixel lines L1 to L(N), or may be connected to two or more pixel lines by common wire.

The light-on duty ratio of the first EM signal EM_R may be smaller than those of the second EM signal EM_G and the third EM signal EM_B. Since the EM signals EM_R, EM_G, and EM_B are independent for each color, the lighting-up duty ratio of the light-emitting element may be freely controlled for each color. For example, the light-on duty ratio of the third EM signal EM_B may be controlled to be greater than that of the first EM signal EM_R and less than that of the second EM signal EM_G.

The color-specific EM signals EM_R, EM_G, and EM_B may be output from the level shifter 150, as shown in FIG. 14B, rather than being applied to the sub-pixels through the gate driver.

Referring to FIG. 14B and FIG. 15, the level shifter 150 may receive the gate timing signal from the timing controller 130 and output color-specific EM signals EM_R(1) to (3), EM_G(1) to (3), and EM_B(1) to (3).

First color-specific EM signals EM_R(1), EM_G(1), and EM_B(1) may be applied to the sub-pixels of the first group of pixel lines, e.g., the sub-pixels of first and fourth pixel lines L1 and L4, through EM lines GL_R(1), GL_G(1), and GL_B(1) commonly connected to the sub-pixels, respectively. A first EM line GL_R(1), to which a first EM signal EM_R(1) is applied, may be connected to the red sub-pixels SP_R. A second EM line GL_G(1), to which a second EM signal EM_G(1) is applied, may be connected to the green sub-pixels SP_G. A third EM line GL_B(1), to which a third EM signal EM_B(1) is applied, may be connected to the blue sub-pixels SP_B.

Second color-specific EM signals EM_R(2), EM_G(2), and EM_B(2) may be applied to the sub-pixels of the second group of pixel lines, e.g., the sub-pixels of second and fifth pixel lines L2 and L5, through EM lines GL_R(2), GL_G(2), and GL_B(2) commonly connected to the sub-pixels, respectively. A first EM line GL_R(2), to which a first EM signal EM_R(2) is applied, may be connected to the red sub-pixels SP_R. A second EM line GL_G(2), to which a second EM signal EM_G(2) is applied, may be connected to the green sub-pixels SP_G. A third EM line GL_B(2), to which a third EM signal EM_B(2) is applied, may be connected to the blue sub-pixels SP_B.

Third color-specific EM signals EM_R(3), EM_G(3), and EM_B(3) may be applied to the sub-pixels of the third group of pixel lines, e.g., the sub-pixels of the third and sixth pixel lines L3 and L6, through EM lines GL_R(3), GL_G(3), and GL_B(3) commonly connected to the sub-pixels, respectively. A first EM line GL_R(3), to which a first EM signal EM_R(3) is applied, may be connected to the red sub-pixels SP_R. A second EM line GL_G(3), to which a second EM signal EM_G(3) is applied, may be connected to the green sub-pixels SP_G. A third EM line GL_B(3), to which a third EM signal EM_B(3) is applied, may be connected to the blue sub-pixels SP_B.

Figure 16:
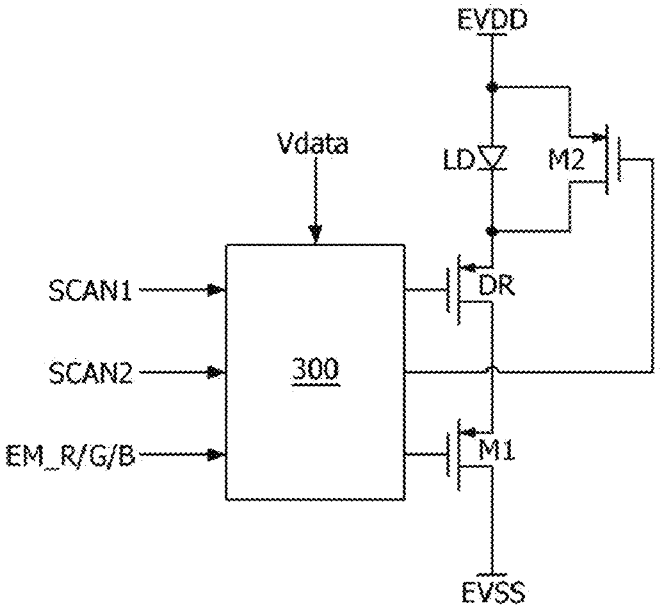
FIG. 16 is a circuit diagram illustrating a pixel circuit according to one embodiment of the present disclosure.

FIG. 16 is a circuit diagram illustrating a pixel circuit according to one embodiment of the present disclosure.

Referring to FIG. 16, the pixel circuit includes a light-emitting element LD, a driving transistor DR, a switch transistor M1, a switching transistor M2, and a compensation circuit 300. The driving transistor DR and the switch transistor M1 may be implemented as, but not limited to, p-channel transistors.

The light-emitting element LD may include an anode electrode, a cathode electrode, and a light-emitting layer. A pixel driving voltage EVDD may be applied to the anode electrode of the light-emitting element LD. The cathode electrode of the light-emitting element LD may be connected to the driving transistor DR. The light-emitting element LD may be, but is not limited to, a light-emitting element such as an OLED, mini-LED, micro-LED, or the like. The mini-LED or micro-LED may have a vertical structure in which electrodes are arranged above and below a semiconductor chip on which the light-emitting element LD is integrated. The semiconductor chip in which the light-emitting element LD is integrated may be implemented in a lateral structure or a flip chip structure.

The light-emitting element LD, the driving transistor DR, and the switch transistor M1 may be connected in series between the pixel driving voltage EVDD and a ground voltage EVSS.

The driving transistor DR regulates the current flowing through a drain-source channel according to a gate-source voltage thereof. The gate-source voltage of the driving transistor DR is varied with a data voltage Vdata of the pixel data applied to a gate electrode of the driving transistor DR. Accordingly, the current flowing through the driving transistor DR is varied with the data voltage Vdata. The light-emitting element LD may be driven by a current from the driving transistor DR to emit light.

The driving transistor DR may be connected between the light-emitting element LD and the first switch transistor M1. The driving transistor DR includes a gate electrode to which a data voltage Vdata is applied, a first electrode connected to the cathode electrode of the light-emitting element LD, and a second electrode connected to a first electrode of the first switch transistor M1.

The first switch transistor M1 may be connected between the driving transistor DR and the ground voltage EVSS to switch the current path between the pixel drive voltage EVDD and the ground voltage EVSS. The first switch transistor M1 may be turned on in response to a gate-on voltage of the color-specific EM signal EM_R/G/B and turned off in response to a gate-off voltage. When the first switch transistor M1 is turned on, the driving transistor DR and the light-emitting element LD may be electrically connected so that a current is supplied to the light-emitting element LD. When the first switch transistor M1 is turned off, the current path between the pixel driving voltage EVDD and the ground voltage EVSS is blocked so that no current is supplied to the light-emitting element LD.

The pixel circuit may further include a second switch transistor M2. The second switch transistor M2 is connected between the cathode electrode and the anode electrode of the light-emitting element LD, and may be turned on in response to the gate-on voltage of the first scan signal SCAN1 and turned off in response to the gate-off voltage. When the second switch transistor M2 is turned on, the cathode electrode and the anode electrode of the light-emitting element LD are short-circuited so that the light-emitting element LD does not emit light. When the second switch transistor M2 is turned off, the current may flow to the light-emitting element LD. The second switch transistor M2 may prevent the light-emitting element LD from emitting light when the pixel circuit is initialized and when the threshold voltage of the driving transistor DR is sampled.

The compensation circuit 300 may be connected to a data line to which the data voltage Vdata is applied, gate lines to which gate signals SCAN1, SCAN2 and EM_R/G/B are applied, the gate electrode of the driving transistor DR, and the gate electrodes of the switch transistors M1 and M2. The compensation circuit 300 may include a plurality of transistors and one or more capacitors. The compensation circuit 300 transfers the data voltage Vdata to the gate electrode of the driving transistor DR. The compensation circuit 500 samples the threshold voltage of the driving transistor DR into the capacitor to compensate the gate voltage of the driving transistor DR by the amount of the threshold voltage of the driving transistor DR. The compensation circuit 300 may perform the compensation by sampling the threshold voltage of the driving transistor DR using a source follower or a diode connection circuit.

Figure 17:
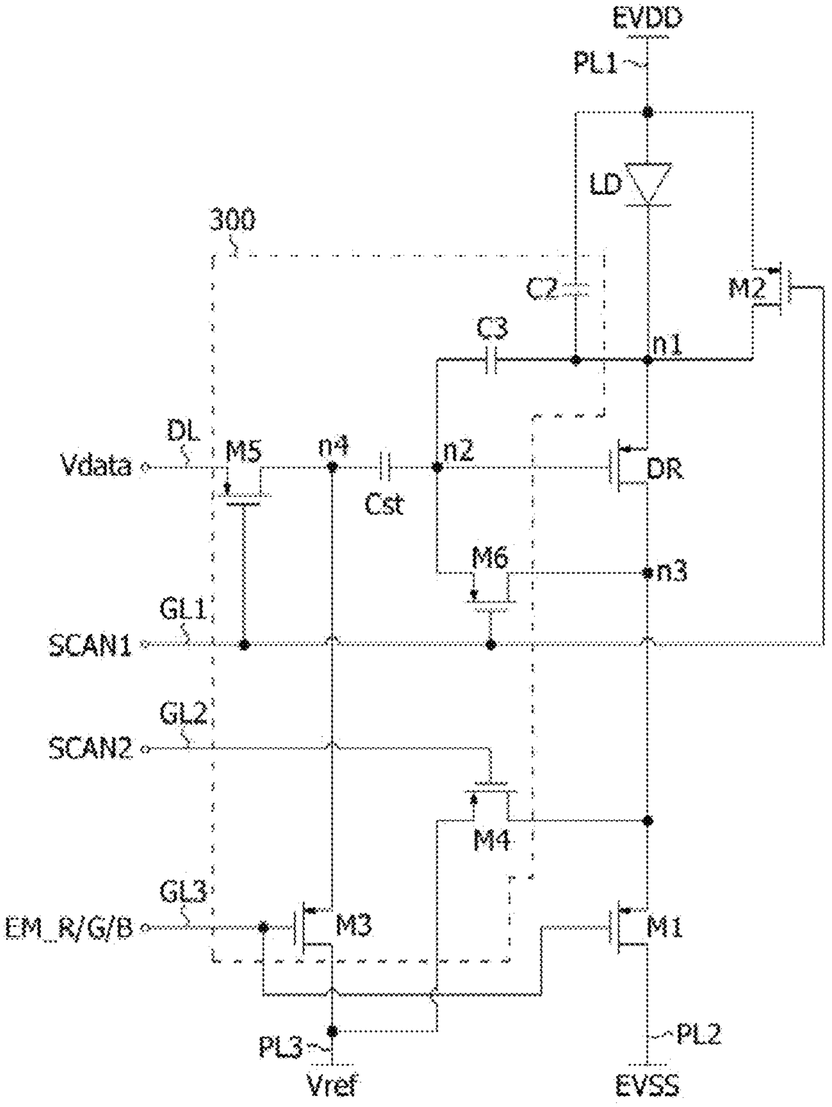
FIG. 17 is a circuit diagram illustrating an example that is applicable to the pixel circuit shown in FIG. 16 according to one embodiment of the present disclosure.

FIG. 17 is a circuit diagram illustrating an example that is applicable to the pixel circuit shown in FIG. 16 according to one embodiment of the present disclosure.

Referring to FIG. 17, the pixel circuit includes a driving transistor DR that drives a light-emitting element LD, a plurality of switch transistors M1 to M6, and a first capacitor Cst. The pixel circuit may further include second and third capacitors C2 and C3. The transistors DR and M1 to M6 in the pixel circuit may be p-channel transistors, but are not limited thereto.

The pixel driving voltage EVDD, the ground voltage EVSS, and a reference voltage Vref may be applied to the pixel circuit. The pixel driving voltage EVDD may be a constant voltage selected between 8V and 13V, and the ground voltage EVSS and the reference voltage Vref may be constant voltages selected between-2V and IV. The reference voltage Vref may be, but is not limited to, a constant voltage equal to or higher than the ground voltage EVSS.

The data voltage Vdata and the gate signals SCAN1, SCAN2, and EM_R/G/B may be input to the pixel circuit. The data voltage Vdata may be, but is not limited to, a dynamic range voltage between 0V and SVDD. SVDD is a data driving voltage for driving the output buffer in the data driver 110. The data driving voltage SVDD may be, but is not limited to, a constant voltage selected between 12V and 18V. The gate-high voltage VGH, VEH of the gate signals SCAN1, SCAN2, and EM_R/G/B may be a constant voltage selected between 10V and 13V, and the gate-low voltage VGL, VEL thereof may be a constant voltage selected between −13 V and −10 V, but are not limited thereto. The gate-high voltage VEH of the color-specific EM signal EM_R/G/B may be set equal to or different from the gate-high voltage VGH of the scan signals SCAN1 and SCAN2. The gate-low voltage VEL of the color-specific EM signals EM_R/G/B may be set equal to or different from the gate-low voltage VGL of the scan signals SCAN1 and SCAN2. Hereinafter, the gate-low voltage VGL, VEL is referred to as the gate-on voltage, and the gate-high voltage VGH is referred to as the gate-off voltage.

An anode electrode of the light-emitting element LD may be connected to a first power line PL1 to which the pixel driving voltage EVDD is applied. A cathode electrode of the light-emitting element LD may be connected to a first node n1.

The driving transistor DR may include a first electrode connected to a first node n1, a gate electrode connected to a second node n2, and a second electrode connected to a third node n3. The first capacitor C1 may be connected between the second node n2 and a fourth node n4.

A first switch transistor M1 is turned on in response to the gate-on voltage VEL of the color-specific EM signal EM_R/

G/B and turned off in response to the gate-off voltage VEH of the color-specific EM signal EM_R/G/B. The first switch transistor M1 includes a first electrode connected to the third node n3, a gate electrode connected to a third gate line GL3 to which the color-specific EM signal EM_R/G/B is applied, and a second electrode connected to a second power line PL2.

A second switch transistor M2 is turned on in response to the gate-on voltage VGL of the first scan signal SCAN1 and turned off in response to the gate-off voltage VGH of the first scan signal SCAN1. When the second switch transistor M2 is turned on, the first power line PL1, to which the pixel driving voltage EVDD is applied, may be electrically connected to the first node n1. The second switch transistor M2 includes a first electrode connected to the first power line PL1, a gate electrode connected to a first gate line GL1 to which the first scan signal SCAN1 is applied, and a second electrode connected to the first node n1.

A third switch transistor M3 is turned on in response to the gate-on voltage VEL of the color-specific EM signal EM_R/G/B and turned off in response to the gate-off voltage VEH of the color-specific EM signal EM_R/G/B. When the third switch transistor M3 is turned on, the fourth node n4 may be electrically connected to a third power line PL3 to which the reference voltage Vref is applied. The third switch transistor M3 includes a first electrode connected to the fourth node n4, a gate electrode connected to the third gate line GL3, and a second electrode connected to the third power line PL3.

A fourth switch transistor M4 is turned on in response to the gate-on voltage VGL of the second scan signal SCAN2 and turned off in response to the gate-off voltage VGH of the second scan signal SCAN2. When the fourth switch transistor M4 is turned on, the third node n3 may be electrically connected to the third power line PL3 to which the reference voltage Vref is applied. The fourth switch transistor M4 includes a first electrode connected to the third power line PL3, a gate electrode connected to the second gate line GL2 to which the second scan signal SCAN2 is applied, and a second electrode connected to the third node n3.

A fifth switch transistor M5 is turned on in response to the gate-on voltage VGL of the first scan signal SCAN1 and turned off in response to the gate-off voltage VGH of the first scan signal SCAN1. When the fifth switch transistor M5 is turned on, a data line DL, to which the data voltage Vdata is applied, may be electrically connected to the fourth node n4. The fifth switch transistor M5 includes a first electrode connected to the data line DL, a gate electrode connected to the first gate line GL1 to which the first scan signal SCAN1 is applied, and a second electrode connected to the fourth node n4.

A sixth switch transistor M6 is turned on in response to the gate-on voltage VGL of the first scan signal SCAN1 and turned off in response to the gate-off voltage VGH of the first scan signal SCAN1. When the sixth switch transistor M6 is turned on, the second node n2 may be electrically connected to the third node n3. The sixth switch transistor M6 includes a first electrode connected to the second node n2, a gate electrode connected to the first gate line GL1, and a second electrode connected to the third node n3.

The second capacitor C2 may be connected between the first power line PL1 and the first node n1. The third capacitor C3 may be connected to the first node n1 and the second node n2.

The pixel circuit shown in FIG. 17 may be driven by an initialization step, a sampling step, a holding step, and a light emission step for a period of one frame. The initialization step may be divided into a first initialization step and a second initialization step, as shown in FIGS. 18A to 19B. In FIGS. 18A to 22B, "1H" denotes one horizontal period. An operation of the pixel circuit will be described with reference to FIGS. 18A to 22B, assuming that a sub-pixel is arranged in the (n)th pixel line.

Figure 18A:
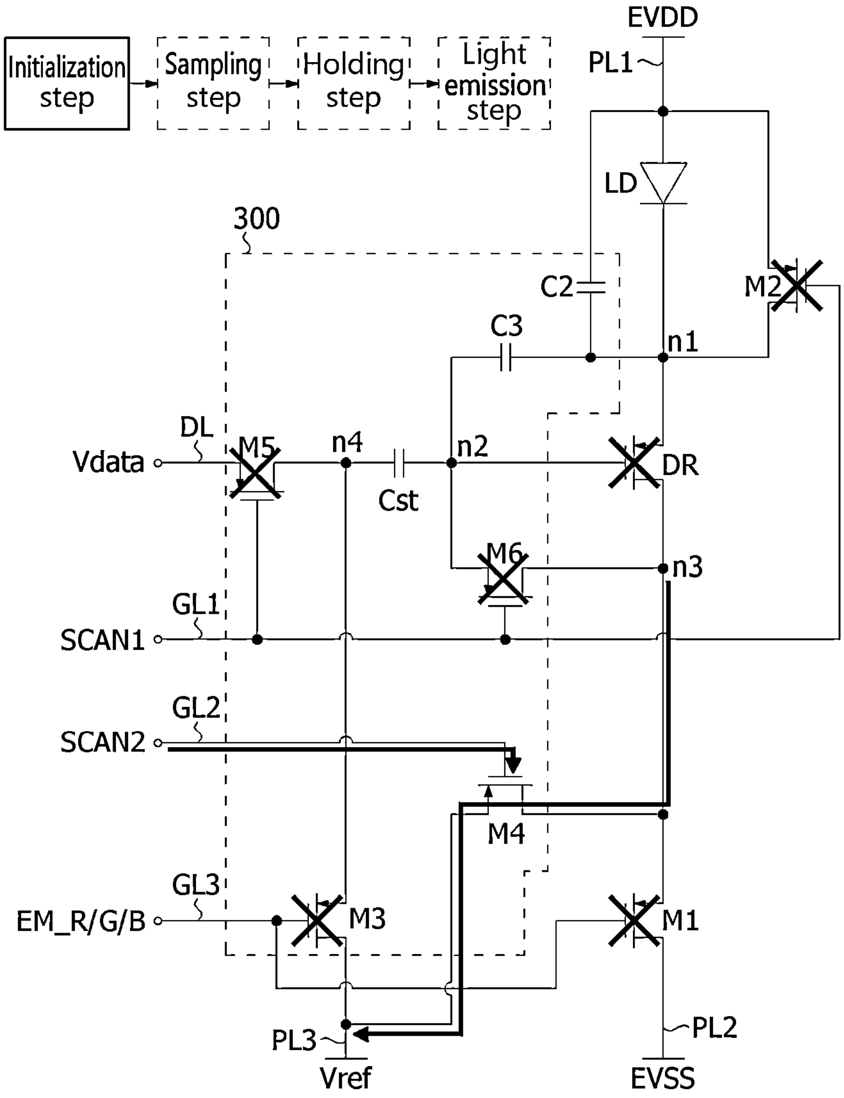
FIGS. 18A and 18B are diagrams illustrating a first initialization step of the pixel circuit shown in FIG. 16 according to one embodiment of the present disclosure.
Figure 18B:
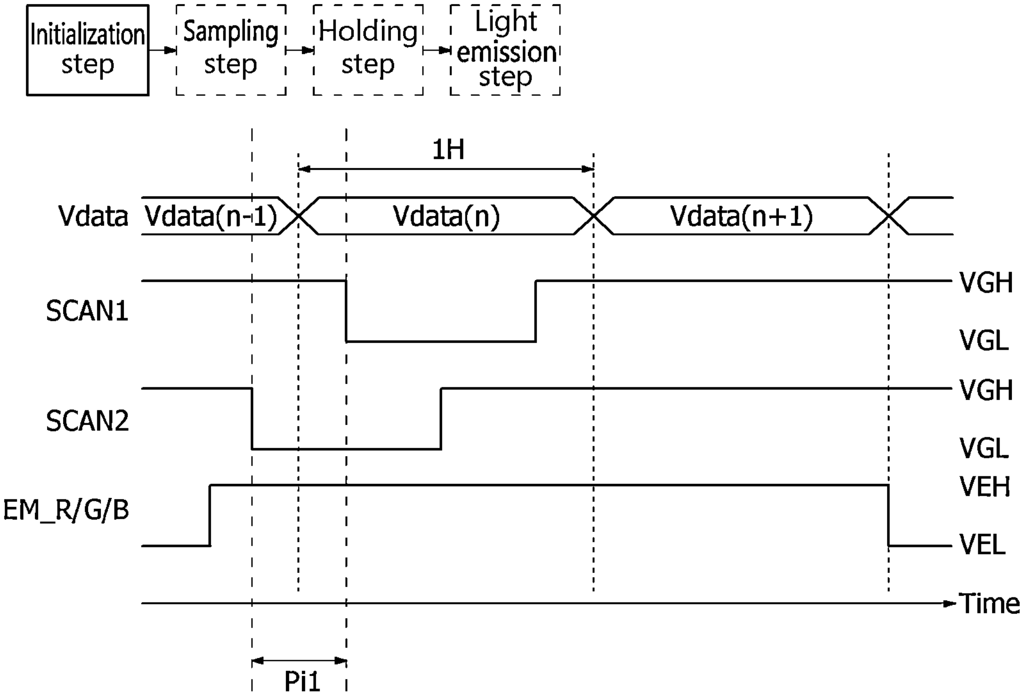

FIGS. 18A and 18B are diagrams illustrating the first initialization step of the pixel circuit shown in FIG. 16.

Referring to FIGS. 18A and 18B, the first initialization step is performed during a first period Pi1. During the first period Pi1, the voltage of the second scan signal SCAN2 may be the gate-on voltage VGL, and the voltage of the first scan signal SCAN1 and the color-specific EM signal EM_R/G/B may be the gate-off voltage VEH. Accordingly, during the first period Pi1, the fourth switch transistor M4 is turned on, while the other switch transistors M1, M2, M3, M5, and M6 are in the off state. During the first period Pi1, the driving transistor DR is in the off state.

During the first period Pi1, the voltage of the third node n3 is initialized to the reference voltage Vref. During the first period Pi1, the other nodes n1, n2, and n4 are floated. During the first period Pi1, the voltages of the first and second nodes n1 and n2 may be maintained at the voltages charged in a previous frame period. The voltage of the fourth node n4 may be maintained at the reference voltage Vref charged during the light emission step of a previous frame. During the first period Pi1, a data voltage Vdata(n−1) of a preceding pixel line, e.g., an (n−1)th pixel line, may be applied to the data line DL.

Figure 19A:
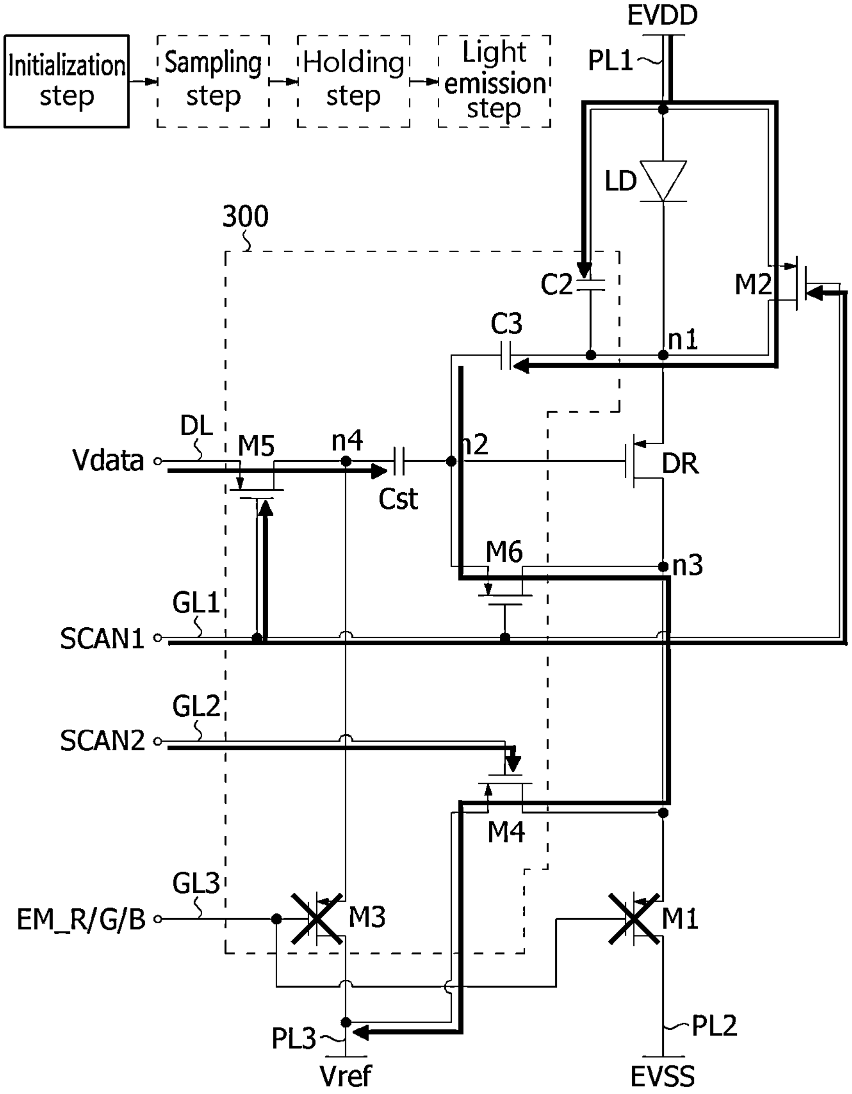
FIGS. 19A and 19B are diagrams illustrating a second initialization step of the pixel circuit shown in FIG. 16 according to one embodiment of the present disclosure.
Figure 19B:
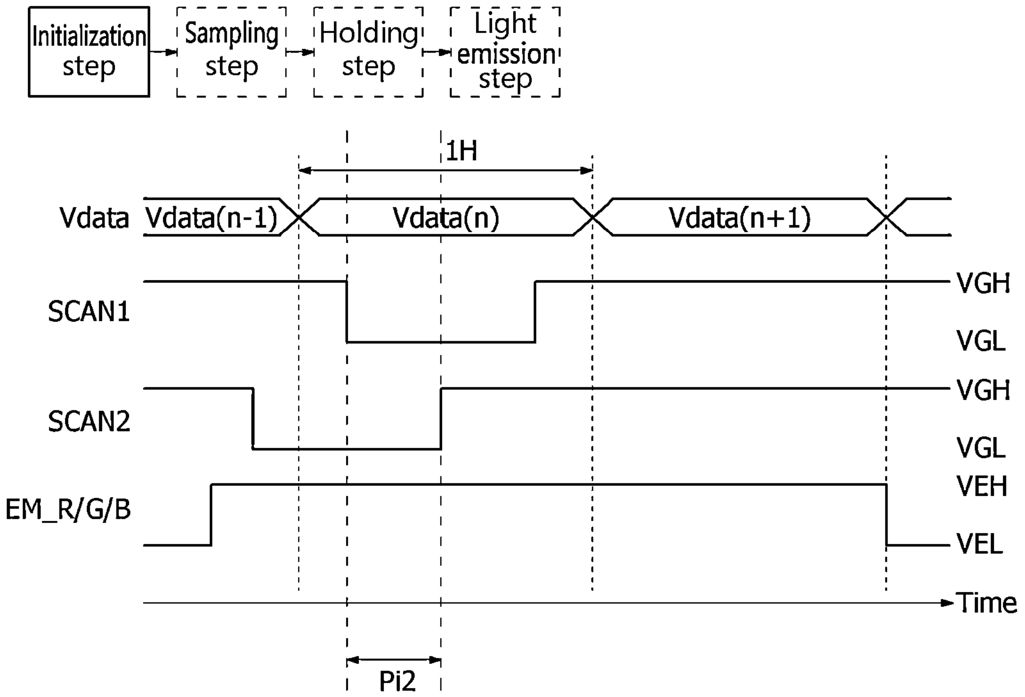

FIGS. 19A and 19B are diagrams illustrating the second initialization step of the pixel circuit shown in FIG. 16 according to one embodiment of the present disclosure.

Referring to FIGS. 19A and 19B, the second initialization step is performed during a second period Pi2 that is after the first period Pi1. During the second period Pi2, the voltage of the first scan signal SCAN1 and the second scan signal SCAN2 may be the gate-on voltages VGL and the voltage of the color-specific EM signal EM_R/G/B may be the gate-off voltage VEH. Accordingly, during the second period Pi2, the second, fifth, and sixth switch transistors M2, M5, and M6 are turned on, and the fourth switch transistor M4 is in the on state. On the other hand, during the second period Pi2, the first and third switch transistors M1 and M3 are in the off state. During the second period Pi2, the voltage of the first node n1 rises, causing the driving transistor DR to turn on.

During the second period Pi2, a data voltage Vdata(n) is applied to the data line DL. This data voltage Vdata(n) is applied to the fourth node n4 through the fifth switch transistor M5. During the second period Pi2, the reference voltage Vref is applied to the second and third nodes n2 and n3 through the fourth and sixth transistors M4 and M6. Accordingly, during the second period Pi2, the voltage of the second node n2 is initialized to the reference voltage Vref, and the voltage of the fourth node n4 is the data voltage Vdata(n).

Figure 20A:
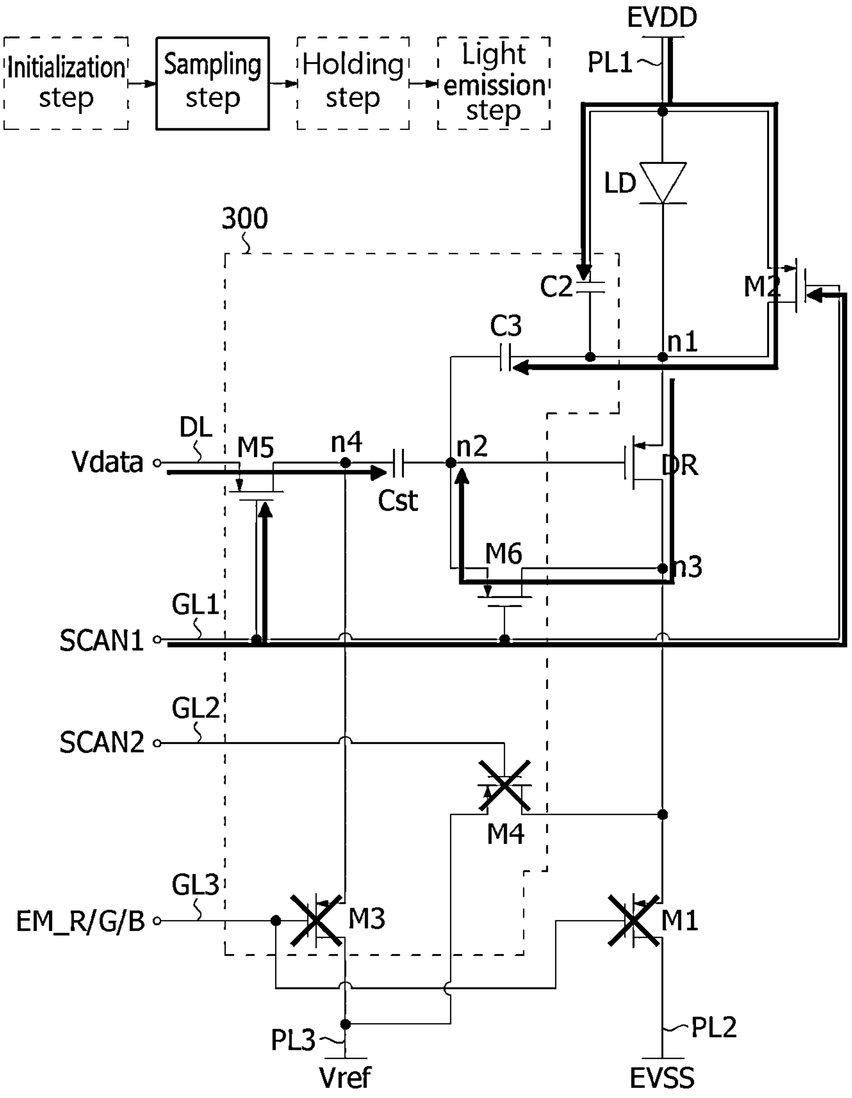
FIGS. 20A and 20B are diagrams illustrating a sampling step of the pixel circuit shown in FIG. 16 according to one embodiment of the present disclosure.
Figure 20B:
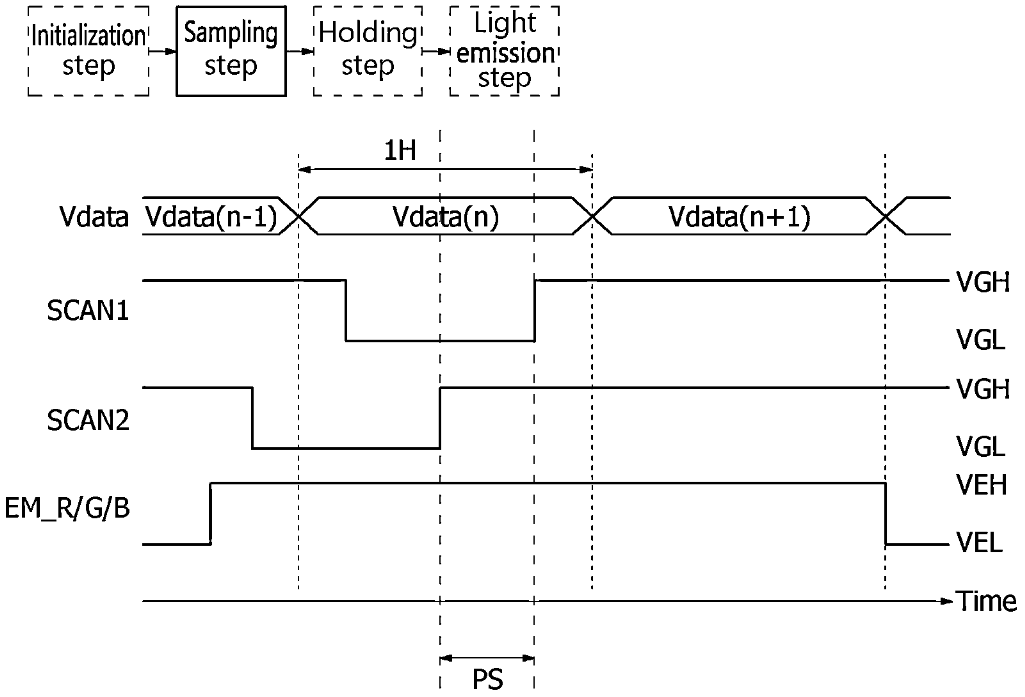

FIGS. 20A and 20B are diagrams illustrating the sampling step of the pixel circuit shown in FIG. 16 according to one embodiment of the present disclosure.

Referring to FIGS. 20A and 20B, the sampling step is performed during a third period Ps that is after the second period Pi2. During the third period Ps, the voltage of the first scan signal SCAN1 may be the gate-on voltage VGL, and the voltage of the second scan signal SCAN2 and the color-specific EM signal EM_R/G/B may be the gate-off voltage VGH, VEH. Accordingly, during the third period Ps, the second, fifth, and sixth switch transistors M2, M5, and M6 are in the on state, and the fourth switch transistor M4 is in the off state. During the third period Ps, the first and third switch transistors M1 and M3 are in the off state. During the third period Ps, the voltage of the first node n1 is a voltage EVDD, and the voltage of the second node n2 is a voltage EVDD+Vth. The driving transistor DR is turned on when the third period Ps is entered and is turned off when the off condition, (Vs–Vg)+Vth<0, is reached. Here, (Vs–Vg) is the gate-source voltage of the driving transistor DR, which is the difference voltage between the voltage Vs of the second node n2 and the voltage (Vn2=Vg) of the first node n1.

When the driving transistor DR is turned off, the threshold voltage Vth of the driving transistor DR may be sampled and stored in the first capacitor Cst. During the third period Ps, the voltage of the fourth node n4 is the data voltage Vdata. The first capacitor Cst is charged with the difference voltage between the voltage of the fourth node n4 and the voltage of the second node n2.

In the case of a sub-pixel not to be driven, a black grayscale voltage is applied to the fourth node n4 through the data line DL and the fifth switch transistor M5 during the sampling step.

Figure 21A:
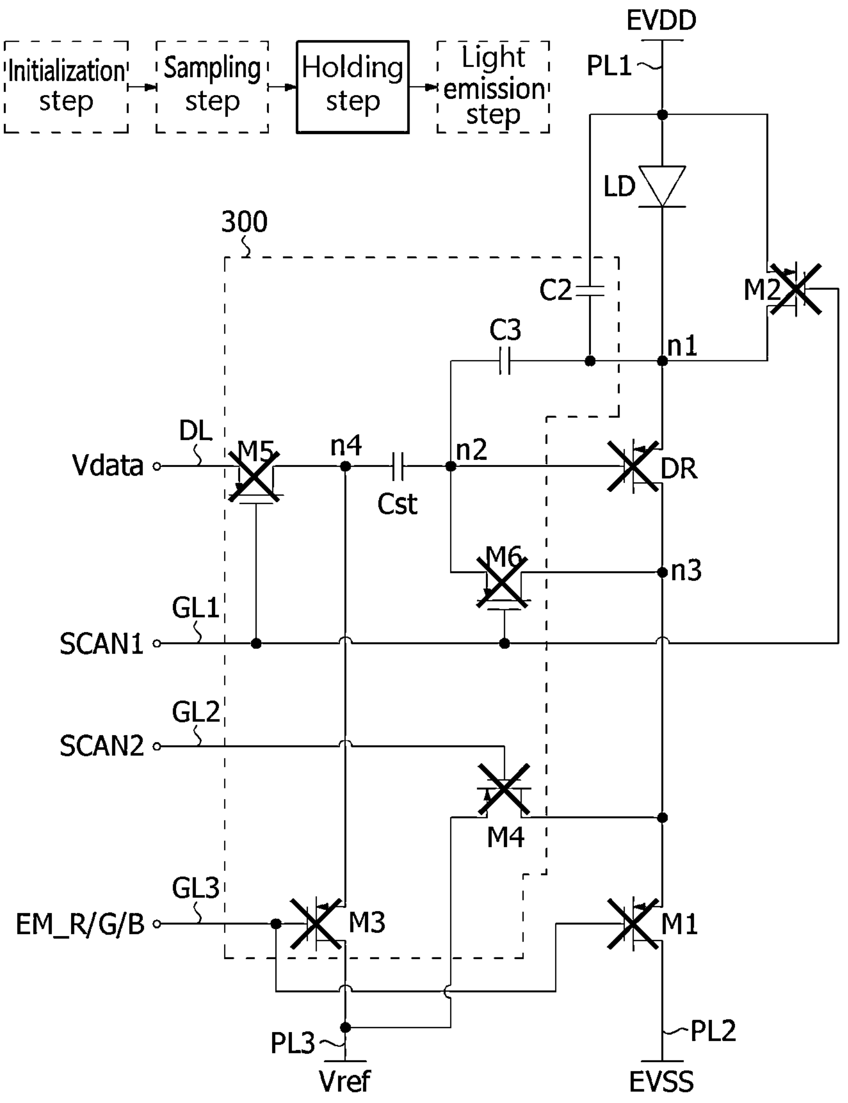
FIGS. 21A and 21B are diagrams illustrating a holding step of the pixel circuit shown in FIG. 16 according to one embodiment of the present disclosure.
Figure 21B:
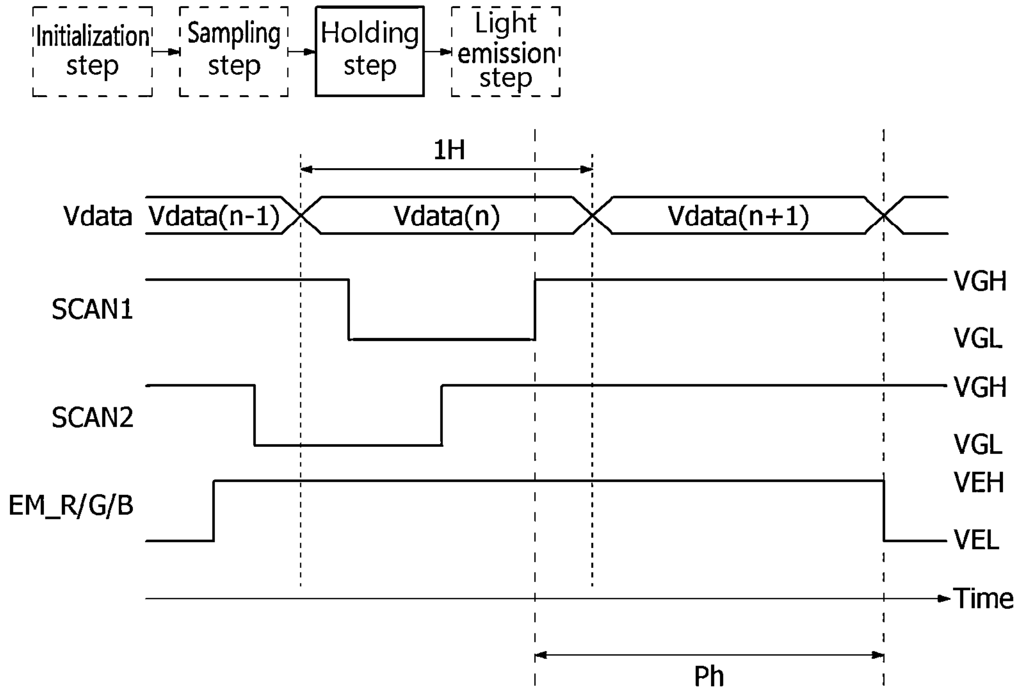

FIGS. 21A and 21B are diagrams illustrating the holding step of the pixel circuit shown in FIG. 16 according to one embodiment of the present disclosure.

Referring to FIGS. 21A and 21B, the holding step is performed during a fourth period Ph that is after the third period Ps. During the fourth period Ph, the voltage of the first scan signal SCAN1, the second scan signal SCAN2, and the color-specific EM signal EM_R/G/B may be the gate-off voltage VGH, VEH. Accordingly, during the fourth period Ph, since the first to sixth switch transistors M1 to M6 are in the off state, the second to fourth nodes n2, n3, and n4 are floated, and therefore the voltage of the first capacitor Cst remains at its previous state.

Figure 22A:
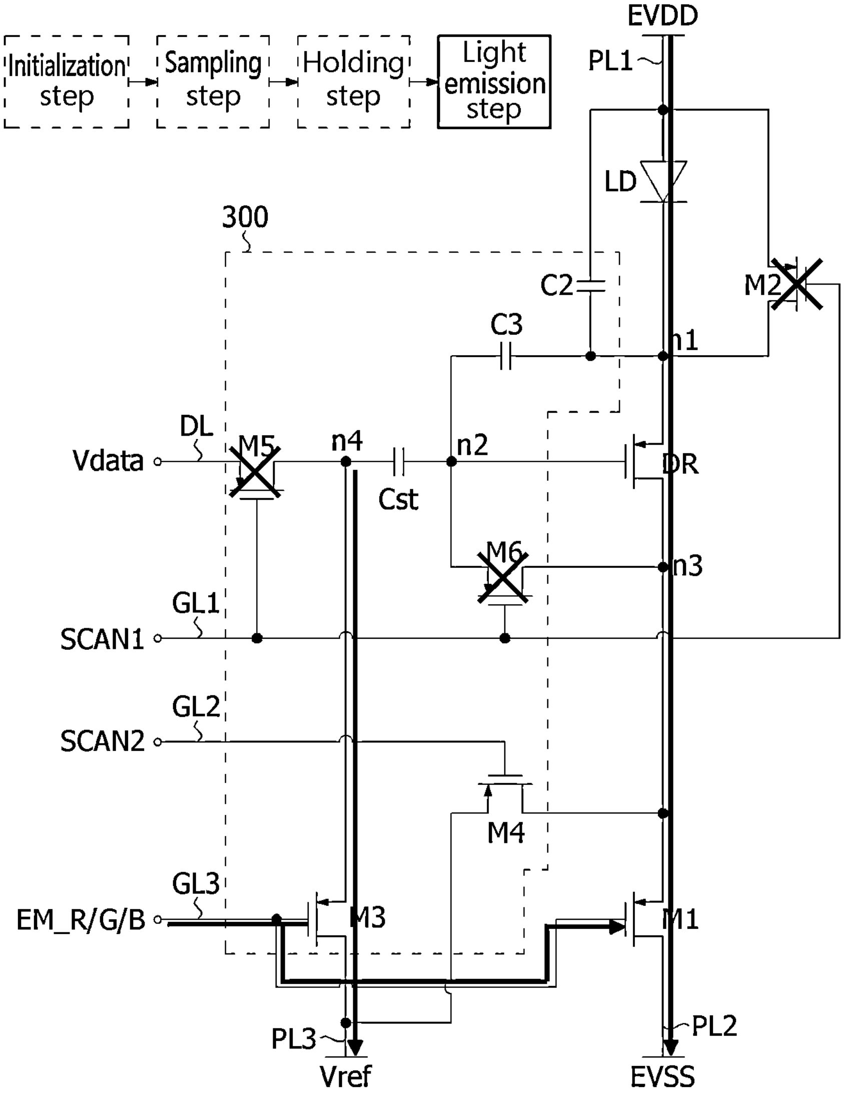
FIGS. 22A and 22B are diagrams illustrating a light emission step of the pixel circuit shown in FIG. 16 according to one embodiment of the present disclosure.
Figure 22B:
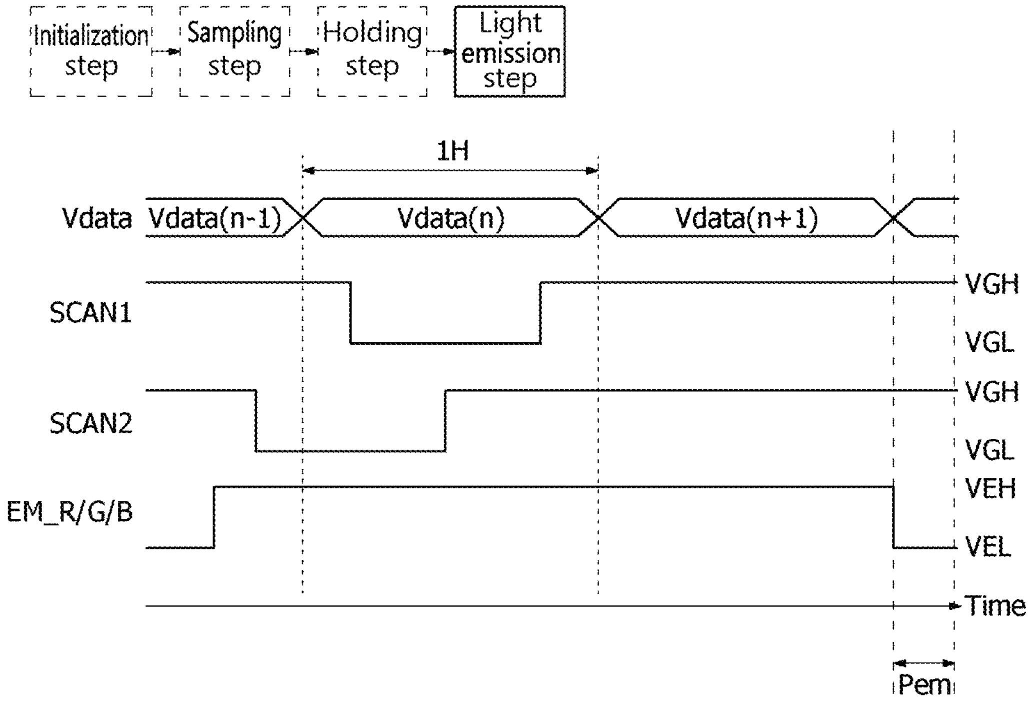

FIGS. 22A and 22B are drawings illustrating the light emission step of the pixel circuit shown in FIG. 16 according to one embodiment of the present disclosure.

Referring to FIGS. 22A and 22B, the light emission step is performed during a fifth period Pem that is after the fourth period Ph. During the fifth period Pem, the voltage of the color-specific EM signal EM_R/G/B may be the gate-on voltage VEL and the voltage of the first scan signal SCAN1 and the second scan signal SCAN2 may be the gate-off voltage VGH. Accordingly, during the fifth period Pem, the first and the third switch transistors M1 and M3 are turned on, while the other switch transistors M2, M4, M5, and M6 are in the off state. During the fifth period Pem, the driving transistor DR generates current according to the gate-source voltage Vgs to drive the light-emitting element LD. The light-emitting element LD is emitted by the current ILD from the driving transistor DR during the fifth period Pem. The current ILD flowing through the light-emitting element LD is as follows:

$$
\begin{aligned}
I_{DL} &= \frac{1}{2}\mu C_{ox}\frac{W}{L}(V_s - V_g + V_{th})^2 \\
&= \frac{1}{2}\mu C_{ox}\frac{W}{L}(EVDD - (EVDD + V_{th} - (V_{data} - V_{ref})) + V_{th})^2 \\
&= \frac{1}{2}\mu C_{ox}\frac{W}{L}(EVDD - EVDD - V_{th} + V_{data} - V_{ref} + V_{th})^2 \\
&= \frac{1}{2}\mu C_{ox}\frac{W}{L}(V_{data} - V_{ref})^2
\end{aligned}
$$

Here, Vs denotes the source voltage of the driving transistor DR or the voltage of the first node n1, and Vg denotes the gate voltage of the driving transistor DR or the voltage of the second node n2.

$$\mu C_{ox}\frac{W}{L}$$

denotes a constant value that is determined by the mobility μ, channel capacity Cox, channel width W, channel length L, and the like of the driving transistor DR. Vth denotes the threshold voltage of the driving transistor DR.

As can be seen from the above, the light-emitting element LD may be driven without being affected by the RC delay or IR drop of the pixel driving voltage EVDD and without being affected by the change of the threshold voltage Vth by compensating the threshold voltage Vth of the driving transistor DR in the light emission step.

Figure 23:
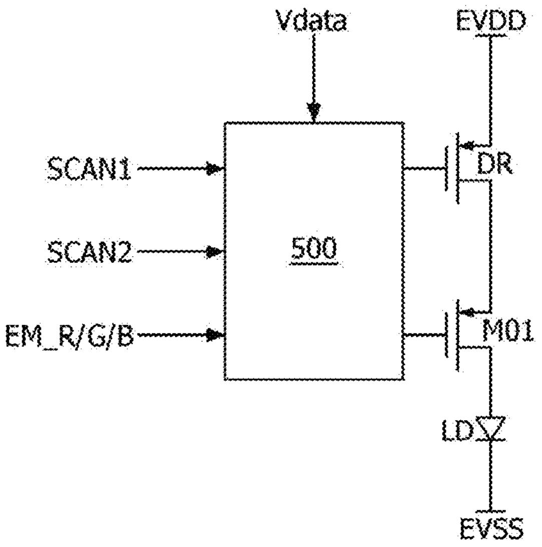
FIG. 23 is a circuit diagram illustrating a pixel circuit according to another embodiment of the present disclosure.

FIG. 23 is a circuit diagram illustrating a pixel circuit according to another embodiment of the present disclosure. In this embodiment, descriptions that are redundant to the foregoing embodiments is omitted.

Referring to FIG. 23, the pixel circuit includes a light-emitting element LD, a driving transistor DR, a switch transistor M01, and a compensation circuit 500. The driving transistor DR and the switch transistor M01 may be implemented as, but not limited to, p-channel transistors.

An anode electrode of the light emitting element LD may be connected to a second electrode of the switch transistor M01, and the ground voltage EVSS may be applied to a cathode electrode of the light-emitting element. The driving transistor DR, the switch transistor M01, and the light-emitting element LD may be connected in series between the pixel driving voltage EVDD and the ground voltage EVSS.

The switch transistor M01 is connected between the driving transistor DR and the light-emitting element LD to switch the current path between the pixel driving voltage EVDD and the light-emitting element LD. The switch transistor M01 may be turned on in response to the gate-on voltage of the color-specific EM signal EM_R/G/B and turned off in response to the gate-off voltage of the color-specific EM signal EM_R/G/B.

The compensation circuit 500 may be connected to the data line to which the data voltage Vdata is applied, the gate lines to which the gate signals SCAN1, SCAN2, and EM_R/G/B are applied, the gate electrode of the driving transistor DR, and the gate electrode of the switch transistors M1. The compensation circuit 500 may include a plurality of transistors and one or more capacitors. The compensation circuit 500 transfers the data voltage Vdata to the gate electrode of the driving transistor DR. The compensation circuit 500 samples the threshold voltage of the driving transistor DR into the capacitor to compensate the gate voltage of the driving transistor DR by the amount of the threshold voltage of the driving transistor DR. The compensation circuit 500 may perform the compensation by sampling the threshold voltage of the driving transistor DR using a source follower or a diode connection circuit.

Figure 24:
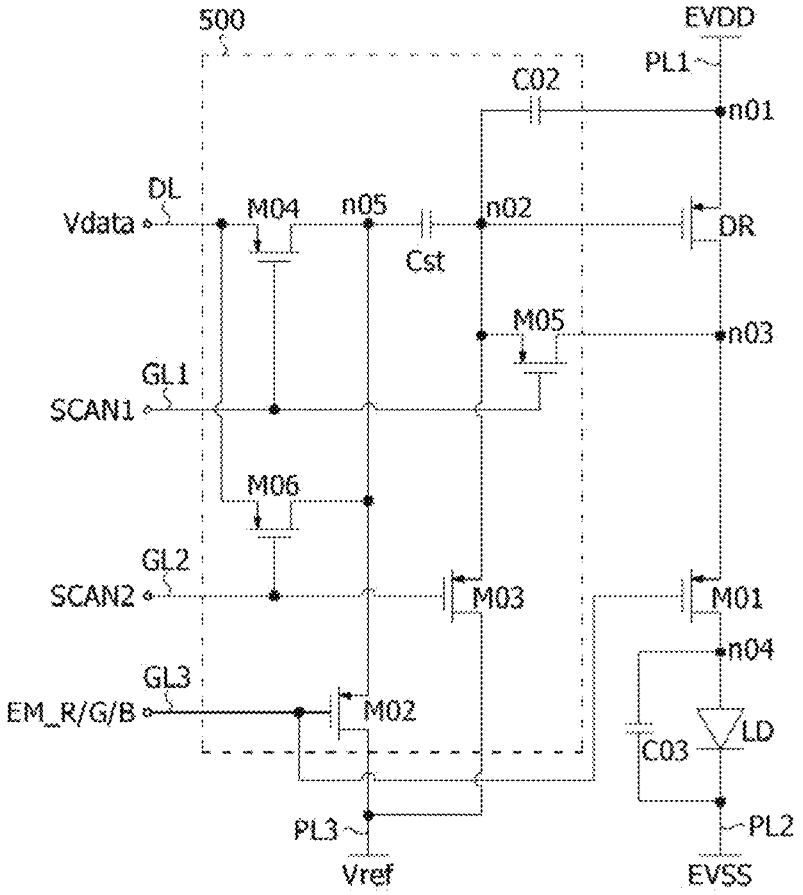
FIG. 24 is a circuit diagram illustrating an example that is applicable to the pixel circuit shown in FIG. 23 according to one embodiment of the present disclosure.

FIG. 24 is a circuit diagram illustrating an example that is applicable to the pixel circuit shown in FIG. 23 according to one embodiment of the present disclosure.

Referring to FIG. 24, the pixel circuit includes a driving transistor DR that drives a light-emitting element LD, a plurality of switch transistors M01 to M06, and a first capacitor Cst. The pixel circuit may further include second and third capacitors C02 and C03. The transistors DR and M01 to M06 in the pixel circuit may be p-channel transistors, but are not limited thereto.

An anode electrode of the light-emitting element LD may be connected to a fourth node n04. A cathode electrode of the light-emitting element LD may be connected to the second power line PL2 to which the ground voltage EVSS is applied.

The driving transistor DR may include a first electrode connected to a first node n01, a gate electrode connected to a second node n02, and a second electrode connected to a third node n03. A first power line PL1 to which the pixel driving voltage EVDD is applied may be connected to the first node n01. The first capacitor C1 may be connected between the second node n02 and a fifth node n05.

Each of first and second switch transistor M01 and M02 is turned on in response to the gate-on voltage VEL of the color-specific EM signal EM_R/G/B and turned off in response to the gate-off voltage VEH of the color-specific EM signal EM_R/G/B. When the first switch transistor M01 is turned on, the third node n03 may be electrically connected to the fourth node n04. When the second switch transistor M02 is turned on, the fifth node n05 may be electrically connected to a third power line PL3 to which the reference voltage Vref is applied.

The first switch transistor M01 includes a first electrode connected to the third node n03, a gate electrode connected to a third gate line GL3 to which the color-specific EM signal EM_R/G/B is applied, and a second electrode connected to the fourth node n04. The second switch transistor M02 includes a first electrode connected to the fifth node n05, a gate electrode connected to the third gate line GL3, and a second electrode connected to the third power line PL3.

Each of third and sixth switch transistors M03 and M06 is turned on in response to the gate-on voltage VGL of the second scan signal SCAN2 and turned off in response to the gate-off voltage VGH of the second scan signal SCAN2. When the third switch transistor M03 is turned on, the second node n02 may be electrically connected to the third power line PL3 to which the reference voltage Vref is applied. When the sixth switch transistor M06 is turned on, the data line DL to which the data voltage Vdata is applied may be electrically connected to the fifth node n05.

The third switch transistor M03 includes a first electrode connected to the second node n02, a gate electrode connected to a second gate line GL2 to which the second scan signal SCAN2 is applied, and a second electrode connected to the third power line PL3. The sixth switch transistor M06 includes a first electrode connected to the data line DL, a gate electrode connected to the second gate line GL2, and a second electrode connected to the fifth node n05.

Each of fourth and fifth switch transistors M04 and M05 is turned on in response to the gate-on voltage VGL of the first scan signal SCAN1 and turned off in response to the gate-off voltage VGH of the first scan signal SCAN1. When the fourth switch transistor M04 is turned on, the data line DL to which the data voltage Vdata is applied may be electrically connected to the fifth node n05. When the fifth switch transistor M05 is turned on, the second node n02 may be electrically connected to the third node n03.

The fourth switch transistor M04 includes a first electrode connected to the data line DL, a gate electrode connected to a first gate line GL1 to which the first scan signal SCAN1 is applied, and a second electrode connected to the fifth node n05. The fifth switch transistor M05 includes a first electrode connected to the second node n02, a gate electrode connected to the first gate line GL1, and a second electrode connected to the third node n03.

The second capacitor C02 may be connected between the first power line PL1 and the second node n02. The third capacitor C03 may be connected between the fourth node n04 and a second power line PL2.

The pixel circuit shown in FIG. 24 may be driven in an initialization step, a first holding step, a sampling step, a second holding step, and a light emission step. An operation of this pixel circuit will be described with reference to FIGS. 25A to 29B, assuming a sub-pixel is arranged in the (n)th pixel line. In FIGS. 25A to 29B, “1H” denotes one horizontal period.

Figure 25A:
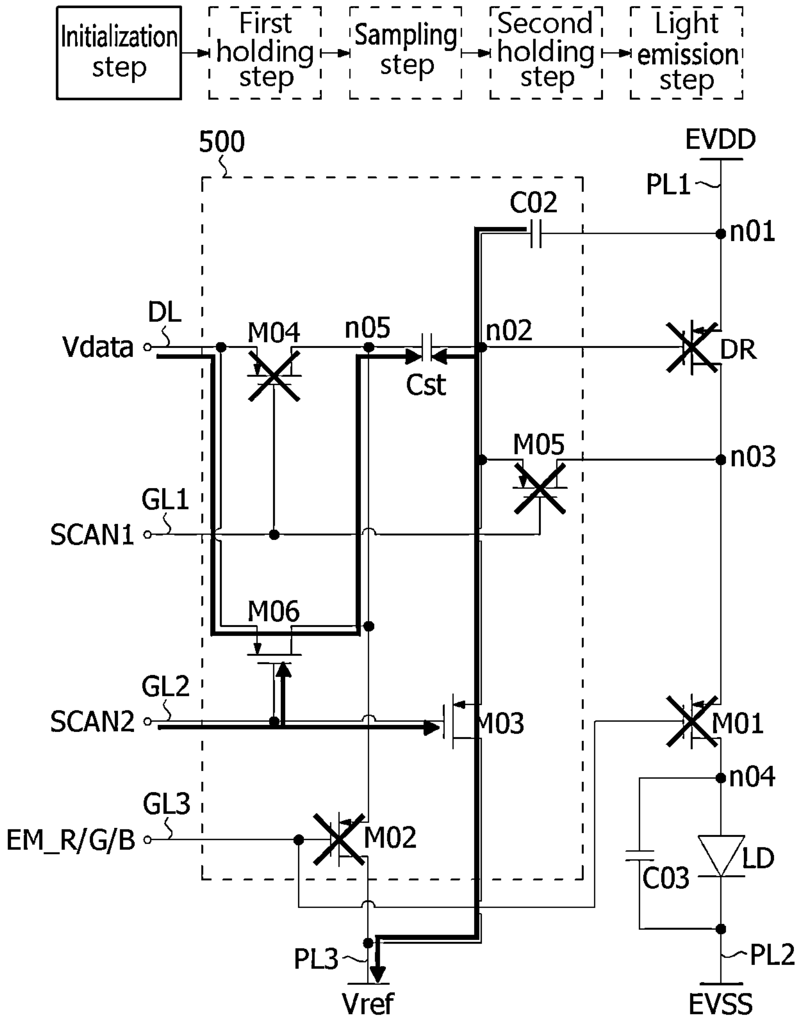
FIGS. 25A and 25B are diagrams illustrating an initialization step of the pixel circuit shown in FIG. 24 according to one embodiment of the present disclosure.
Figure 25B:
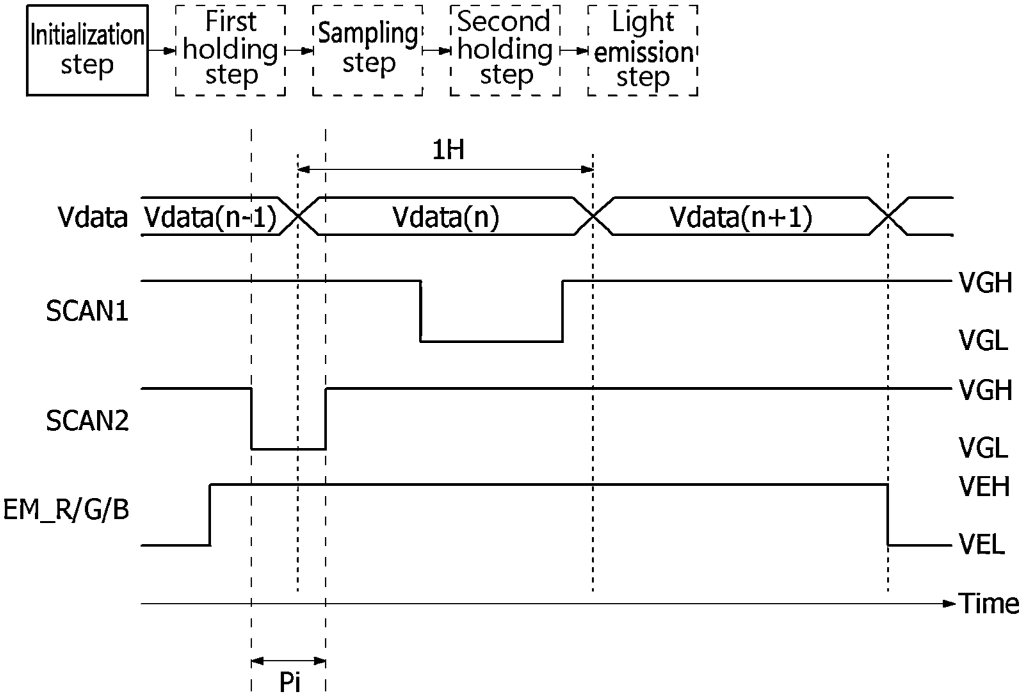

FIGS. 25A and 25B are diagrams illustrating the initialization step of the pixel circuit shown in FIG. 24 according to one embodiment of the present disclosure.

Referring to FIGS. 25A and 25B, the initialization step is performed during a first period Pi. During the first period Pi, the voltage of the second scan signal SCAN2 may be the gate-on voltage VGL, and the voltage of the first scan signal SCAN1 and the color-specific EM signal EM_R/G/B may be the gate-off voltage VGH, VEH. Accordingly, during the first period Pi, the third and sixth switch transistors M03 and M06 are turned on, while the other switch transistors M01, M02, M04, and M05 are in the off state. During the first period Pi, the driving transistor DR is in the off state.

During the first period Pi, the voltage of the second node n02 is initialized to the reference voltage Vref, and the voltage of the fifth node n05 is initialized to the data voltage Vdata(n−1) of a preceding pixel line.

Figure 26A:
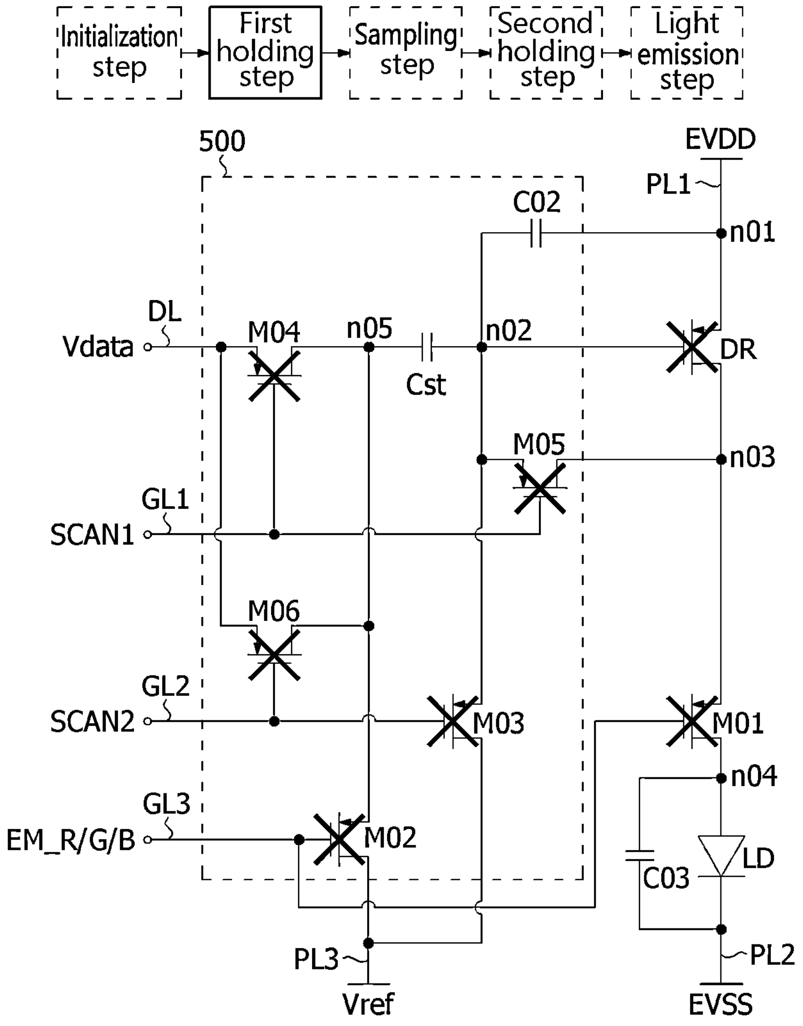
FIGS. 26A and 26B are diagrams illustrating a first holding step of the pixel circuit shown in FIG. 24 according to one embodiment of the present disclosure.
Figure 26B:
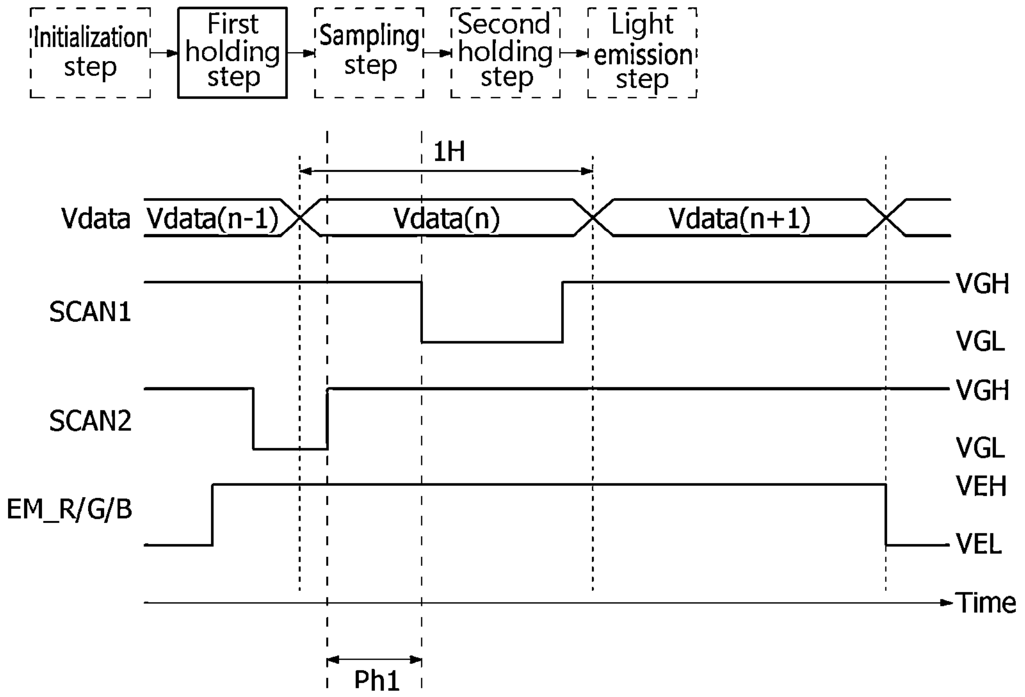

FIGS. 26A and 26B are diagrams illustrating the first holding step of the pixel circuit shown in FIG. 24 according to one embodiment of the present disclosure.

Referring to FIGS. 26A and 26B, the first holding step is performed during a second period Ph1 that is after the first period Pi. During the second period Ph1, the voltage of the first scan signal SCAN1, the second scan signal SCAN2, and the color-specific EM signal EM_R/G/B may be the gate-off voltage VGH, VEH. Accordingly, during the second period Ph1, since the first to sixth switch transistors M01 to M6 are in the off state, the second to fifth nodes n02 to n05 are floated, and thus the voltage of the first capacitor Cst remains at its previous state. The driving transistor DR is in the off state during the second period Ph1.

Figure 27A:
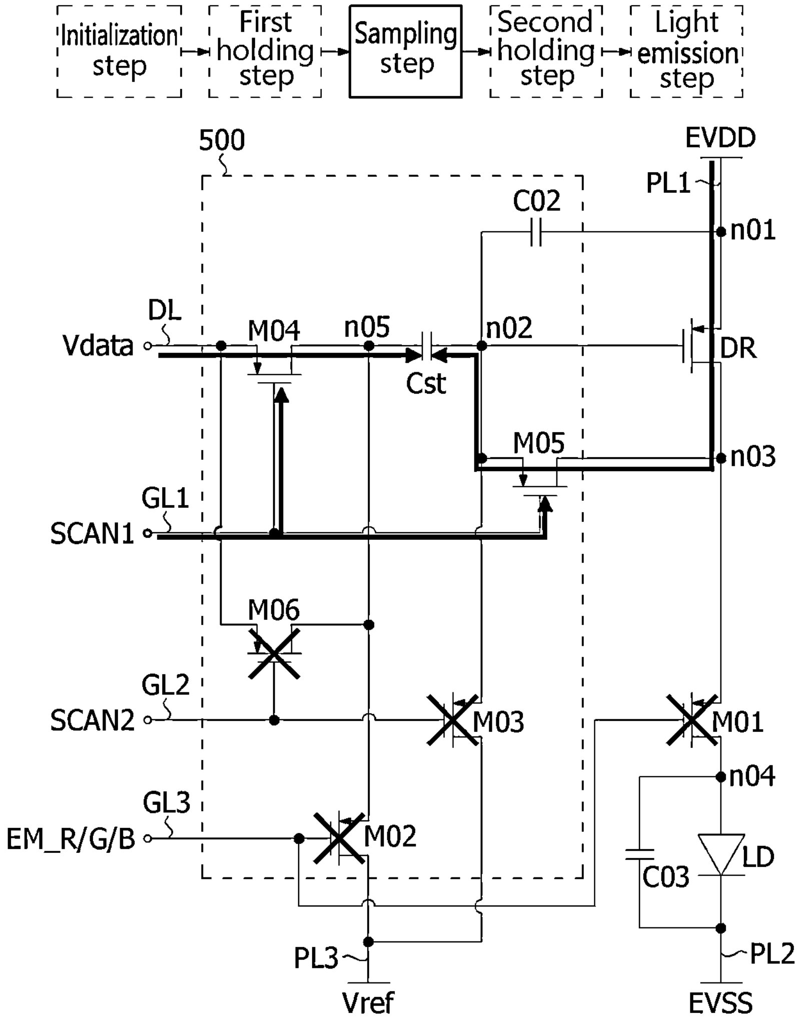
FIGS. 27A and 27B are diagrams illustrating a sampling step of the pixel circuit shown in FIG. 24 according to one embodiment of the present disclosure.
Figure 27B:
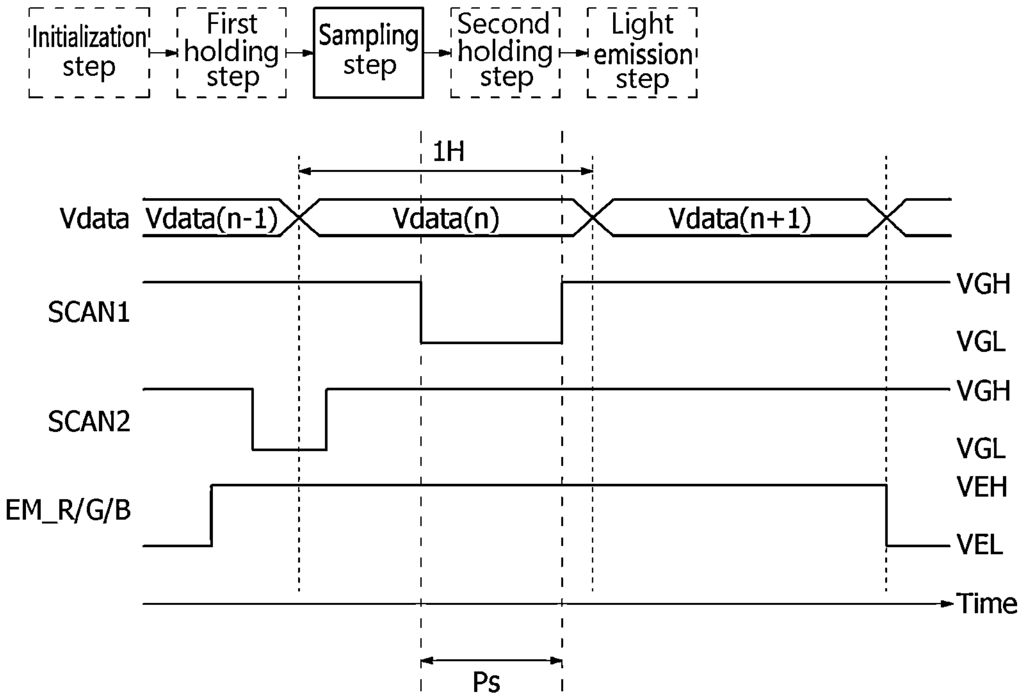

FIGS. 27A and 27B are diagrams illustrating the sampling step of the pixel circuit shown in FIG. 24 according to one embodiment of the present disclosure.

Referring to FIGS. 27A and 27B, the sampling step is performed during a third period Ps that is after the second period Ph. During the third period Ps, the voltage of the first scan signal SCAN1 may be the gate-on voltage VGL, and the voltage of the second scan signal SCAN2 and the color-specific EM signal EM_R/G/B may be the gate-off voltage VGH, VEH. Accordingly, during the third period Ps, the fourth and fifth switch transistors M04 and M05 may be turned on. During the third period Ps, the first, second, third, and sixth switch transistors M01, M02, M03, and M06 are in the off state. During the third period Ps, the data voltage Vdata(n) is applied to the fifth node n05, and the voltage of the second node n02 rises to a voltage EVDD+Vth. Here, ‘Vth’ represents the threshold voltage of the driving transistor DR. The first capacitor Cst is charged with a difference voltage between the voltage of the fifth node n05 and the voltage of the second node n02.

In the case of the sub-pixel not to be driven, a black grayscale voltage is applied to the fifth node n05 through the data line DL and the fourth switch transistor M04 during the sampling step.

Figure 28A:
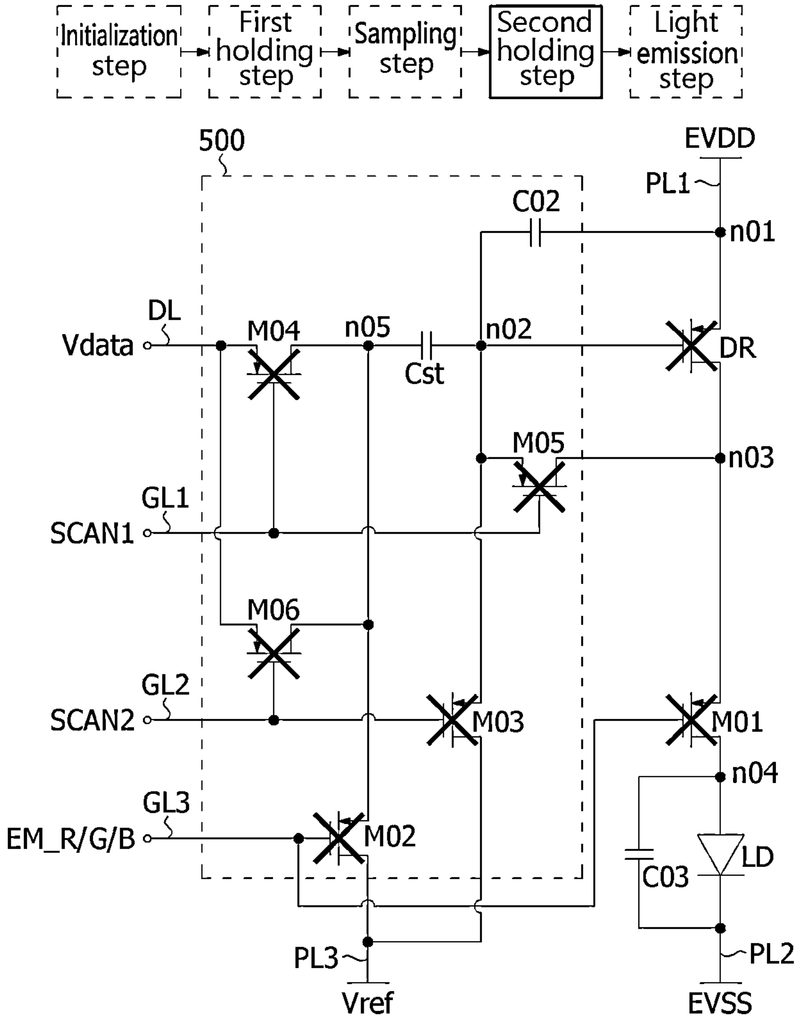
FIGS. 28A and 28B are diagrams illustrating a second holding step of the pixel circuit shown in FIG. 24 according to one embodiment of the present disclosure.
Figure 28B:
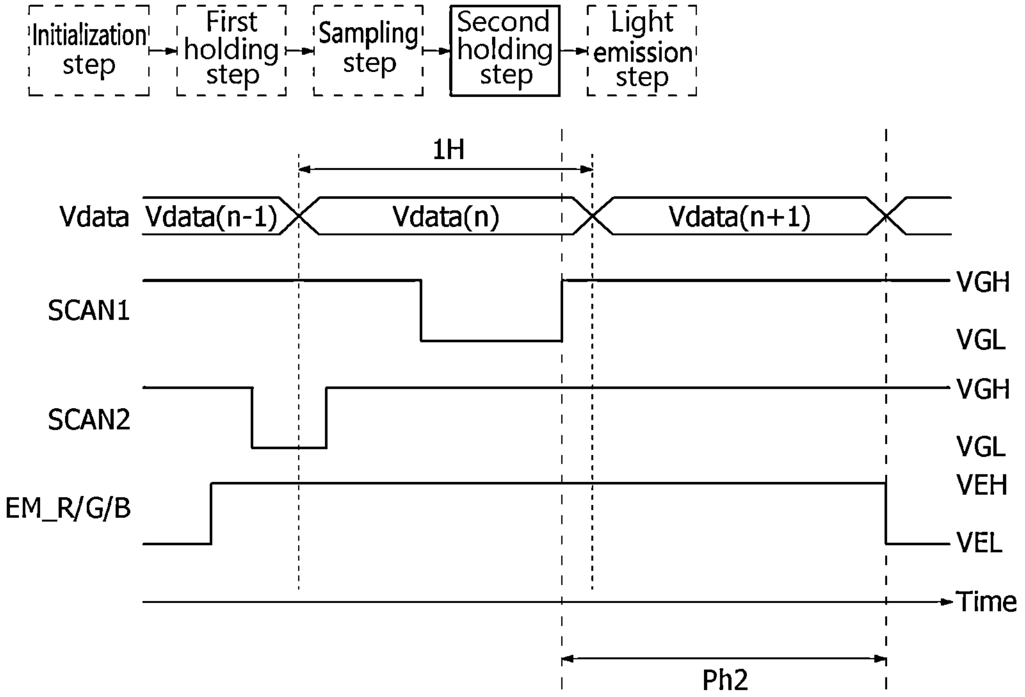

FIGS. 28A and 28B are diagrams illustrating the second holding step of the pixel circuit shown in FIG. 24 according to one embodiment of the present disclosure.

Referring to FIGS. 28A and 28B, the second holding step is performed during a fourth period Ph2 that is after the third period Ps. During the fourth period Ph2, the voltage of the first scan signal SCAN1, the second scan signal SCAN2, and the color-specific EM signal EM_R/G/B may be the gate-off voltage VGH, VEH. Accordingly, during the fourth period Ph2, since the first to sixth switch transistors M01 to M6 are in the off state, the second to fifth nodes n02 to n05 are floated, and thus the voltage of the first capacitor Cst remains in its previous state. The driving transistor DR is in the off state during the fourth period Ph2.

Figure 29A:
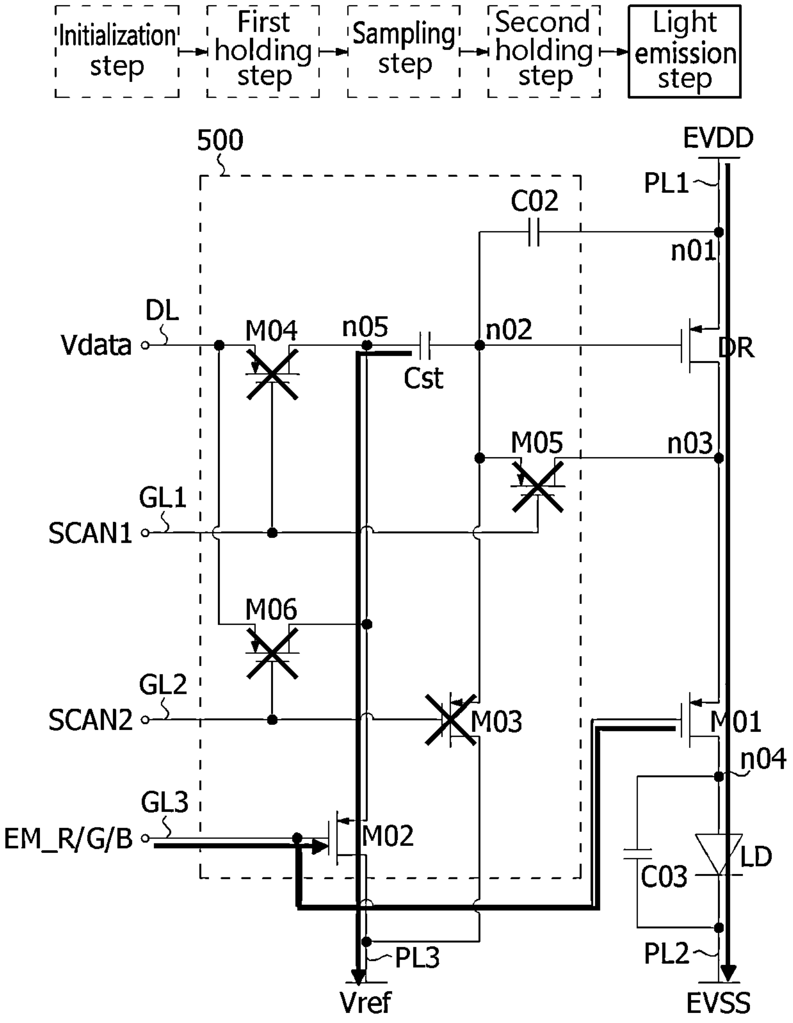
FIGS. 29A and 29B are diagrams illustrating a light emission step of the pixel circuit shown in FIG. 24 according to one embodiment of the present disclosure.
Figure 29B:
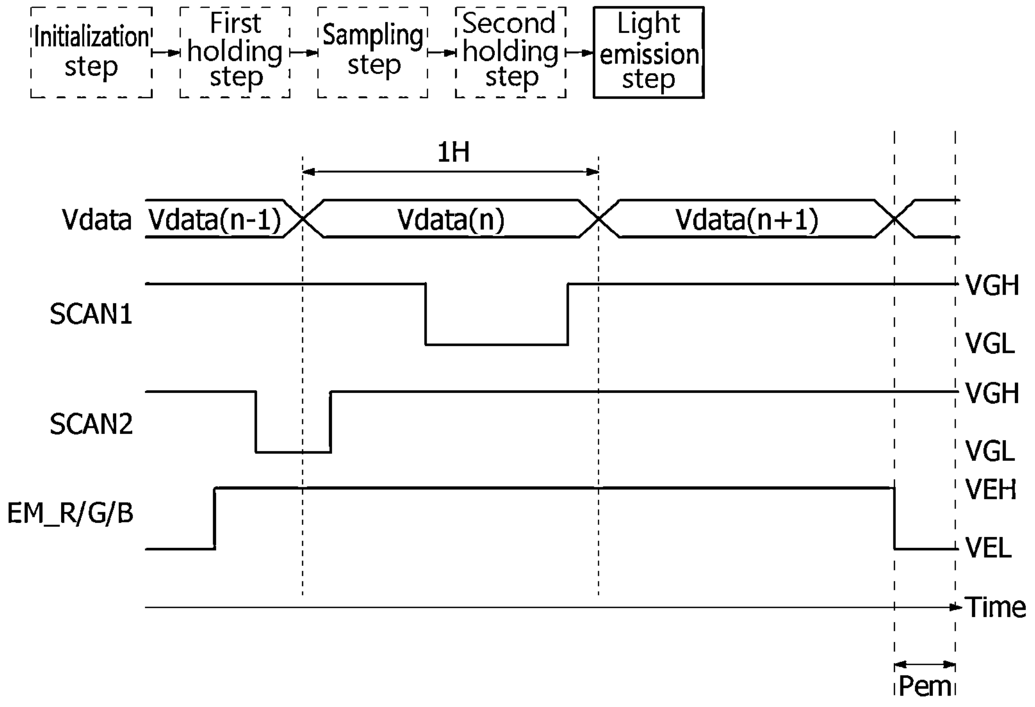

FIGS. 29A and 29B are drawings illustrating the light emission step of the pixel circuit shown in FIG. 24 according to one embodiment of the present disclosure.

Referring to FIGS. 29A and 29B, the light emission step is performed during a fifth period Pem that is after the second holding period Ph2. During the fifth period Pem, the voltage of the color-specific EM signal EM_R/G/B may be the gate-on voltage VEL and the voltage of the first scan signal SCAN1 and the second scan signal SCAN2 may be the gate-off voltage VGH. During the fifth period Pem, the first and second switch transistors M01 and M02 are turned on, while the other switch transistors M03, M04, M05, and M06 are in the off state.

During the fifth period Pem, the reference voltage Vref is applied to the fifth node n05. During the fifth period Pem, the driving transistor DR generates current according to the gate-source voltage Vgs to drive the light-emitting element LD. The light-emitting element LD is emitted by the current ILD from the driving transistor DR during the fifth period Pem. The light-emitting element LD may be driven without being affected by the change of the threshold voltage Vth and without being affected by the RC delay or IR drop of the pixel driving voltage EVDD by compensating the threshold voltage Vth of the driving transistor DR in the light emission step.

Figure 30:
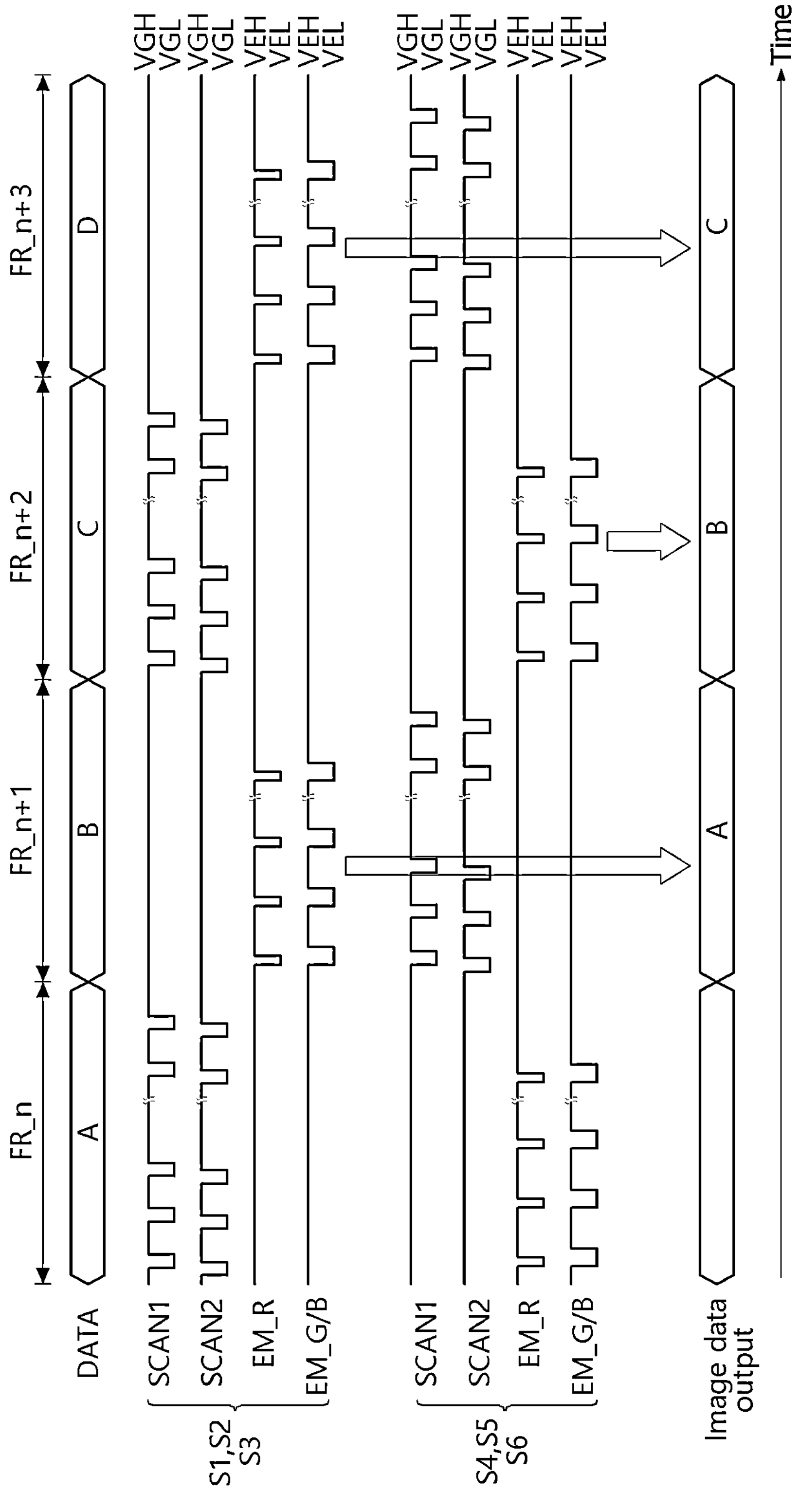
FIG. 30 is a waveform diagram illustrating an example in which the main and redundancy sub-pixels are alternately driven at a cycle of a predetermined time period according to one embodiment of the present disclosure.
Figure 31:
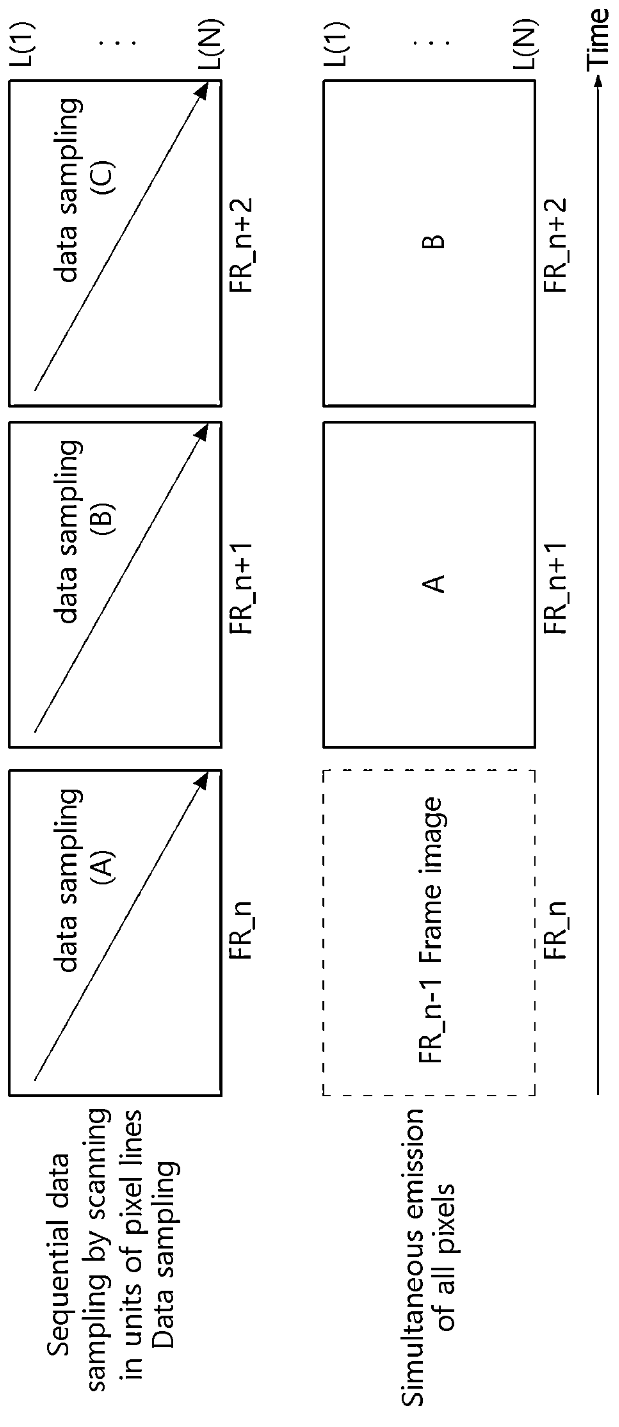
FIG. 31 is a diagram illustrating an example in which all pixels are simultaneously emitted by the alternating driving method shown in FIG. 30 according to one embodiment of the present disclosure.

FIG. 30 is a waveform diagram illustrating an example in which the main and redundancy sub-pixels are alternately driven at a cycle of a predetermined time period. FIG. 31 is a diagram illustrating an example in which all pixels are simultaneously emitted by the alternating driving method shown in FIG. 30.

Referring to FIGS. 30 and 31, the main sub-pixels S1, S2, and S3 and the redundancy sub-pixels S4, S5, and S6 may be alternately driven at a cycle of a predetermined time period, for example, an I-frame period (where I is a natural number). An example in which the predetermined time period is one frame period is assumed to be described.

During an (n)th frame period FR_n, the scan signals SCAN1 and SCAN2 and the data voltage of an (n)th frame image A are applied to the main sub-pixels S1, S2, and S3, while the color-specific EM signals EM_R and EM_G/B are applied to the redundancy sub-pixels S4, S5, and S6. At this time, the main sub-pixels S1, S2, and S3 may perform the initialization step and the sampling step to charge the data voltage of the (n)th frame image A, and the light-emitting elements of the redundancy sub-pixels S4, S5, and S6 may be emitted with the data voltage charged in a previous frame period, an (n−1)th frame period, to display a previous frame image.

During an (n+1)th frame period FR_n+1, the color-specific EM signals EM_R and EM_G/B are applied to the main sub-pixels S1, S2, and S3, while the scan signals SCAN1 and SCAN2 and the data voltage of an (n+1)th frame image B are applied to the redundancy sub-pixels S4, S5, and S6. At this time, the redundancy sub-pixels S4, S5, and S6 may perform the initialization step and the sampling step to charge the data voltage of the (n+1)th frame image B, and the light-emitting elements of the main sub-pixels S1, S2, and S3 may be emitted with the data voltage of the (n)th frame image A to display the (n)th frame image A.

During an (n+2)th frame period FR_n+2, the scan signals SCAN1 and SCAN2 and the data voltage of an (n+2)th frame image C are applied to the main sub-pixels S1, S2, and S3, while the color-specific EM signals EM_R and EM_G/B are applied to the redundancy sub-pixels S4, S5, and S6. At this time, the main sub-pixels S1, S2, and S3 may perform the initialization step and the sampling step to charge the data voltage of the (n+2)th frame image C, and the light-emitting elements of the redundancy sub-pixels S4, S5, and S6 may be emitted with the data voltage charged in the (n+1)th frame image B to display the (n+1)th frame image B.

During an (n+3)th frame period FR_n+3, the color-specific EM signals EM_R and EM_G/B are applied to the main sub-pixels S1, S2, and S3, while the scan signals SCAN1 and SCAN2 and the data voltage of an (n+3)th frame image D are applied to the redundancy sub-pixels S4, S5, and S6. At this time, the redundancy sub-pixels S4, S5, and S6 may perform the initialization step and the sampling step to charge the data voltage of the (n+3)th frame image D, and the light-emitting elements of the main sub-pixels S1, S2, and S3 may be emitted with the data voltage of the (n+2)th frame image C to display the (n+2)th frame image C.

As shown in FIG. 30, the color-specific EM signals EM_R and EM_G/B may be applied to the redundancy sub-pixels S4, S5, and S6 throughout one frame period without restrictions on the time required for the initialization step, holding step, and sampling step. Accordingly, the design freedom for the duty ratio of the color-specific EM signals EM_R and EM_G/B may be improved.

In the case of a tiled display (TD) as shown in FIG. 2, the sub-pixels may be data sampled or addressed as the pulses of the scan signals are sequentially shifted in units of pixel lines in the display panels. If the display panels of the tiled display (TD) have different data sampling timings, when an image is reproduced, the positions of pixel lines at which data of a previous frame image is displayed in the display panels may be different from each other, and the positions of pixel lines at which data of a current frame image is displayed may be different from each other. In this case, boundaries between adjacent display panels in the tiled display may be visible in the moving object image.

When the alternating driving shown in FIGS. 30 and 31 is applied to the tiled display, all pixels in the display panels may be emitted every frame period, thereby preventing tearing of objects in the image or the appearance of boundaries within the objects.

According to one or more embodiments of the present disclosure, the display device may be applied to mobile devices, video phones, smart watches, watch phones, wearable device, foldable device, rollable device, bendable device, flexible device, curved device, sliding device, variable device, electronic organizer, electronic books, portable multimedia players (PMPs), personal digital assistants (PDAs), MP3 players, mobile medical devices, desktop PCs, laptop PCs, netbook computers, workstations, navigations, vehicle navigations, vehicle display devices, vehicle devices, theater devices, theater display devices, televisions, wallpaper devices, signage devices, game devices, laptops, monitors, cameras, camcorders, and home appliances, etc. Additionally, the display apparatus according to one or more embodiments of the present disclosure may be applied to organic light emitting lighting devices or inorganic light emitting lighting devices.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A display panel comprising:

a plurality of data lines;

a plurality of gate lines intersecting the plurality of data lines, the plurality of gate lines including a first emission line to which a first light emission signal is applied and a second emission line to which a second light emission signal is applied;

a plurality of power lines; and a plurality of pixels connected to the plurality of data lines, the plurality of gate lines, and the plurality of power lines, wherein each of the plurality of pixels includes:

a sub-pixel of a first color that includes a primary first sub-pixel and a secondary first sub-pixel;

a sub-pixel of a second color that includes a primary second sub-pixel and a secondary second sub-pixel; and a sub-pixel of a third color that includes a primary third sub-pixel and a secondary third sub-pixel, wherein the first emission line is connected to the sub-pixel of the first color and the second emission line is connected to the sub-pixel of the second color, wherein during a first frame period:

the first light emission signal at a first duty ratio is applied to the secondary first sub-pixel; and the second light emission signal at a second duty ratio is applied to the secondary second sub-pixel, the first duty ratio different from the second duty ratio, wherein during a second frame period that is subsequent to the first frame period:

the first light emission signal at the first duty ratio is applied to the primary first sub-pixel; and the second light emission signal at the second duty ratio is applied to the primary second sub-pixel, each of the first duty ratio and the second duty ratio being less than a full duty cycle.

2. The display panel of claim 1, wherein the second emission line is connected to the sub-pixel of the second color and the sub-pixel of the third color.

3. The display panel of claim 2, wherein:

the primary first sub-pixel and the secondary first sub-pixel are connected to a first data line from the plurality of data lines or are connected to different first data lines from the plurality of data lines, the primary second sub-pixel and the secondary second sub-pixel are connected to a second data line from the plurality of data lines or are connected to different second data lines from the plurality of data lines, and the primary third sub-pixel and the secondary third sub-pixel are connected to a third data line from the plurality of data lines or are connected to different third data lines from the plurality of data lines.

4. The display panel of claim 3, wherein the plurality of gate lines further comprise:

a scan line to which a scan signal is applied, the scan line connected to the primary first sub-pixel, the secondary first sub-pixel, the primary second sub-pixel, the secondary second sub-pixel, the primary third sub-pixel, and the secondary third sub-pixel.

5. The display panel of claim 3, wherein the plurality of gate lines further comprise:

a first scan line configured to apply a first scan signal to the primary first sub-pixel, the primary second sub-pixel, and the primary third sub-pixel; and a second scan line configured to apply a second scan signal to the secondary first sub-pixel, the secondary second sub-pixel, and the secondary third sub-pixel.

6. The display panel of claim 3, wherein the plurality of gate lines include:

a first group of gate lines connected to the primary first sub-pixel, the primary second sub-pixel, and the primary third sub-pixel; and a second group of gate lines connected to the secondary first sub-pixel, the secondary second sub-pixel, and the secondary third sub-pixel, and wherein the first group of gate lines includes a scan line configured to apply a scan signal to the primary first sub-pixel, the primary second sub-pixel, and the primary third sub-pixel, and wherein the second group of gate lines includes a scan line configured to apply the scan signal to the secondary first sub-pixel, the secondary second sub-pixel, and the secondary third sub-pixel.

7. The display panel of claim 6, wherein the first group of gate lines includes:

a first scan line of the first group of gate lines that is configured to apply a first scan signal to the primary first sub-pixel, the primary second sub-pixel, and the primary third sub-pixel; and a second scan line of the first group of gate lines that is configured to apply a second scan signal to the primary first sub-pixel, the primary second sub-pixel, and the primary third sub-pixel, and wherein the second group of gate lines includes:

a first scan line of the second group of gate lines that is configured to apply the first scan signal to the secondary first sub-pixel, the secondary second sub-pixel, and the secondary third sub-pixel; and a second scan line of the second group of gate lines that is configured to apply the second scan signal to the secondary first sub-pixel, the secondary second sub-pixel, and the secondary third sub-pixel.

8. The display panel of claim 1, wherein the plurality of gate lines further comprises:

a third emission line to which a third emission signal is applied, the third emission line connected to the sub-pixel of the third color.

9. The display panel of claim 1, wherein each of the primary first sub-pixel and the secondary first sub-pixel includes:

a light-emitting element; and a driving transistor configured to drive the light-emitting element, wherein a channel ratio of the driving transistor in the secondary first sub-pixel is smaller than a channel ratio of the driving transistor in the primary first sub-pixel.

10. A display device comprising:

a display panel including a plurality of data lines, a plurality of gate lines, a plurality of power lines, and a plurality of pixels;

a data driver configured to output a data voltage to the plurality of data lines; and a gate driver configured to output a gate signal to the plurality of gate lines, the plurality of gate lines including a first emission line to which a first light emission signal is applied and a second emission line to which a second light emission signal is applied, wherein each of the plurality of pixels includes:

a sub-pixel of a first color that includes a primary first sub-pixel and a secondary first sub-pixel;

a sub-pixel of a second color that includes a primary second sub-pixel and a secondary second sub-pixel; and a sub-pixel of a third color that includes a primary third sub-pixel and a secondary third sub-pixel, wherein the first emission line is connected to the sub-pixel of the first color and the second emission line is connected to the sub-pixel of the second color, wherein during a first frame period:

the first light emission signal at a first duty ratio is applied to the secondary first sub-pixel; and the second light emission signal at a second duty ratio is applied to the secondary second sub-pixel, the first duty ratio different from the second duty ratio, wherein during a second frame period that is subsequent to the first frame period:

the first light emission signal at the first duty ratio is applied to the primary first sub-pixel; and the second light emission signal at the second duty ratio is applied to the primary second sub-pixel, each of the first duty ratio and the second duty ratio being less than a full duty cycle.

11. The display device of claim 10, wherein the second emission line is connected to the sub-pixel of the second color and the sub-pixel of the third color.

12. The display device of claim 10, wherein the plurality of gate lines further comprises:

a third light emission line to which a third light emission signal is applied, the third light emission line connected to the sub-pixel of the third color.

13. The display device of claim 10, wherein:

one of the primary first sub-pixel and the secondary first sub-pixel is driven while the other one of the primary first sub-pixel and the secondary first sub-pixel is not driven and the primary first sub-pixel and the secondary first sub-pixel are alternately driven at a cycle of a predetermined time period, or the primary first sub-pixel and the secondary first sub-pixel are driven simultaneously.

14. The display device of claim 13, wherein when one of the primary first sub-pixel and the secondary first sub-pixel is driven, pixel data of an input image is written to one of the primary first sub-pixel and the secondary first sub-pixel, and black grayscale data is written to the other one of the primary first sub-pixel and the secondary first sub-pixel.

15. The display device of claim 10, wherein:

during the first frame period, pixel data of a first frame image is written to the primary first sub-pixel, the primary second sub-pixel, and the primary third sub-pixel, and the second light emission signal is further applied to the secondary third sub-pixel such that the secondary first sub-pixel, the secondary second sub-pixel, and the secondary third sub-pixel each emit light, and during the second frame period, pixel data of a second frame image is written to the secondary first sub-pixel, the secondary second sub-pixel, and the secondary third sub-pixel, and the second light emission signal is further applied to the primary third sub-pixel such that the primary first sub-pixel, the primary second sub-pixel, and the primary third sub-pixel each emit light.

16. The display device of claim 10, wherein each of the sub-pixel of the first color, the sub-pixel of the second color, and the sub-pixel of the third color includes:

a light-emitting element including an anode electrode to which a pixel driving voltage is applied;

a switch transistor to which a ground voltage is applied; and a driving transistor connected to a cathode electrode of the light-emitting element and the switch transistor.

17. The display device of claim 10, wherein each of the sub-pixel of the first color, the sub-pixel of the second color, and the sub-pixel of the third color includes:

a light-emitting element including a cathode electrode to which a ground voltage is applied;

a driving transistor to which a pixel driving voltage is applied; and a switch transistor connected to the driving transistor and an anode electrode of the light-emitting element.

18. A display panel comprising:

a plurality of data lines;

a plurality of gate lines intersecting the plurality of data lines, the plurality of gate lines including a first emission line to which a first light emission signal is applied and a second emission line to which a second light emission signal is applied;

a plurality of pixels connected to the plurality of data lines and the plurality of gate lines, wherein each of the plurality of pixels includes:

a sub-pixel of a first color that includes a primary first sub-pixel and a secondary first sub-pixel;

a sub-pixel of a second color that includes a primary second sub-pixel and a secondary second sub-pixel; and a sub-pixel of a third color that includes a primary third sub-pixel and a secondary third sub-pixel, wherein the first emission line is connected to the sub-pixel of the first color and the second emission line is connected to the sub-pixel of the second color, wherein while a maximum possible voltage of a first data voltage is applied to the sub-pixel of the first color:

during a first frame period:

the first light emission signal at a first duty ratio is applied to the secondary first sub-pixel; and the second light emission signal at a second duty ratio is applied to the secondary second sub-pixel, the first duty ratio different from the second duty ratio, during a second frame period that is after the first frame period:

the first light emission signal at the first duty ratio is applied to the primary first sub-pixel; and the second light emission signal at the second duty ratio is applied to the primary second sub-pixel, wherein each of the first duty ratio and the second duty ratio is less than a full duty cycle, wherein the maximum possible voltage of the first data voltage is greater than a maximum possible voltage applied to the sub-pixel of the second color and the sub-pixel of the third color.

19. The display panel of claim 18, wherein the second emission line is connected to the sub-pixel of the second color and the sub-pixel of the third color.

20. The display panel of claim 19, wherein:

the primary first sub-pixel and the secondary first sub-pixel are connected to a first data line from the plurality of data lines, the primary second sub-pixel and the secondary second sub-pixel are connected to a second data line from the plurality of data lines, the primary third sub-pixel and the secondary third sub-pixel are connected to a third data line from the plurality of data lines, and the plurality of gate lines include a scan line that is connected to the primary first sub-pixel, the secondary first sub-pixel, the primary second sub-pixel, the secondary second sub-pixel, the primary third sub-pixel, and the secondary third sub-pixel.

21. The display panel of claim 19, wherein:

the primary first sub-pixel is connected to a first data line from the plurality of data lines and the secondary first sub-pixel is connected to a second data line from the plurality of data lines, the primary second sub-pixel is connected to a third data line from the plurality of data lines and the secondary second sub-pixel is connected to the third data line, the primary third sub-pixel and the secondary third sub-pixel are connected to a fourth data line from the plurality of data lines, and the plurality of gate lines include a scan line that is connected to the primary first sub-pixel, the secondary first sub-pixel, the primary second sub-pixel, the secondary second sub-pixel, the primary third sub-pixel, and the secondary third sub-pixel.

22. The display panel of claim 19, wherein:

the primary first sub-pixel is connected to a first data line from the plurality of data lines and the secondary first sub-pixel is connected to a second data line from the plurality of data lines, the primary second sub-pixel is connected to a third data line from the plurality of data lines and the secondary second sub-pixel is connected to a fourth data line from the plurality of data lines, the primary third sub-pixel and the secondary third sub-pixel are connected to a fifth data line from the plurality of data lines, and the plurality of gate lines include a scan line that is connected to the primary first sub-pixel, the secondary first sub-pixel, the primary second sub-pixel, the secondary second sub-pixel, the primary third sub-pixel, and the secondary third sub-pixel.

23. The display panel of claim 19, wherein:

the primary first sub-pixel is connected to a first data line from the plurality of data lines and the secondary first sub-pixel is connected to a second data line from the plurality of data lines, the primary second sub-pixel is connected to a third data line from the plurality of data lines and the secondary second sub-pixel is connected to a fourth data line from the plurality of data lines, the primary third sub-pixel is connected to a fifth data line from the plurality of data lines and the secondary third sub-pixel is connected to a sixth data line from the plurality of data lines, and the plurality of gate lines include a scan line that is connected to the primary first sub-pixel, the secondary first sub-pixel, the primary second sub-pixel, the secondary second sub-pixel, the primary third sub-pixel, and the secondary third sub-pixel.

24. The display panel of claim 19, wherein:

the primary first sub-pixel and the secondary first sub-pixel are connected to a first data line from the plurality of data lines, the primary second sub-pixel and the secondary second sub-pixel are connected to a second data line from the plurality of data lines, the primary third sub-pixel and the secondary third sub-pixel are connected to a third data line from the plurality of data lines, and the plurality of gate lines include a first scan line that is connected to the primary first sub-pixel, the primary second sub-pixel, and the primary third sub-pixel, and a second scan line that is connected to the secondary first sub-pixel, the secondary second sub-pixel, and the secondary third sub-pixel.

25. The display panel of claim 19, wherein:

the primary first sub-pixel is connected to a first data line from the plurality of data lines and the secondary first sub-pixel is connected to a second data line from the plurality of data lines, the primary second sub-pixel is connected to a third data line from the plurality of data lines and the secondary second sub-pixel is connected to the third data line, the primary third sub-pixel and the secondary third sub-pixel are connected to a fourth data line from the plurality of data lines, and the plurality of gate lines include a first scan line that is connected to the primary first sub-pixel, the primary second sub-pixel, and the primary third sub-pixel, and a second scan line that is connected to the secondary first sub-pixel, the secondary second sub-pixel, and the secondary third sub-pixel.

26. The display panel of claim 19, wherein:

the primary first sub-pixel is connected to a first data line from the plurality of data lines and the secondary first sub-pixel is connected to a second data line from the plurality of data lines, the primary second sub-pixel is connected to a third data line from the plurality of data lines and the secondary second sub-pixel is connected to a fourth data line from the plurality of data lines, the primary third sub-pixel and the secondary third sub-pixel are connected to a fifth data line from the plurality of data lines, and the plurality of gate lines include a first scan line that is connected to the primary first sub-pixel, the primary second sub-pixel, and the primary third sub-pixel, and a second scan line that is connected to the secondary first sub-pixel, the secondary second sub-pixel, and the secondary third sub-pixel.

27. The display panel of claim 19, wherein:

the primary first sub-pixel is connected to a first data line from the plurality of data lines and the secondary first sub-pixel is connected to a second data line from the plurality of data lines, the primary second sub-pixel is connected to a third data line from the plurality of data lines and the secondary second sub-pixel is connected to a fourth data line from the plurality of data lines, the primary third sub-pixel is connected to a fifth data line from the plurality of data lines and the secondary third sub-pixel is connected to a sixth data line from the plurality of data lines, and the plurality of gate lines include a first scan line that is connected to the primary first sub-pixel, the primary second sub-pixel, and the primary third sub-pixel, and a second scan line that is connected to the secondary first sub-pixel, the secondary second sub-pixel, and the secondary third sub-pixel.

28. The display panel of claim 18, wherein the plurality of gate lines further comprises:

a third light emission line to which a third light emission signal is applied, the third light emission line connected to the sub-pixel of the third color.

29. The display panel of claim 18, wherein each of the primary first sub-pixel and the secondary first sub-pixel includes:

a light-emitting element; and a driving transistor configured to drive the light-emitting element, wherein a channel ratio of the driving transistor in the secondary first sub-pixel is smaller than a channel ratio of the driving transistor in the primary first sub-pixel.

* * * * *